US010061500B2

(12) United States Patent
Mandyam et al.

(10) Patent No.: US 10,061,500 B2
(45) Date of Patent: Aug. 28, 2018

(54) APPARATUS AND METHODS FOR WIDGET-RELATED MEMORY MANAGEMENT

(71) Applicant: QUALCOMM Incorporated, San Diego, CA (US)

(72) Inventors: Giridhar Dhati Mandyam, San Diego, CA (US); Lalitha B. S. Suryanarayana, San Diego, CA (US); Christophe G. Bernard, San Diego, CA (US); Kevin E. Hunter, Del Mar, CA (US); Noam Raffaelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 14/714,609

(22) Filed: May 18, 2015

(65) Prior Publication Data

US 2015/0248231 A1 Sep. 3, 2015

Related U.S. Application Data

(62) Division of application No. 12/407,567, filed on Mar. 19, 2009, now Pat. No. 9,069,575.

(60) Provisional application No. 61/039,402, filed on Mar. 25, 2008.

(51) Int. Cl.
*G06F 9/44* (2018.01)
*G06F 3/0484* (2013.01)
*G06F 9/451* (2018.01)

(52) U.S. Cl.
CPC ...... *G06F 3/04847* (2013.01); *G06F 3/04842* (2013.01); *G06F 9/451* (2018.02)

(58) Field of Classification Search
CPC .................. G06F 3/04847; G06F 9/4443
USPC ........................................... 717/120
See application file for complete search history.

(56) References Cited

U.S. PATENT DOCUMENTS

| 5,329,360 | A | 7/1994 | Gillard et al. |
| 5,333,063 | A | 7/1994 | Yoo |
| 5,375,068 | A | 12/1994 | Palmer et al. |
| 5,386,568 | A | 1/1995 | Wold et al. |
| 5,563,649 | A | 10/1996 | Gould et al. |

(Continued)

FOREIGN PATENT DOCUMENTS

| CN | 1449219 A | 10/2003 |
| CN | 1758794 A | 4/2006 |

(Continued)

OTHER PUBLICATIONS

The Semantic Web-ISWC 2006—Isabel Cruz et al. (EDS)—5$^{th}$ International Semantic Web Conference, ISWC 2006 Athens, GA, USA, Nov. 2006 Proceedings—© Springer-Verlag Berlin Heidelberg 2006.*

(Continued)

*Primary Examiner* — Francisco Aponte
(74) *Attorney, Agent, or Firm* — MG-IP Law, P.C.

(57) ABSTRACT

Apparatus and methods for changing operational modes of a widget and changing content feed to a widget based on operational mode changes and/or memory availability on the wireless device are provided. Apparatus and methods for managing the runtime memory usage of mobile widgets on a wireless device by changing widget states based on widget usage data are also provided.

24 Claims, 31 Drawing Sheets

(56) References Cited

U.S. PATENT DOCUMENTS

| | | | |
|---|---|---|---|
| 5,617,467 A | 4/1997 | Bacher et al. | |
| 5,786,815 A * | 7/1998 | Ford | G06F 8/38 |
| | | | 715/744 |
| 5,894,473 A | 4/1999 | Dent | |
| 5,936,616 A | 8/1999 | Torborg, Jr. et al. | |
| 6,049,330 A * | 4/2000 | Redford | H04N 19/176 |
| | | | 345/543 |
| 6,064,771 A | 5/2000 | Migdal et al. | |
| 6,125,283 A | 9/2000 | Kolev et al. | |
| 6,237,004 B1 * | 5/2001 | Dodson | G06F 9/4443 |
| 6,289,382 B1 * | 9/2001 | Bowman-Amuah | |
| | | | G06F 13/387 |
| | | | 709/226 |
| 6,324,651 B2 | 11/2001 | Kubik et al. | |
| 6,441,833 B1 | 8/2002 | Anderson et al. | |
| 6,587,129 B1 * | 7/2003 | Lavendel | H04N 1/00241 |
| | | | 715/776 |
| 6,608,841 B1 | 8/2003 | Koodli | |
| 6,728,208 B1 | 4/2004 | Puuskari | |
| 6,925,609 B1 | 8/2005 | Lucke | |
| 6,996,393 B2 | 2/2006 | Pyhalammi et al. | |
| 6,996,537 B2 | 2/2006 | Minear et al. | |
| 7,030,890 B1 * | 4/2006 | Jouet | G06F 9/4443 |
| | | | 345/589 |
| 7,054,954 B2 | 5/2006 | Kalliokulju | |
| 7,200,390 B1 | 4/2007 | Henager et al. | |
| 7,227,900 B2 | 6/2007 | Porter et al. | |
| 7,304,585 B2 | 12/2007 | Suomela et al. | |
| 7,379,731 B2 | 5/2008 | Natsuno et al. | |
| 7,499,878 B2 | 3/2009 | Janakiraman et al. | |
| 7,523,331 B2 | 4/2009 | Van Der Heijden | |
| 7,587,486 B2 | 9/2009 | Taniguchi | |
| 7,596,389 B2 | 9/2009 | Tsuda et al. | |
| 7,660,871 B2 | 2/2010 | Koh et al. | |
| 7,672,690 B2 | 3/2010 | Hsu et al. | |
| 7,707,514 B2 * | 4/2010 | Forstall | G06F 3/0486 |
| | | | 715/741 |
| 7,711,806 B1 | 5/2010 | Roka et al. | |
| 7,734,285 B2 | 6/2010 | Chmaytelli et al. | |
| 7,743,336 B2 * | 6/2010 | Louch | G06F 21/552 |
| | | | 715/766 |
| 7,831,670 B2 | 11/2010 | Goodman et al. | |
| 7,873,908 B1 | 1/2011 | Varanasi et al. | |
| 7,886,229 B2 | 2/2011 | Pachet | |
| 7,890,572 B2 | 2/2011 | Goodman et al. | |
| 7,917,858 B2 * | 3/2011 | Pereira | G06F 9/4443 |
| | | | 715/762 |
| 7,948,817 B2 | 5/2011 | Coteus et al. | |
| 7,957,691 B1 | 6/2011 | Lee | |
| 7,983,711 B2 | 7/2011 | Juneja et al. | |
| 8,010,095 B2 | 8/2011 | Natsuno et al. | |
| 8,086,225 B2 | 12/2011 | Lee | |
| 8,131,271 B2 | 3/2012 | Ramer et al. | |
| 8,131,875 B1 | 3/2012 | Chen et al. | |
| 8,195,133 B2 | 6/2012 | Ramer et al. | |
| 8,271,889 B1 | 9/2012 | Beckert et al. | |
| 8,453,065 B2 * | 5/2013 | Chaudhri | G06F 3/04817 |
| | | | 715/709 |
| 8,522,132 B2 * | 8/2013 | Caceres | G06F 17/218 |
| | | | 715/234 |
| 8,522,269 B2 | 8/2013 | Dharmaji | |
| 8,539,476 B2 | 9/2013 | Goring et al. | |
| 8,589,893 B1 * | 11/2013 | Allen | G06F 11/3089 |
| | | | 717/120 |
| 8,667,415 B2 * | 3/2014 | Rudolph | G06F 17/3089 |
| | | | 715/761 |
| 8,745,162 B2 * | 6/2014 | Weber | G06F 17/30265 |
| | | | 709/203 |
| 9,037,984 B2 * | 5/2015 | Park | H04N 5/44591 |
| | | | 715/760 |
| 9,069,575 B2 | 6/2015 | Mandyam et al. | |
| 9,110,685 B2 | 8/2015 | Suryanarayana et al. | |
| 9,323,515 B1 | 4/2016 | Daley et al. | |
| 9,417,888 B2 * | 8/2016 | Forstall | G06F 3/0486 |
| 9,442,703 B2 * | 9/2016 | Roll | G06F 8/38 |
| 9,483,164 B2 * | 11/2016 | Louch | G06F 3/04817 |
| 2002/0002605 A1 | 1/2002 | Honda | |
| 2002/0049788 A1 * | 4/2002 | Lipkin | G06F 17/30893 |
| | | | 715/236 |
| 2002/0100950 A1 | 8/2002 | Babcock et al. | |
| 2002/0107947 A1 | 8/2002 | Moragne et al. | |
| 2002/0131404 A1 | 9/2002 | Mehta et al. | |
| 2002/0152268 A1 | 10/2002 | Kureshy et al. | |
| 2003/0041159 A1 * | 2/2003 | Tinsley | G06F 9/4443 |
| | | | 709/231 |
| 2003/0059985 A1 | 3/2003 | Adkisson et al. | |
| 2003/0061122 A1 | 3/2003 | Berkowitz et al. | |
| 2003/0120599 A1 | 6/2003 | Agboatwalla et al. | |
| 2003/0181242 A1 | 9/2003 | Lee et al. | |
| 2003/0191859 A1 | 10/2003 | Ramsey | |
| 2004/0044999 A1 | 3/2004 | Gibson | |
| 2004/0098421 A1 | 5/2004 | Peng | |
| 2004/0119754 A1 | 6/2004 | Bangalore et al. | |
| 2004/0153992 A1 | 8/2004 | Molina-Moreno et al. | |
| 2004/0190853 A1 | 9/2004 | Dow et al. | |
| 2005/0021477 A1 | 1/2005 | Krishnan et al. | |
| 2005/0039136 A1 | 2/2005 | Othmer | |
| 2005/0049989 A1 * | 3/2005 | Kaminsky | G06N 5/04 |
| | | | 706/47 |
| 2005/0086105 A1 | 4/2005 | McFadden et al. | |
| 2005/0091576 A1 | 4/2005 | Relyea et al. | |
| 2005/0104880 A1 * | 5/2005 | Kawahara | G06F 3/04815 |
| | | | 345/419 |
| 2005/0125787 A1 | 6/2005 | Tertitski et al. | |
| 2005/0278443 A1 | 12/2005 | Winner et al. | |
| 2006/0005207 A1 * | 1/2006 | Louch | G06F 8/38 |
| | | | 719/328 |
| 2006/0010394 A1 | 1/2006 | Chaudhri et al. | |
| 2006/0015818 A1 | 1/2006 | Chaudhri et al. | |
| 2006/0117263 A1 | 6/2006 | Locke | |
| 2006/0173838 A1 | 8/2006 | Garg et al. | |
| 2006/0224716 A1 | 10/2006 | Nakazawa et al. | |
| 2006/0230395 A1 | 10/2006 | Paul et al. | |
| 2006/0235766 A1 | 10/2006 | Mifune et al. | |
| 2006/0236258 A1 | 10/2006 | Othmer et al. | |
| 2006/0242249 A1 | 10/2006 | Swanson et al. | |
| 2006/0242279 A1 | 10/2006 | Chen et al. | |
| 2006/0253680 A1 | 11/2006 | Vitanov et al. | |
| 2006/0267966 A1 * | 11/2006 | Grossman | G06F 3/0346 |
| | | | 345/179 |
| 2006/0271618 A1 * | 11/2006 | Kokubo | H04M 1/72586 |
| | | | 709/202 |
| 2006/0277469 A1 | 12/2006 | Chaudhri et al. | |
| 2007/0038934 A1 | 2/2007 | Fellman | |
| 2007/0067807 A1 | 3/2007 | O'Neil | |
| 2007/0078953 A1 | 4/2007 | Chai et al. | |
| 2007/0101291 A1 | 5/2007 | Forstall et al. | |
| 2007/0101297 A1 | 5/2007 | Forstall et al. | |
| 2007/0106627 A1 | 5/2007 | Srivastava et al. | |
| 2007/0118813 A1 | 5/2007 | Forstall et al. | |
| 2007/0124688 A1 | 5/2007 | Nauerz et al. | |
| 2007/0124701 A1 | 5/2007 | Gong et al. | |
| 2007/0130541 A1 * | 6/2007 | Louch | G06F 3/04817 |
| | | | 715/804 |
| 2007/0130589 A1 | 6/2007 | Davis et al. | |
| 2007/0133484 A1 | 6/2007 | Albal et al. | |
| 2007/0192763 A1 | 8/2007 | Helvick | |
| 2007/0198698 A1 | 8/2007 | Boyd et al. | |
| 2007/0203984 A2 * | 8/2007 | AlHusseini | H04L 67/38 |
| | | | 709/205 |
| 2007/0234215 A1 * | 10/2007 | Graham | G06F 17/3005 |
| | | | 715/723 |
| 2007/0244750 A1 | 10/2007 | Grannan et al. | |
| 2007/0245269 A1 | 10/2007 | Kim et al. | |
| 2007/0250643 A1 | 10/2007 | Pyhalammi et al. | |
| 2007/0266093 A1 | 11/2007 | Forstall et al. | |
| 2007/0277109 A1 | 11/2007 | Chen et al. | |
| 2007/0288858 A1 | 12/2007 | Pereira et al. | |
| 2007/0300185 A1 | 12/2007 | MacBeth et al. | |
| 2007/0300265 A1 | 12/2007 | Karkkainen | |
| 2008/0010133 A1 * | 1/2008 | Pyhalammi | G06Q 30/00 |
| | | | 705/14.58 |

(56) References Cited

U.S. PATENT DOCUMENTS

| | | |
|---|---|---|
| 2008/0034309 A1 | 2/2008 | Louch et al. |
| 2008/0034314 A1 | 2/2008 | Louch et al. |
| 2008/0040681 A1* | 2/2008 | Synstelien ............ G06F 9/4443 715/765 |
| 2008/0052348 A1 | 2/2008 | Adler et al. |
| 2008/0052372 A1 | 2/2008 | Weber et al. |
| 2008/0098420 A1 | 4/2008 | Khivesara et al. |
| 2008/0113656 A1 | 5/2008 | Lee et al. |
| 2008/0126476 A1 | 5/2008 | Nicholas et al. |
| 2008/0139189 A1 | 6/2008 | Hyatt et al. |
| 2008/0147530 A1* | 6/2008 | Kwan ..................... G06F 21/10 705/34 |
| 2008/0160956 A1 | 7/2008 | Jackson et al. |
| 2008/0195483 A1* | 8/2008 | Moore ................. G06F 17/3089 705/14.69 |
| 2008/0201225 A1* | 8/2008 | Maharajh .......... G06F 17/30035 705/14.43 |
| 2008/0222658 A1 | 9/2008 | Allen et al. |
| 2008/0235602 A1 | 9/2008 | Strauss et al. |
| 2008/0242373 A1 | 10/2008 | Lu et al. |
| 2008/0248815 A1 | 10/2008 | Busch |
| 2008/0255962 A1 | 10/2008 | Chang et al. |
| 2008/0307301 A1 | 12/2008 | Decker et al. |
| 2009/0007186 A1 | 1/2009 | Hartwell |
| 2009/0037509 A1 | 2/2009 | Parekh et al. |
| 2009/0049097 A1 | 2/2009 | Nocifera et al. |
| 2009/0070228 A1 | 3/2009 | Ronen |
| 2009/0089668 A1* | 4/2009 | Magnani ........... G06F 17/30905 715/273 |
| 2009/0113346 A1 | 4/2009 | Wickramasuriya et al. |
| 2009/0138477 A1 | 5/2009 | Piira et al. |
| 2009/0164641 A1* | 6/2009 | Rogers .............. G06F 17/30867 709/227 |
| 2009/0164653 A1 | 6/2009 | Mandyam et al. |
| 2009/0171939 A1 | 7/2009 | Athsani et al. |
| 2009/0172567 A1 | 7/2009 | Brooks et al. |
| 2009/0235149 A1* | 9/2009 | Frohwein .......... G06F 17/30867 715/205 |
| 2009/0248883 A1 | 10/2009 | Suryanarayana et al. |
| 2009/0248996 A1 | 10/2009 | Mandyam et al. |
| 2009/0249321 A1 | 10/2009 | Mandyam et al. |
| 2009/0249359 A1 | 10/2009 | Caunter et al. |
| 2009/0271778 A1 | 10/2009 | Mandyam et al. |
| 2009/0318124 A1 | 12/2009 | Haughn |
| 2010/0185938 A1 | 7/2010 | Rising, III et al. |
| 2010/0305999 A1 | 12/2010 | Fujioka |
| 2011/0055434 A1 | 3/2011 | Pyers et al. |
| 2011/0099487 A1 | 4/2011 | Pyhalammi et al. |
| 2011/0191583 A1 | 8/2011 | Liu |
| 2011/0237234 A1 | 9/2011 | Kotani et al. |
| 2012/0265613 A1 | 10/2012 | Ramer et al. |
| 2012/0330750 A1 | 12/2012 | Ramer et al. |
| 2013/0046852 A1 | 2/2013 | Saxena et al. |
| 2013/0053005 A1 | 2/2013 | Ramer et al. |
| 2013/0166527 A1 | 6/2013 | Kasterstein et al. |
| 2013/0312028 A1 | 11/2013 | Dharmaji |
| 2014/0143803 A1 | 5/2014 | Narsimhan et al. |
| 2014/0250432 A1 | 9/2014 | Zuverink |
| 2014/0280475 A1 | 9/2014 | Chiussi et al. |
| 2015/0346993 A1 | 12/2015 | Suryanarayana |
| 2015/0347204 A1 | 12/2015 | Stanley-Marbell et al. |
| 2016/0004527 A1 | 1/2016 | Udd |

FOREIGN PATENT DOCUMENTS

| | | | |
|---|---|---|---|
| CN | 1849773 | A | 10/2006 |
| CN | 1864367 | A | 11/2006 |
| CN | 1893418 | A | 1/2007 |
| CN | 1963819 | A | 5/2007 |
| CN | 101080095 | A | 11/2007 |
| EP | 1168758 | | 1/2002 |
| EP | 1217857 | A2 | 6/2002 |
| EP | 1406174 | A2 | 4/2004 |
| EP | 1536327 | A2 | 6/2005 |
| EP | 1848163 | A1 | 10/2007 |
| GB | 2443991 | | 5/2008 |
| JP | S63185069 | A | 7/1988 |
| JP | 5020016 | A | 1/1993 |
| JP | 10116170 | A | 5/1998 |
| JP | 11075257 | A | 3/1999 |
| JP | 2000106689 | A | 4/2000 |
| JP | 2000507365 | A | 6/2000 |
| JP | 2000276332 | A | 10/2000 |
| JP | 2002014821 | A | 1/2002 |
| JP | 2002118267 | A | 4/2002 |
| JP | 2002140213 | A | 5/2002 |
| JP | 2002345050 | A | 11/2002 |
| JP | 2002373272 | A | 12/2002 |
| JP | 2003016286 | A | 1/2003 |
| JP | 2003124222 | A | 4/2003 |
| JP | 2003177736 | A | 6/2003 |
| JP | 2003283494 | A | 10/2003 |
| JP | 2003330849 | A | 11/2003 |
| JP | 2003345716 | A | 12/2003 |
| JP | 2004500661 | A | 1/2004 |
| JP | 2004530958 | A | 10/2004 |
| JP | 2004326039 | A | 11/2004 |
| JP | 2005011218 | | 1/2005 |
| JP | 2005228228 | A | 8/2005 |
| JP | 2006127382 | A | 5/2006 |
| JP | 2006139443 | A | 6/2006 |
| JP | 2006146600 | A | 6/2006 |
| JP | 2006155605 | A | 6/2006 |
| JP | 2006227855 | A | 8/2006 |
| JP | 2006244229 | A | 9/2006 |
| JP | 2006260418 | A | 9/2006 |
| JP | 2006285936 | A | 10/2006 |
| JP | 2006302144 | A | 11/2006 |
| JP | 2006526229 | A | 11/2006 |
| JP | 2006345214 | A | 12/2006 |
| JP | 2007026094 | A | 2/2007 |
| JP | 2007133871 | A | 5/2007 |
| JP | 2007164486 | A | 6/2007 |
| JP | 2007249373 | | 9/2007 |
| JP | 2007293849 | A | 11/2007 |
| JP | 2007295201 | A | 11/2007 |
| JP | 2007299259 | A | 11/2007 |
| JP | 2007535047 | A | 11/2007 |
| JP | 2008501173 | A | 1/2008 |
| JP | 2008046674 | A | 2/2008 |
| JP | 2008504610 | A | 2/2008 |
| JP | 2008065695 | A | 3/2008 |
| JP | 2008516324 | A | 5/2008 |
| JP | 2008527563 | A | 7/2008 |
| JP | 2010503052 | A | 1/2010 |
| JP | 2010503127 | A | 1/2010 |
| JP | 2014157847 | | 8/2014 |
| KR | 20060107950 | A | 10/2006 |
| KR | 100861656 | B1 | 10/2008 |
| KR | 20080109473 | A | 12/2008 |
| RU | 2254611 | C2 | 6/2005 |
| RU | 2371758 | C2 | 10/2009 |
| WO | 9735296 | A1 | 9/1997 |
| WO | 9966394 | A1 | 12/1999 |
| WO | 01043017 | | 6/2001 |
| WO | 0167785 | A2 | 9/2001 |
| WO | 0244892 | A2 | 6/2002 |
| WO | 02082265 | A2 | 10/2002 |
| WO | 03030559 | A2 | 4/2003 |
| WO | 2004008781 | | 1/2004 |
| WO | 2004061615 | A2 | 7/2004 |
| WO | 2005025252 | A2 | 3/2005 |
| WO | 2005104572 | A1 | 11/2005 |
| WO | 2006000152 | A1 | 1/2006 |
| WO | 2006012343 | A2 | 2/2006 |
| WO | 2006037786 | A2 | 4/2006 |
| WO | 2006040506 | A1 | 4/2006 |
| WO | 2006075334 | A2 | 7/2006 |
| WO | 2006075677 | A1 | 7/2006 |
| WO | 2006089880 | A1 | 8/2006 |
| WO | 2006117107 | | 11/2006 |
| WO | 2006135844 | A2 | 12/2006 |
| WO | 2007073404 | A1 | 6/2007 |

(56) References Cited

FOREIGN PATENT DOCUMENTS

| WO | 2008009312 A1 | 1/2008 |
| WO | 2008010872 A1 | 1/2008 |
| WO | 2008025017 A2 | 2/2008 |
| WO | 2008030780 A1 | 3/2008 |
| WO | 2008030875 A2 | 3/2008 |
| WO | 2008030976 A2 | 3/2008 |

OTHER PUBLICATIONS

Armstrong et al., "Efficient and Transparent Dynamic Content Updates for Mobile Clients," 2006 ACM, MobiSys'06, Jun. 2006, pp. 56-68; http://dl.acm.org/citation.cfm?id=1134687&CFID=673176692&CFTOKEN=90539733.

Liu et al., "A Dynamic Assignment Scheduling Algorithm for Big Data Stream Processing in Mobile Internet Services," Springer, Apr. 2016, pp. 373-383; http://link.springer.eom/article/10.1007/s00779-016-0914-z.

Sahu et al., "A New Method for Detecting Users Behavior from Web Access Logs," IEEE, Aug. 2016, CICN'15, pp. 1003-1007; http://ieeexplore.ieee.org/document/7546248/.

Kim Y., et al., "Mobile Advertisement System Using Data Push Scheduling Based on User Preference", IEEE, Apr. 2009, pp. 1-5. Retrieved from Internet: http://ieeexplore.ieee.org/document/5068977/?reload=true.

Li K., et al., "Building a Targeted Mobile Advertising System for Location-Based Services", Elsevier, Feb. 2012, pp. 1-8. Retrieved from Internet: http://www.sciencedirect.com/science/article/pii/S0167923612000607.

Nath S., et al., "Smartads: Bringing Contextual Ads to Mobile Apps", MobiSys' 13, Jun. 25-28, 2013, pp. 111-123. Retrieved from Internet: http://dl.acm.org/citation.cfm?id=2464452&CFID=711797576&CFTOKEN=61084486.

Bott E., et al., "Microsoft Windows Vista Official Manual, First Volume," NIKKEI Business Publications, Inc., Sep. 3, 2007, 1st edition, pp. 104-106.

Co-pending U.S. Appl. No. 09/668,600, filed Sep. 22, 2000.

Inoue T., "RIA"—Three-Sided Offence and Deffence, I/O, Japan, vol. 33, No. 2, Kohgakusha Co., Ltd., Feb. 1, 2008, vol. 33, pp. 65-68.

International Search Report and Written Opinion—PCT/US2009/037798, International Search Authority—European Patent Office—dated Jul. 28, 2009.

Live GPS Tracking: "FreeMacWare", Internet Archive, Oct. 5, 2007, 5 Pages, Retrieved from the internet < URL: https://web.archive.org/web/20071005201319/http://www.freemacware.com/live-gps-tracking/ >.

Mizuno T., "All about Google," Sotechsha Co., Ltd., Nov. 20, 2007, 1st edition, p. 322.

RSS Reader: "Dashboard Widget", Internet Archive, Aug. 22, 2007, 2 Pages, Retrieved from the internet < URL: https://web.archive.org/web/20070822225108/http://www.apple.com/jp/downloads/dashboard/news/rssreader.html>.

Shockwidgets.com: "ministat21.91b" Macupdate, [Online] Nov. 10, 2007 (Nov. 10, 2007), XP002536607 online Retrieved from the Internet: URL:http://www.macupdate.com/info.php/id/19368> [retrieved on Jul. 9, 2009] the whole document.

Suzaki S., et al., "Automatic Estimation Method of Use Interest Based on WWW Access Logs," Proceedings of Multimedia, Distributed, Cooperative and Mobile (DICOMO) Symposium, the Information Processing Society of Japan, Jul. 2, 1997, vol. 97, No. 2, pp. 251-256.

"Web widget", Wikipedia.org, http://en.wikipedi.org/wiki/Web_widget, Dec. 18, 2008.

Widgets 1.0 Requirements: "W3C Working Draft 9", Feb. 2007, 21 Pages, Retrieved from the internet < URL: http://www.w3.org/TR/2007/WD-widgets-reqs-20070209/ >.

Boloix G., et al., "Framework for Evaluating Quality and Sophistication of Software", Nikkei Electronics, No. 657, Mar. 11, 1996, pp. 163-178.

Lenehan D., "World Wide Web of Widgets", https://readwrite.com/2007/05/09/world_wide_web_of_widgets/ May 9, 2007 (May 9, 2007), 4 pages.

\* cited by examiner

APPARATUS AND METHODS FOR WIDGET-RELATED MEMORY MANAGEMENT

CLAIM OF PRIORITY UNDER 35 U.S.C. § 119

The present application for patent is a Divisional of Non-Provisional application Ser. No. 12/407,567, entitled "APPARATUS AND METHODS FOR WIDGET-RELATED MEMORY MANAGEMENT", filed Mar. 19, 2009, which in turn claims priority to Provisional Application No. 61/039,402, entitled "APPARATUS AND METHODS OF MANAGING WIDGETS IN A WIRELESS COMMUNICATION ENVIRONMENT", filed Mar. 25, 2008, each of which is hereby expressly incorporated by reference herein in its entirety.

REFERENCE TO CO-PENDING APPLICATIONS FOR PATENT

The present application for patent is related to the following co-pending U.S. patent applications:

U.S. application Ser. No. 12/407,583, entitled "APPARATUS AND METHODS FOR TRANSPORT OPTIMIZATION FOR WIDGET CONTENT DELIVERY", filed on Mar. 19, 2009, and expressly incorporated by reference herein in its entirety;

U.S. application Ser. No. 12/407,574, entitled "APPARATUS AND METHODS FOR WIDGET UPDATE SCHEDULING", filed on Mar. 19, 2009, and expressly incorporated by reference herein in its entirety;

U.S. application Ser. No. 12/407,559, entitled "APPARATUS AND METHODS FOR MANAGING WIDGETS IN A WIRELESS COMMUNICATION ENVIRONMENT", filed on Mar. 19, 2009, and expressly incorporated by reference herein in its entirety; and U.S. application Ser. No. 12/407,593, entitled "APPARATUS AND METHODS FOR WIDGET INTERCOMMUNICATION IN A WIRELESS COMMUNICATION ENVIRONMENT", filed on Mar. 19, 2009, and expressly incorporated by reference herein in its entirety.

BACKGROUND

The described aspects relate to widgets, and more specifically to apparatus and methods relating to widget-related memory management in a wireless communication environment.

Wireless networking systems have become a prevalent way to communicate with others worldwide. Wireless communication devices, such as a mobile or cellular telephone, a personal digital assistant (PDA), etc., operate on such networks, and have become smaller and more powerful in order to meet consumer needs and to improve portability and convenience. Consumers have become dependent upon these devices, demanding reliable service, expanded areas of coverage, additional services such as web browsing capabilities, and continued reduction in the size and cost of such devices.

Many of the functionalities and end user experiences of wireless communication devices have been developed, with limited success, to mimic the functionalities and end user experiences of a personal computing (PC) environment. For example, mobile web services have seen varying levels of success, even with the deployment of relatively high speed and high capacity services, such as advanced 3G services (1X-EV-DO Rev. A, UMTS HSPA). Much of the problem lies in the fact that the mobile web browsing experience is distinct from the PC experience with which most users are familiar. In particular, many end users find mobile web browsing applications to be hard to use, for example, with regard to entering search information, and difficult to enjoy, for example, as the resulting presentation of content is unpleasant.

Additionally, wireless communication devices are relatively memory constrained compared to desktop computing devices. As such, on a wireless communication device, memory limitations affect the ability of an end user to run a mobile widget, and/or may limit how many mobile widgets may be active at one time.

Therefore, apparatus and methods are desired to improve the experience of an end user in interacting with mobile widgets on a wireless communication device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for changing operational modes in a wireless communication device. The method may include activating a mobile widget client in standard operational mode. The method may also include determining memory availability on the wireless communication device. Further, the method may include deactivating the standard operational mode based on the determination of the memory availability. In addition, the method may include activating a low memory operational mode of the mobile widget client in response to deactivation of the standard operational mode.

Another aspect relates to at least one processor configured to change operational mode of a widget based on memory availability. The processor may include a first module for activating a mobile widget client in standard operational mode. Additionally, the processor may include a second module for determining memory availability on the wireless communication device. Moreover, the processor may include a third module for deactivating the standard operational mode based on the determination of the memory availability. Furthermore, the processor may include a fourth module for activating a low memory operational mode of the mobile widget client in response to deactivation of the standard operational mode.

Yet another aspect relates to a computer program product including a computer-readable medium. The computer-readable medium may include at least one instruction for causing a computer to activate a mobile widget client in standard operational mode. In addition, the computer-readable medium may include at least one instruction for causing the computer to determine memory availability on the wireless communication device. The computer-readable medium may also include at least one instruction for causing the computer to deactivate the standard operational mode based on the determination of the memory availability. Further, the computer-readable medium may include at least one instruction for causing the computer to activate a low memory operational mode of the mobile widget client in response to deactivation of the standard operational mode.

Another aspect relates to an apparatus. The apparatus may include means for activating a mobile widget client in standard operational mode. Further, the apparatus may include means for determining memory availability on the wireless communication device. The apparatus may also include means for deactivating the standard operational mode based on the determination of the memory availability. Moreover, the apparatus may include means for activating a low memory operational mode of the mobile widget client in response to deactivation of the standard operational mode.

Still another aspect relates to an apparatus for changing operation modes of widgets based on memory availability. The apparatus may include a processor. In addition, the apparatus may include a memory in communication with the processor. Further, the apparatus may include a memory state monitor in communication with the processor and operable to determine availability of memory on the apparatus. Additionally, the apparatus may include at least one mobile widget client stored in the memory, executable by the processor and including a standard operational mode and a low memory operational mode. The apparatus may also include a widget mode changer stored in the memory, executable by the processor and operable to change the widget operational mode between the standard operational mode and the low memory mode based on determinations made by the memory state monitor.

Another aspect relates to a method for changing content feed to a widget based on operational mode changes. The method may include receiving a notification from a wireless device that indicates that one or more widgets executing on the device are changing operational modes based on memory availability on the device. Further, the method may include storing an indication of the change in network memory. Moreover, the method may include changing content feed provided to the one or more widgets based on the notification.

Yet another aspect relates to at least one processor configured to change content feed to a mobile widget based on notification of a low memory based operational mode change. The processor may include a first module for receiving a notification from a wireless device that indicates that one or more widgets executing on the device are changing operational modes based on memory availability on the device. The processor may also include a second module for storing an indication of the change in network memory. In addition, the processor may include a third module for changing content feed provided to the one or more widgets based on the notification.

Another aspect relates to a computer program product including a computer-readable medium. The computer-readable medium may include at least one instruction for causing a computer to receive a notification from a wireless device that indicates that one or more widgets executing on the device are changing operational modes based on memory availability on the device. In addition, the computer-readable medium may include at least one instruction for causing the computer to store an indication of the change in network memory. Moreover, the computer-readable medium may include at least one instruction for causing the computer to deactivate the standard operational mode based on the determination of the memory availability. Furthermore, the computer-readable medium may include at least one instruction for causing the computer to change content feed provided to the one or more widgets based on the notification.

Still another aspect relates to an apparatus. The apparatus may include means for receiving a notification from a wireless device that indicates that one or more widgets executing on the device are changing operational modes based on memory availability on the device. Further, the apparatus may include means for storing an indication of the change in network memory. The apparatus may also include means for changing content feed provided to the one or more widgets based on the notification.

Another aspect relates to a network apparatus for changing content feed to a widget based on an operation mode change of a widget based on memory availability. The network apparatus may include a processor. In addition, the network apparatus may include a memory in communication with the processor. Further, the network apparatus may include a widget management module stored in the memory, executable by the processor and operable to receive a notification from a wireless device that indicates that one or more widgets executing on the device are changing operational modes based on memory availability on the device and further operable to change content feed provided to the one or more widgets based on the notification. Moreover, the network apparatus may include a data storage in the memory and operable to store an indication of the operational mode change.

Still another aspect relates to a method for managing the runtime memory of a wireless device. The method may include determining widget usage data related to a user interaction with one or more widgets executable on the wireless device. The method may also include changing, adaptively, one or more widget states based on the determined widget usage data. In addition, the method may include storing the changes of the one or more widget states.

Another aspect relates to at least one processor configured to manage the runtime memory of a wireless device. The processor may include a first module for determining widget usage data related to a user interaction with one or more widgets executable on the wireless device. Moreover, the processor may include a second module for changing, adaptively, one or more widget states based on the determined widget usage data. Furthermore, the processor may include a third module for storing the changes of the one or more widget states.

Yet another aspect relates to a computer program product including a computer-readable medium. The computer-readable medium may include at least one instruction for causing a computer to determine widget usage data related to a user interaction with one or more widgets executable on the wireless device. Additionally, the computer-readable medium may include at least one instruction for changing, adaptively, one or more widget states based on the determined widget usage data. The computer-readable medium may also include at least one instruction for causing the computer to store the changes of the one or more widget states.

Another aspect relates to an apparatus. The apparatus may include means for determining widget usage data related to a user interaction with one or more widgets executable on the wireless device. In addition, the apparatus may include means for changing, adaptively, one or more widget states based on the determined widget usage data. Further, the apparatus may include means for storing the changes of the one or more widget states.

Another aspect relates to an apparatus for managing the runtime memory of a wireless device. The apparatus may include a processor. The apparatus may also include a memory in communication with the processor. The apparatus may further include at least one mobile widget client stored in the memory, executable by the processor. Moreover, the apparatus may include a widget usage data reporter stored in the memory, executable by the processor and operable to collect usage data related to a user interaction with one or more of the widget clients. In addition, the apparatus may include widget adapter logic stored in the memory, executable by the processor and operable to adaptively change one or more widget states based on the determined widget usage data. Furthermore, the apparatus may include a widget configuration setting database in the memory and operable to store the changes of the one or more widget states.

Still another aspect relates to a method for receiving and recording widget state changes based on widgets usage data. The method may include receiving a notification from a wireless device that indicates that one or more states of one or more mobile widgets have been changed based on widget usage data. In addition, the method may include storing the state changes in network memory.

Another aspect relates to at least one processor configured to change content feed to a mobile widget based on notification of a low memory based operational mode change. The processor may include a first module for receiving a notification from a wireless device that indicates that one or more states of one or more mobile widgets have been changed based on widget usage data. Further, the processor may include a second module for storing the state changes in network memory.

Yet another aspect relates to a computer program product that includes a computer-readable medium. The computer-readable medium may include at least one instruction for causing a computer to receive a notification from a wireless device that indicates that one or more states of one or more mobile widgets have been changed based on widget usage data. The computer-readable medium may also include at least one instruction for causing the computer to store the state changes in network memory.

Another aspect relates to an apparatus. The apparatus may include means for receiving a notification from a wireless device that indicates that one or more states of one or more mobile widgets have been changed based on widget usage data. Further, the apparatus may include means for storing the state changes in network memory.

Another aspect relates to a network apparatus for receiving and recording widget state changes based on widget usage data. The network apparatus may include a processor. The network apparatus may also include a memory in communication with the processor. Moreover, the network apparatus may include a widget management module stored in the memory, executable by the processor and operable to receive a notification from a wireless device that indicates that one or more states of one or more mobile widgets have been changed based on widget usage data. Furthermore, the network apparatus may include a data storage in the memory and operable to store the state changes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
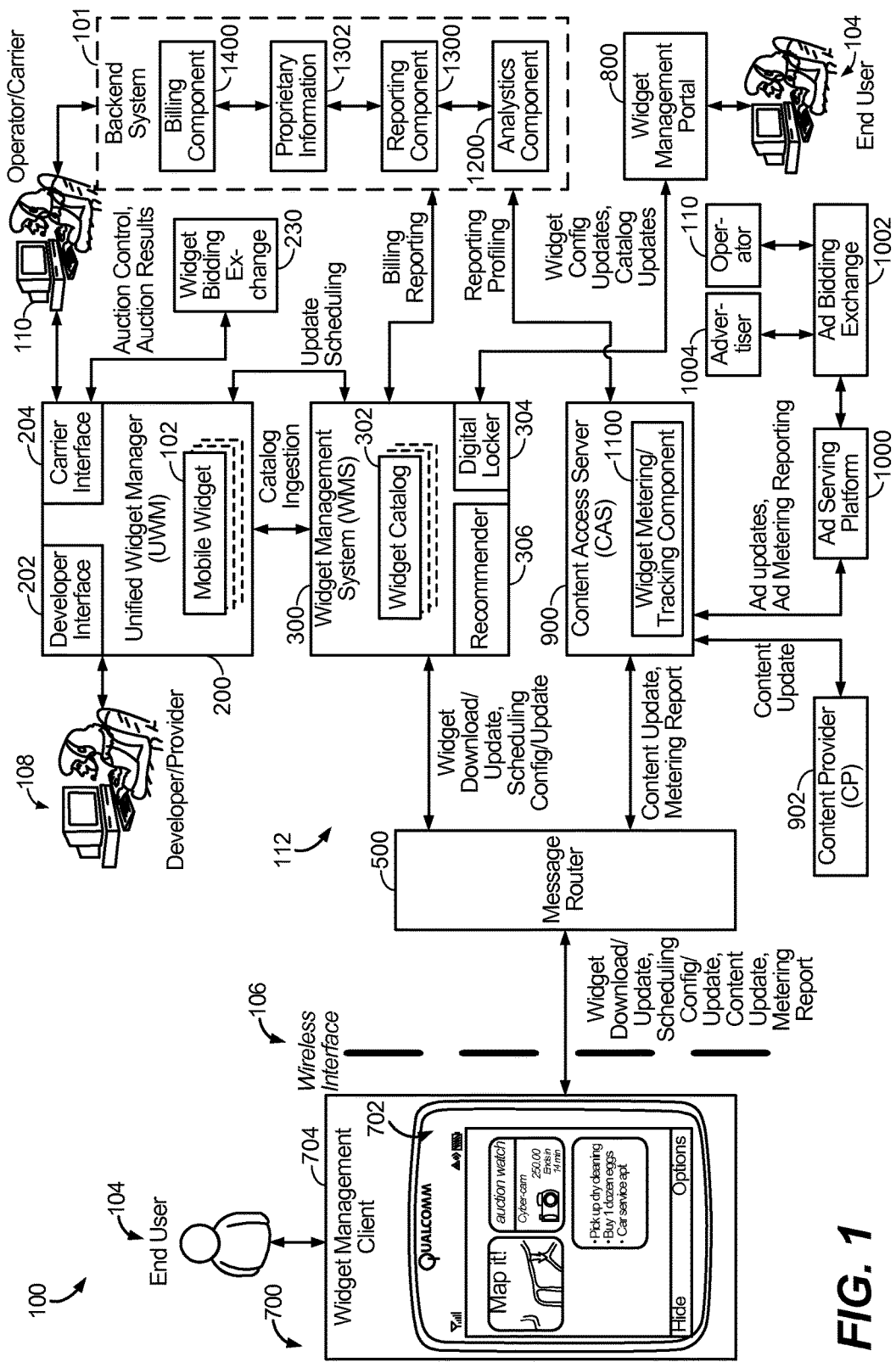
FIG. 1 is a schematic diagram of an aspect of an end-to-end mobile widget system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to widgets, and more specifically to apparatus and methods relating to changing operational modes of a widget and changing content feed to a widget based on operational mode changes and/or memory availability on the wireless device. In addition, the described aspects relate to apparatus and methods relating to managing the runtime memory of a wireless device and receiving and recording widget state changes based on widget usage data.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Terminology

To enhance the description of the present aspects, the following provides a list of some of the discussed terminology.

Mobile widget or widget: a user interface (UI) element with which a device end user interacts; in some aspects, a mobile widget may have a specific relationship with a respective content source. For example, a mobile widget or widget is a relatively small, specialized graphical user interface (GUI) application, which may include a combination of a graphical symbol and program code or a software module executable to provide visual information or easy access to a function, such as but not limited to a clock, a calendar, a news aggregator, weather information, etc.

Widget frame: a static user interface display area of a mobile widget.

Widget management client (WMC): a client application that instantiates and manages one or more mobile widgets.

Widget wall: an initial view in the WMC where a device end user can see all or some portion of mobile widgets, depending on the size of the view and the size of the respective mobile widgets, resident on the respective wireless communication device.

Widget operation modes: (i) compressed mode: an individual widget frame for display on a widget wall; and (ii) expanded mode: an individual widget frame for display when the mobile widget is selected, where the widget frame may be sized larger than the respective widget frame in the compressed mode.

Mobile widget types: (i) updateable widget: a widget whose underlying widget package can be updated after instantiation at the client; (ii) locked widget: widget that cannot be modified, deleted or re-positioned by the user; it is updateable, but not at user discretion; (iii) dynamic widget mobile widget having: a compressed mode appearance on UI that can be manipulated by end user (as opposed to a locked widget); (iv) floating widget: a mobile widget having a compressed mode appearance that cannot be modified by the end user; (v) discovery widget: a mobile widget that presents widget management functionality to the end user, including widget selection and widget wall management.

Widget security: (i) trusted widget: a widget that has gone through an approval process; and (ii) untrusted widget: a widget that has not gone through any approval; could be user defined, public domain, or from a developer.

Standalone ad widget: an optional form of a locked widget displayed on the widget wall; may have content relevant to the end user based on, among other things, other widget selections made by the WMC.

Widget management system (WMS): an infrastructure element for managing widget subscriptions and downloads.

Widget management portal (WMP): in one aspect, an end user-facing web tool for end users to manage widgets.

Content access server (CAS): an infrastructure element operable to handle routing of metering information related to mobile widget activity or end user interactivity with mobile widgets from one or more wireless communication devices; further operable to manage providing content updates to mobile widgets, and to retrieve/cache corresponding content updates from one or more content providers.

Widget wizard: a client management engine for mobile widgets.

Unified widget manager (UWM): an infrastructure element that operates as a clearinghouse for mobile widgets.

Message router: a network element through which all communication between the widget system infrastructure elements and the WMC is routed.

Schedule record: a data record that provides update schedules for widget content updates and a timetable for periodic retrieval of digital locker contents, where the digital locker may be a WMS component that includes mobile widget information and configuration for end users; for example, the schedule record may be sent from the WMS digital locker to the WMC.

Catalog record: a data record sent from the WMS digital locker to the WMC and WMP that provides a widget catalog listing mobile widgets, e.g. catalog items, available to the end user; the catalog record may be customized for an end user.

Overview

The described aspects relate to widgets, and more specifically to apparatus and methods relating to an end-to-end system for the creation, storage, delivery, and management of user-defined mobile widgets and widget-related content in a wireless communication environment. The described aspects provide apparatus and methods enable end users to customize mobile widgets. Further, the described aspects provide apparatus and methods that are operable to operate efficiently in a wireless network environment having constraints with regard to network connectivity, communications bandwidth or throughput, and wireless device memory and processing usage.

As such, the described aspects particularly relate to "mobile" widgets optimized for a wireless network environment. To understand mobile widgets, one should also understand their counterpart—desktop widgets. Desktop widgets are essentially compact, client applications that provide specific functionality to the end user via a specialized user interface. It should be understood, however, that mobile widgets are not a straightforward extension of desktop widgets, particularly in several respects: (a) Desktop widgets are simple to write, and leverage existing web programming technologies (particularly Javascript and XML, etc.). In some aspects, mobile widgets may include compact protocols and utilize limited interpreters (e.g. Javascript) due to limitations in device memory and processing power; (b) Desktop widgets generally function with an expectation of consistent connectivity. Such consistent connectivity is not necessarily feasible in the wireless network environment due to inconsistent available throughput, limited cellular capacity, and specific wireless data plans; (c) Functionality utilized by desktop widgets specified in standard Javascript (e.g. ECMAScript versions, etc.) does not interface with wireless device-specific API's that can be extended to the mobile widget developer; examples of such API's include the handset power meter, location information, and wireless connectivity status; (d) In some aspects, mobile widget accessibility may be provided in several forms, while, in general, desktop widgets are accessible directly on the PC desktop. In some aspects, mobile widgets are accessible via the wireless device application manager, while in other aspects mobile widgets may be accessible via a specific mobile widget management application or via a network portal; and (e) Mobile widget discovery and instantiation may be controlled by a wireless device application manager, or by a mobile widget management application, or by a network portal. In contrast, desktop widget discovery and instantiation is not restricted to one client or one portal. Therefore, the described aspects take these considerations into account to provide a mobile widget service optimized for the wireless network environment.

In particular, the described mobile widgets provide an alternative to the mobile browser to access content on a wireless device, and also allow individual users to easily create custom mobile widgets for arbitrary wireless device or web resources.

Thus, the described aspects offer a true replacement to receiving content via a mobile browser, addressing the above-noted challenges by developing a system with the constraints of wireless access, wireless device capabilities, and web development in mind.

End-to-End System Architecture

Figure 2:
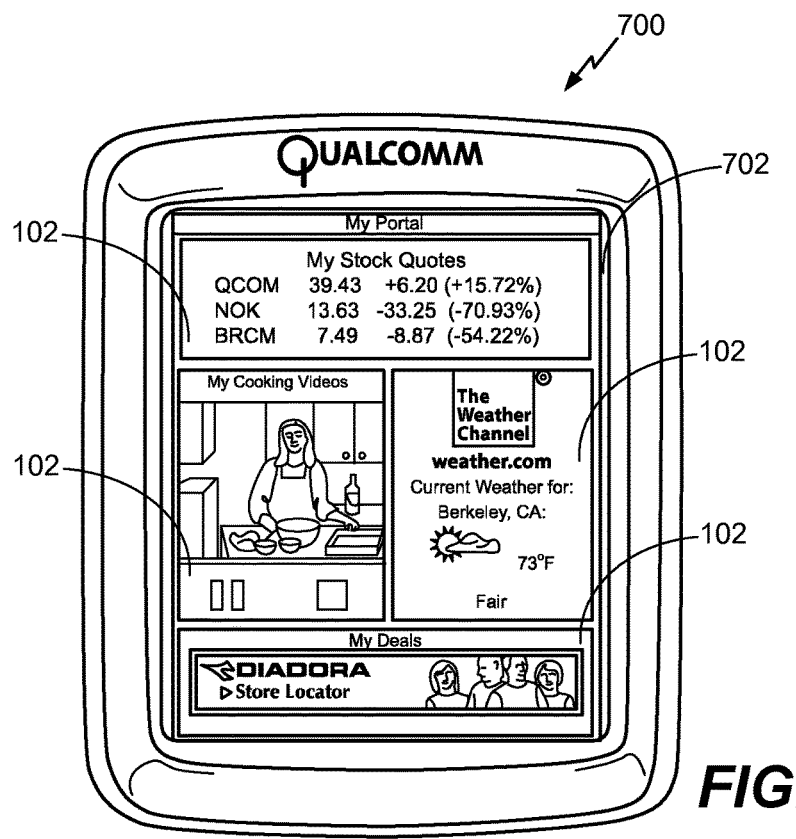
FIG. 2 is a schematic representation of an aspect of a wireless device having a display with a number of mobile widgets in a first state.
Figure 3:
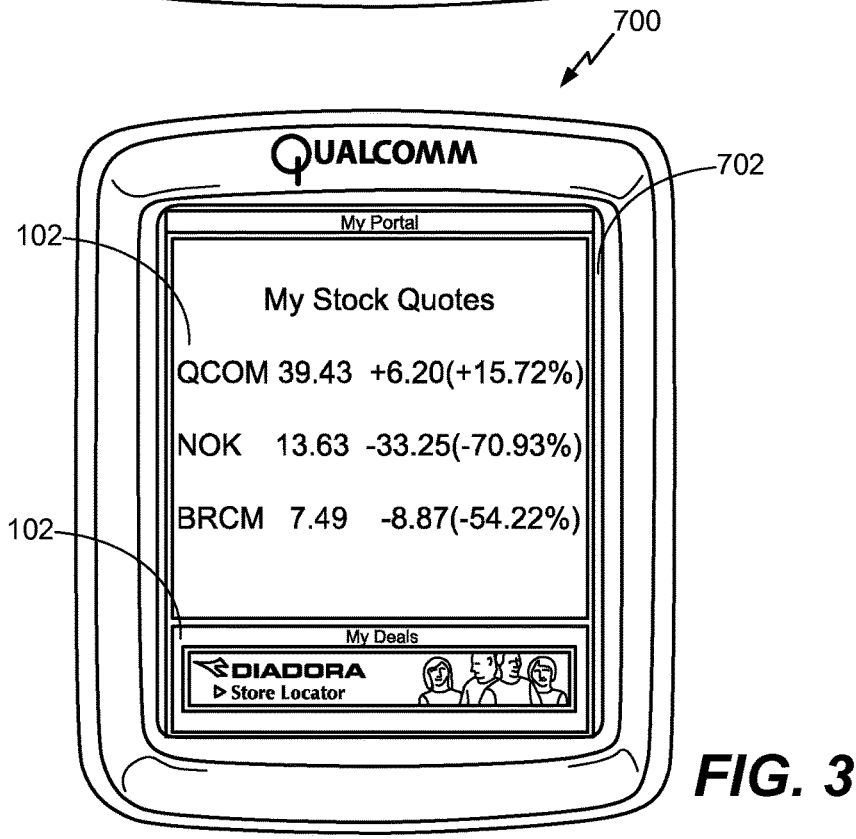
FIG. 3 is a schematic representation of an aspect of the wireless device of FIG. 2 with one of the mobile widgets in a second state.

Referring to FIGS. 1-3, in one non-limiting aspect, a mobile widget system 100 provides an end-to-end architecture for the creation, storage, delivery, operation, and management of mobile widgets in a wireless network environment.

A mobile widget 102 includes a compact application or set of codes executable by a wireless communication device 700 to interact with a content source, such as a content access server (CAS) 900, to retrieve content for presentation to a device end user 104 via a user interface 702, such as a display, on the device. In one non-limiting aspect, for example, mobile widget 102 may be a Really Simple Syndication (RSS) reader operable to retrieve a data feed from a news source and display the corresponding news item or headline(s) to allow end user 104 to view the latest news.

It should be noted, however, that mobile widget 102 is not limited to the prior example, and may have any functionality and may include any type of content. For example, mobile widget 102 may present any content generated by a content provider 902, including text, graphics, audio, video and multimedia content. Further, for example, content presentable by mobile widget 102 may include an advertisement, such as from an advertisement serving platform 1000, where the advertisement may be mixed with other content or may be the sole content. Advertisement serving platform 1000 may be a specialized version of content provider 902, supplying system 100 with advertising content, managing the placement of advertisements in system 100, and tracking feedback relating to the usage of advertisements on wireless communication devices 700. Additionally, advertisement serving platform 1000 may be operable to interface with an advertisement virtual negotiation component 1002, such as an advertisement bidding exchange, which provides advertisers 1004 and an operator 110 of system 100 with a virtual marketplace to enable the placement and management of advertising content within system 100.

Further, in system 100, wireless communication device 700 provides a platform for the storage, operation, and management of mobile widget 102 for end user 104. For example, wireless communication device 700 may include a widget management client (WMC) 704 that is executable to obtain one or more mobile widgets 102, such as from a widget management system 300. Additionally, WMC 704 may be executable to supervise mobile widget operation, and to track mobile widget activities on wireless communication device 700 and report such activities to a widget tracking component 1100.

Widget management system (WMS) 300 is operable to communicate with WMC 704, for example via a wireless interface 106 and a message router component 500, and includes one or more catalogs 302 of one or more widgets 102 available for purchase and/or download to wireless communication device 700. WMS 300 may include a digital locker 304 operable to store records of each widget 102 downloaded to each device 700, as well as the corresponding configuration of each widget 102 on each device 700. A widget configuration may include settings relating to an appearance of widget 102, as well as an operation of widget 102, including one or more content update settings. In conjunction with providing access to widget catalogs 302 and widgets 102, WMS 300 optionally may include a widget recommender 306 to provide end user 104 with advice, suggestions, or recommendations of mobile widgets 102 that may be of benefit or of interest to end user 104.

As noted, message router component 500 is operable to interface between WMC 704 and the widget-supplying and content-supplying components of system 100. In particular, message router component 500 provides the interface with WMS 300 and CAS 900 to exchange messages relating to downloading mobile widget 102, configuring mobile widget 102, updating mobile widget content, scheduling of content updates, and reporting of data tracking the activity of or end user interaction with mobile widget 102. As such, in some aspects, message router component 500 defines a network element that manages and controls all communications with WMC 704.

Further, in some aspects, system 100 may include a widget management portal 800 that allows end user 104 to access WMS 300 to inquire about available mobile widgets 102 and widget catalogs 302. Further, widget management portal 800 allows end user 104 to configure the functionality and appearance of mobile widget 102 on wireless communication device 700. As such, widget management portal 800 provides end user 104 with alternative interface for mobile widget management.

In system 100, WMS 300 may obtain mobile widget 102 and widget catalog 302 from a unified widget manager (UWM) 200. UWM 200 provides a controlled point-of-entry into system 100 for mobile widget 102. In particular, UWM 200 may be operable to insure that each mobile widget 102 meets one or more predetermined architectural and/or operational widget standards for functioning within system 100. Additionally, UWM 200 provides a common, virtual marketplace that enables one or more mobile widget developers/providers 108 to introduce their respective mobile widget 102 to an operator 110, such as a wireless network carrier, of system 100. For example, widget developers/providers 108 may submit one or more mobile widgets 102 to UWM 200 via a developer interface 202, and operator/carrier 110 may access and review mobile widgets 102 at UWM 200 via an operator interface 204, where developer and operator interfaces 202 and 204 may be a network-accessible interface such as an extranet. Further, for example, via UWM 200, one or more developers/providers 108 and one or more operators/carriers 110 may access a widget virtual negotiation component 206, such as a widget bidding exchange, where an agreement may be reached regarding one or more of mobile widget pricing, mobile widget operation, mobile widget content updating, mobile widget placement in widget catalogs, mobile widget billing, developer/provider compensation, or operator/carrier mobile widget cost in system 100.

Additionally, in some aspects, system 100 may have a backend system 101 for analyzing the tracked data and transactions within system 100. In particular, backend system 101 may include an analytics component 1200 that receives and examines the data of system 100, and a reporting component 1300 that generates reports, including operator/carrier proprietary information 1302, based on the results of the analysis of analytics component 1200. Further, backend system 101 may include a billing component 1400 that accounts for transactions in system 100 and debits and/or credits one or more end users 104, developers/providers 108, operators/carriers 110, or advertisers 908. For example, end user 104 may purchase and download mobile widget 102 to a respective wireless communication device 700. This purchase transaction may be recorded by WMS 300 and reported to analytics component 1200, which extracts relevant information for use by reporting component 1300 and/or billing component 1400 to generate, respectively, an accounting of the transaction and a bill or invoice corresponding to the transaction. The accounting and the billing may represent, for example, one or more of a purchase price/account receivable to be debited to an end user account, an operator/carrier account payable to be credited to an operator/carrier account, a developer/provider account payable to be credited to a developer/provider account, or an advertiser account receivable to be debited to an advertiser account.

It should be noted that the components within and functionalities provided by system 100 may be configured in any manner. For example, the various functionalities of any single system component alternately may be performed by individual system components. As such, it should be noted that the aspects of system 100 may be rearranged in any of a variety of manners, and yet still achieve the stated functionality.

Further, it should be noted that the infrastructure components, e.g. the components to the right of wireless interface 106 in FIG. 1, may be communicatively coupled by one or any combination of wired or wireless links, referred to as infrastructure communication network 112. As such, infrastructure communication network 112 may be a wired network, a wireless network, or a combination wired/wireless network, for example including LANs, WANs, PSTNs, the Internet, circuit-switched and/or packet-switched networks.

Thus, system 100 provides one aspect of an end-to-end system for managing mobile widgets in a wireless network environment. Further details of the various system components and their aspects will now be discussed.

Infrastructure Element/Network Device

In system 100, the network-side or infrastructure elements may include one or more of any type of computer device, such as a network device, operable to perform the functionality described herein. In particular, the network-side or infrastructure elements that may include network device include, but are not limited to, one or any combination of the following system components: end user 104, developer/provider 108, operator/carrier 110, unified widget manager (UWM) 200, widget bidding exchange 230, widget management system (WMS) 300, digital locker 304, recommender 306, message router 500, content access server (CAS) 900, content provider 902, advertisement serving platform 1000, advertisement bidding exchange 1002, advertiser 1004, widget tracking component 1100, analytics component 1200, reporting component 1300, billing component 1400 and, generally, backend system 101.

Figure 4:
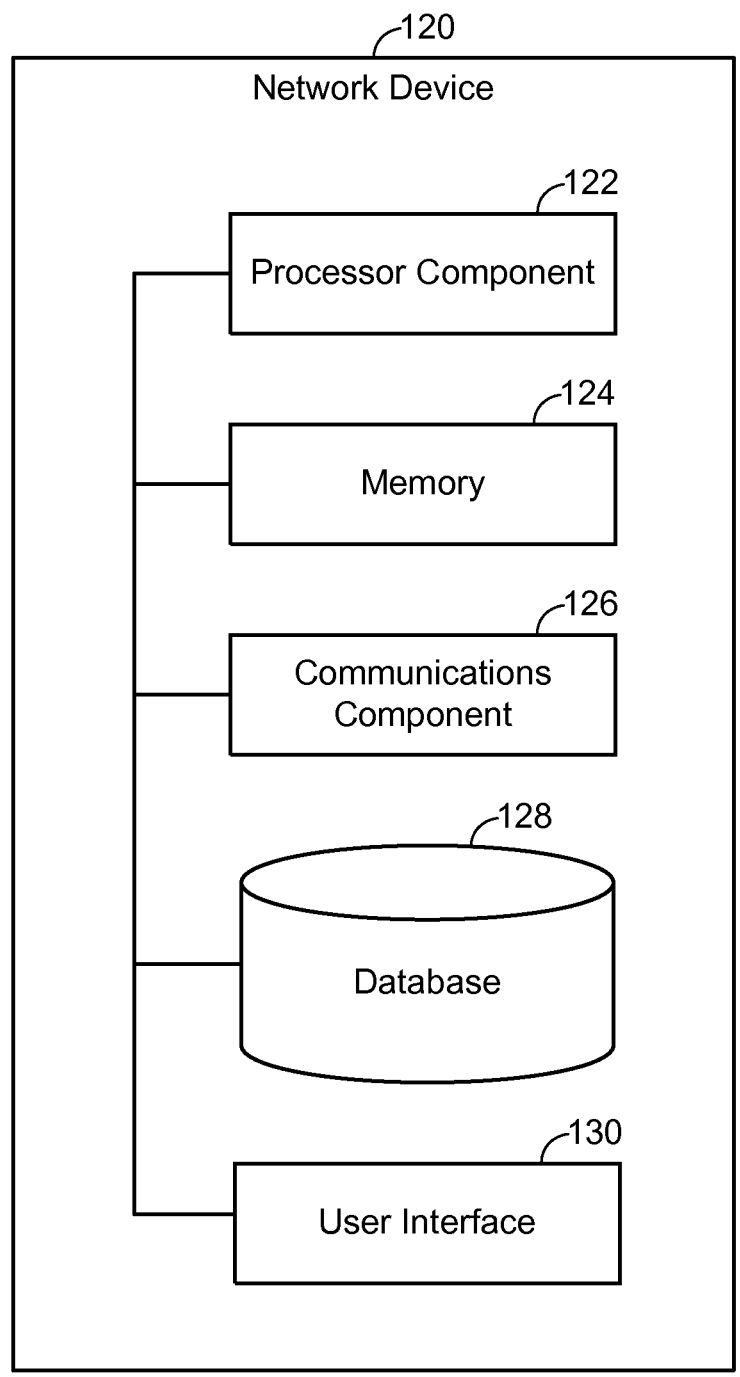
FIG. 4 is a schematic diagram of an aspect of a network device of the system of FIG. 1.

Referring to FIG. 4, in one aspect, such a computer device or network device may be represented by network device 120, which is operable to communicate with any other network-side or infrastructure elements of system 100 and/or with wireless communication device 700 (FIG. 1) and/or WMC 704 (FIG. 1). Network device 120 includes any type of network-based communication device, such as a network server operable on a communication network that links the components of system 100 (FIG. 1). For example, the communication network underlying system 100 (FIG. 1) may be a wired or wireless communication system, or a combination of both, and includes wireless interface 106, such as a wireless access network of operator/carrier 110 (FIG. 1) on which wireless communication device 700 operates.

Network device 120 includes a processor component 122 for carrying out processing functions associated with one or more of components and functions described herein. Processor component 122 can include a single processor, or multiple set of processors or multi-core processors. Moreover, processor component 122 can be implemented as an integrated processing system and/or a distributed processing system. In particular, processor component 122 is operable to execute a software program or application from memory in order to receive and process inputs and generate outputs corresponding to the functionality of the respective infrastructure element as described herein.

Network device 120 further includes a memory 124, such as for storing local versions of software programs or applications, including scripts, codes, algorithms, heuristics, neural networks, rules, fuzzy logic, and executable instructions, being executed by processor component 122. Memory 124 can include one or more types of random access memory (RAM), read only memory (ROM), and a combination thereof.

Further, network device 120 includes a communications component 126 that provides for establishing and maintaining communications with one or more other components utilizing hardware, software, and services as described herein. Communications component 126 may carry communications between components on network device 120, as well as between network device 120 and external devices, such as wireless communication device 700 (FIG. 1), other network-side or infrastructure elements, or other devices serially or locally connected to network device 120. Communications component 120 includes a receiver to receive communications and a transmitter to transmit communications. Further, communications component 120 includes the corresponding receive chain components and transmit chain components to enable exchanging messages according to one or more respective protocols.

Additionally, network device 120 may further include database 128, which can be any suitable combination of hardware and/or software, that provides for mass storage of data/information, data relationships, and software programs/applications employed in connection with aspects described herein.

Network device 120 may additionally include a user interface component 130 operable to receive inputs from a user of network device 120, and to generate outputs for presentation to the user. User interface component 130 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 130 may include one or more output devices, including but not limited to a display, a speaker, a haptic feedback mechanism, a printer, any other mechanism capable of presenting an output to a user, or any combination thereof.

Thus, network device 120 includes hardware, or software, or combinations of hardware and software, operable to enable performing the functionality of one or more of the network-side or infrastructure elements of system 100 (FIG. 1).

Unified Widget Manager

Figure 5:
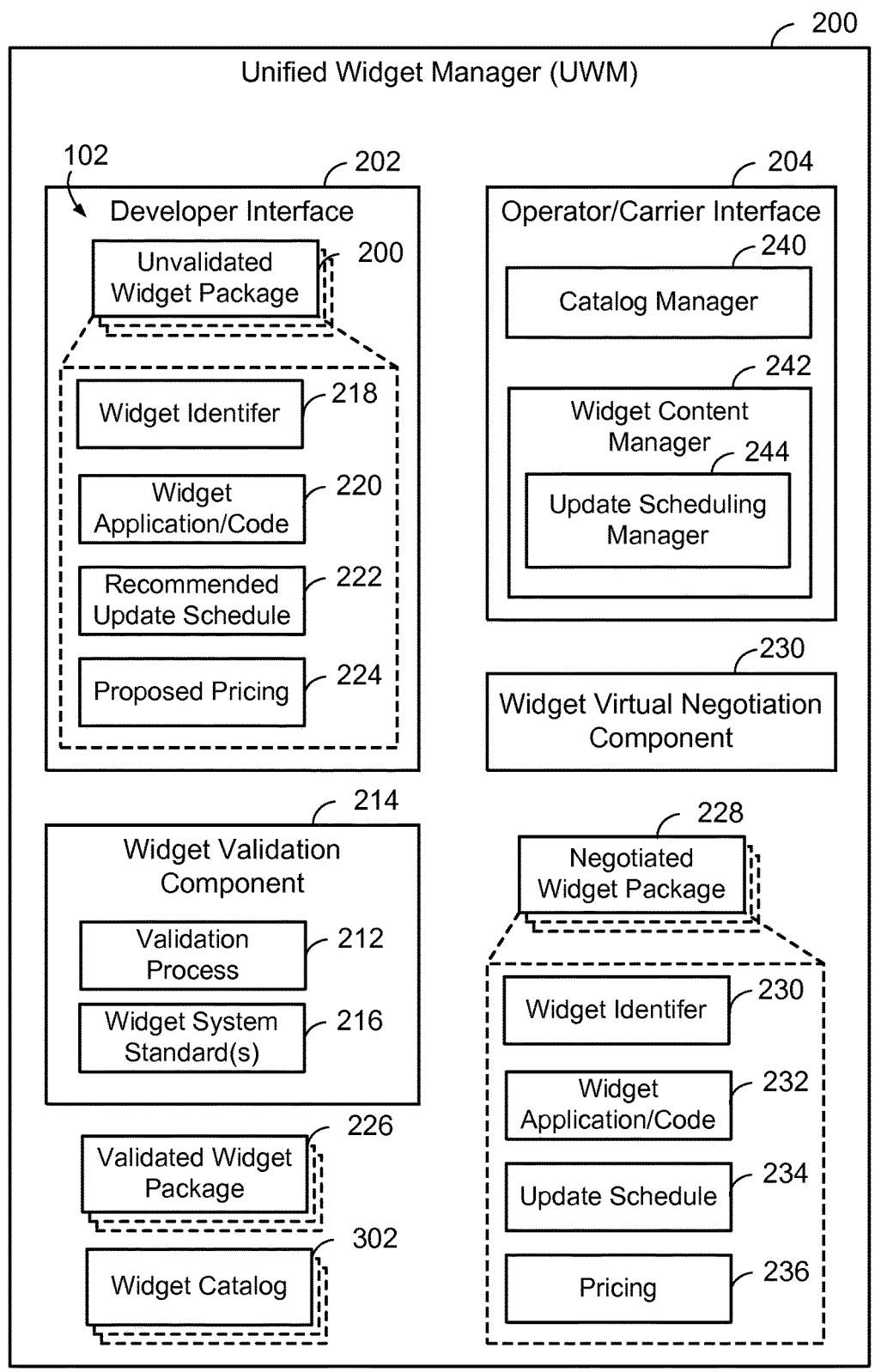
FIG. 5 is a schematic diagram of an aspect of the unified widget manager (UWM) of FIG. 1.

Referring to FIGS. 1 and 5, as discussed above, UWM 200 provides a clearinghouse for mobile widgets 102, which may be presented to system 100 by developer/provider 108 via developer interface 202 and which may be managed by operator/carrier 110 via operator/carrier interface 204.

Developer interface 202 provides an access point, such as an extranet, for developers/providers 108 to submit mobile widgets 102 to system 100. In some aspects, submitted mobile widgets 102 may be subject to a validation process 210 executable by a widget validation component 212, resulting in a respective submitted widget 102 being either a trusted widget or an untrusted widget or alternately being denied entry into system 100. Validation process 210 may be an automated process, a manual process, or a combination of both, that determines if submitted mobile widget 102 conforms to one or more widget system standards 216 and performs on system 100 as designed by developer/provider 108. If the submitted mobile widget 102 passes validation process 210, then the respective mobile widget 102 will be classified as a trusted widget. In some aspects, trusted mobile widgets may have a trust indicator, such as a digital certificate corresponding to UWM 200 or widget validation component 212 to indicate trustworthiness. If the submitted mobile widget 102 either fails validation process 210 or enters system 100 in another manner, such as via the public domain or from being directly defined by a user, then the respective mobile widget 102 may by considered an untrusted widget.

In some aspect, developer/provider 108 may submit mobile widget 102 to system 100 in the form of an unvalidated widget package 216, which represents a type of untrusted widget. Unvalidated widget package 216 may include the relevant components that define the respective widget, including its operation on system 100 and its pricing. For example, in one aspect, unvalidated widget package 216 may include: a widget identifier 218 to identify or describe the widget, and/or to identify targeted demographics or user behavioral categories to which the widget may be directed; widget application or code 220 comprising the instructions, objects, etc. to allow the respective widget to operate on a given computer platform, such as different types of wireless communication device 700 and/or on a personal computer (PC) using different technologies; a recommended update schedule 222 that defines a recommendation or suggestion of the developer/provider 108 of when the content represented by the widget should be updated—for example, the temporal aspects of widgets may vary, as so some widgets such as a stock watcher widget may preferably have frequent updates during market hours and much less frequent updates after market hours, versus a weather widget which may preferably be updated only a few times per day; and proposed pricing 224 that defines one or more price-related and/or marketing/selling-related aspects of the widget, such as one or more of a desired end user price, developer/provider compensation or fee or royalty, discounts, carrier-specific pricing, catalog placement considerations including catalog type and slotting position, etc. Upon passing through validation process 210 and achieving widget system standard(s) 214 as defined by widget validation component 212, the respective unvalidated widget package 216 may be allowed into system 100 as a validated widget package 226, which represents a type of trusted widget.

Mobile widgets 102 accepted by UWM 200 may be accessed and modified by both developer/provider 108 and operator/carrier 110 via a widget virtual negotiation component 206 that may be entered, for example, via developer interface 202 and operator/carrier interface 204, respectively. Similar to developer interface 202, operator/carrier interface 204 provides an access point, such as an extranet, for operator/carrier 110 to interact with UWM 200. For example, one or more operators/carriers 110 may review mobile widgets 102, or in some aspects validated widget packages 226, to determine if they want to include the respective widget in one or more widget catalogs 302 available to end users 104 of system 100. Further, for example, widget virtual negotiation component 206 allows developers/providers 108 and operators/carriers 110 to negotiate various aspects of a respective mobile widget 102, such as widget pricing, developer compensation, operator compensation, update scheduling, etc. In one aspect, for example, widget virtual negotiation component 206 may include a widget bidding exchange including auction functionality to control and report the results of an auction process used to define agreed upon parameters corresponding to a respective mobile widget 102. In any case, in some aspects, after agreement between developers/providers 108 and operators/carriers 110 on the final set of widget parameters, the mobile widget 102 may be defined by a negotiated mobile widget package 228. For example, negotiated mobile widget package 228 may include: a widget identifier 230 to identify or describe the widget and/or to identify targeted demographics or user behavioral categories to which the widget may be directed, which may be the same as identifier 218 or which may be operator/carrier specific; widget application or code 232 comprising the instructions, objects, etc. to allow the respective widget to operate on a given computer platform, which may be the same as widget application or code 220 or which may be operator/carrier specific; a negotiated update schedule 234 that defines negotiated or initially accepted content update schedule, which may be the same as recommended update schedule 222 or which may be operator/carrier specific; and negotiated pricing 236 that defines one or more price-related and/or marketing/selling-related aspects of the widget as agreed upon during the negotiation, which may be the same as proposed pricing 224 or which may be operator/carrier-developer/provider specific or negotiation specific.

Figure 6:
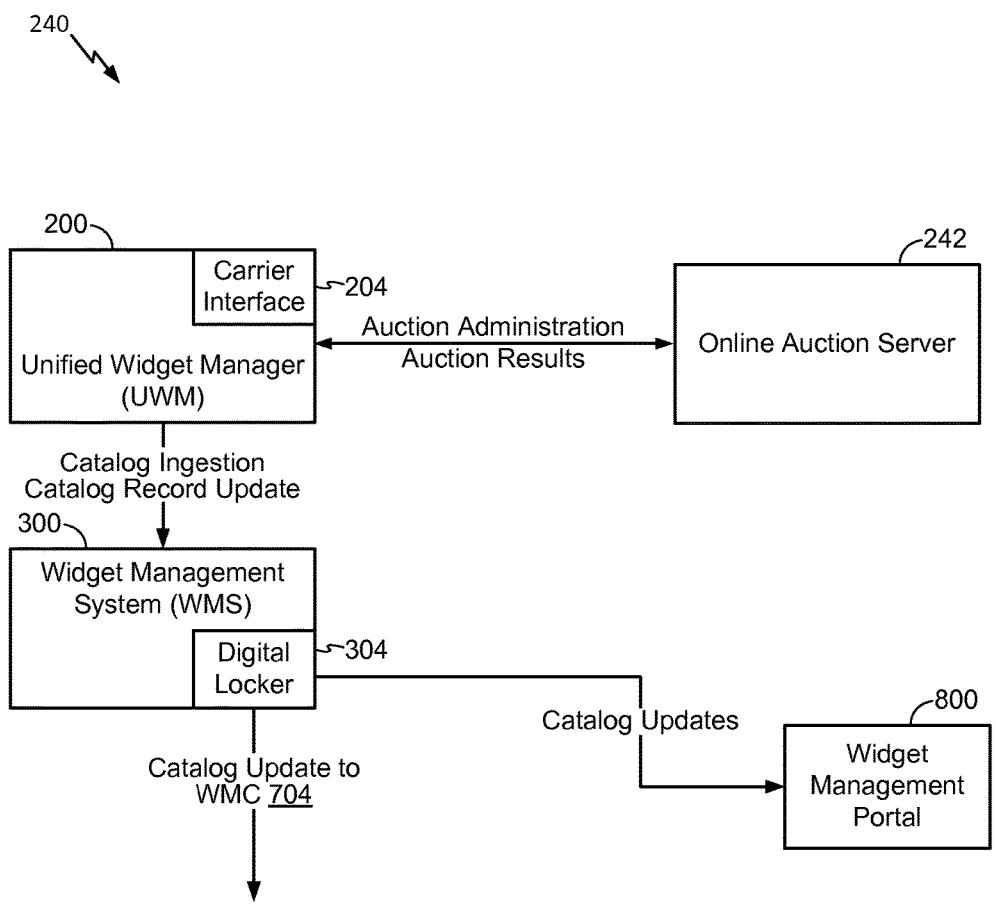
FIG. 6 is a schematic diagram of an aspect of an auction architecture of the system of FIG. 1.
Figure 7:
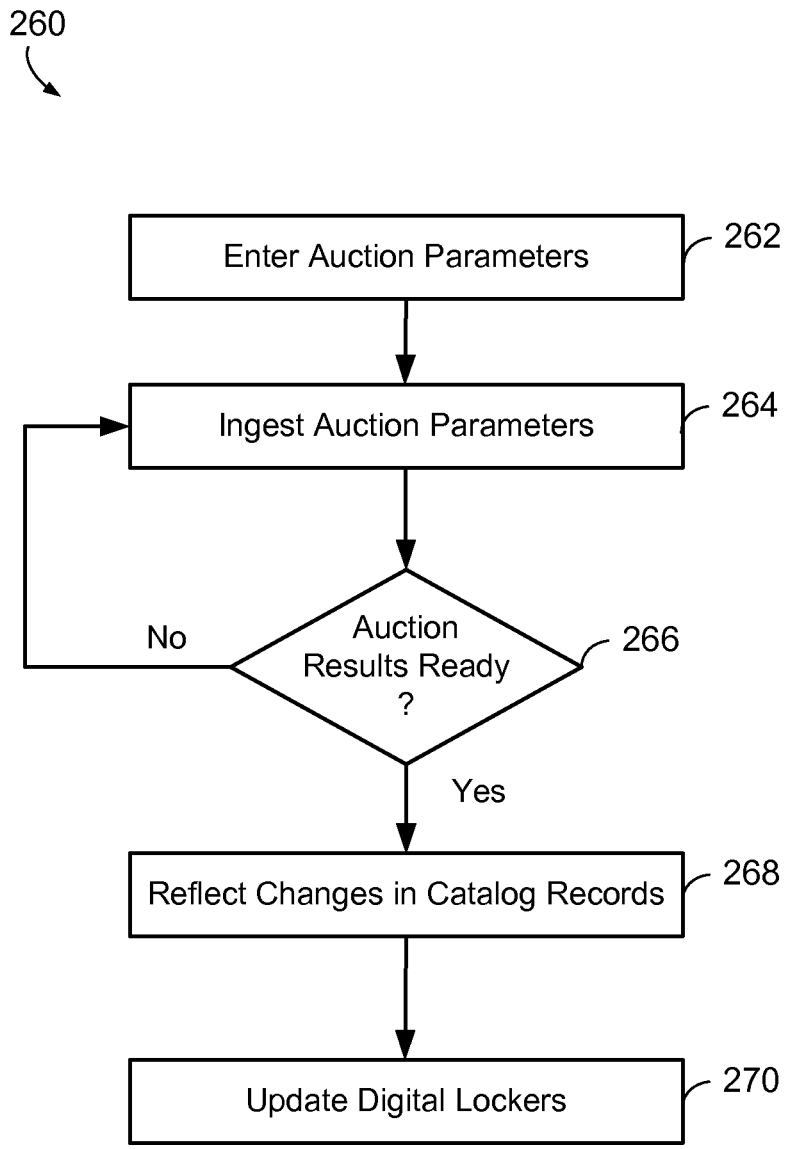
FIG. 7 is flow diagram of an aspect of an auction method of the system of FIG. 1.

Referring specifically to FIGS. 6 and 7, in one non-limiting example, one aspect of an architecture 240 and method 260 corresponding to widget virtual negotiation component 206 (FIGS. 1 and 5) include an online auction server 242 operable to interact with UWM 200 to perform auction administration duties and to transmit auction results. For example, online auction server 242 may be operable to present mobile widget inventory to operators/carriers 110 (FIG. 1), as well as biddable parameters associated with each mobile widget, such as pricing and placement (FIG. 7, action 262). For example, biddable parameters corresponding to mobile widget placement may include, but are not limited to, parameters such as slotting placement for position on a widget wall, a "featured" parameter corresponding to featuring the respective mobile widget in the display of a shopping mobile widget, and slotting placement for each category of widgets or for each widget catalog. Further, the mobile widgets presented by online auction server 242 may have additional targeting metadata, such as the data of the targeted demographics or user behavioral categories to which the widget may be directed. As such, operator/carrier 110 (FIG. 1) is able to access biddable items and enter bids corresponding thereto (FIG. 7, actions 264 and 266). Based on the auction results (FIG. 7, action 266), UWM 200 modifies the records of corresponding mobile widgets 102 and/or mobile widget catalogs 302 (FIG. 7, action 268), which are received by WMS 300 and updated in the corresponding records of digital locker 304 (FIG. 7, action 270). Thus, as a result, such updated records are then made available to WMC 704 and widget management portal 800 to insure end user 104 (FIG. 1) has access to the latest information.

Additionally, in some aspects, UWM 200 allows operator/carrier 110 to organize one or more mobile widgets 102 into one or more widget catalogs 302, for example, using a catalog manager component 240 accessible via operator/carrier interface 204. In one aspect, for example, operator/carrier 110 selects negotiated widget packages 228 for inclusion in one or more widget catalogs 302, which may be organized in many different fashions, such as by widget functionality, etc. Further, for example, each widget catalog 302 includes a listing of mobile widgets 102 that may be organized in a predetermined fashion, such as based on payments for a given slotting placement, etc. Widget catalog 302 may be defined by a catalog record that includes mobile widget metadata describing each mobile widget 102 and corresponding parameters that may be of interest to a catalog viewer, such as one or any combination of a name of the widget, a description of the widget functionality, a graphic or visual representation of the widget, widget pricing and purchasing information, etc. Further, for example, the listing of mobile widgets 102 in widget catalogs 302 may be varied after creation of widget catalog 302, such as based on end user preferences, and/or end user behavioral information, and/or end user device capabilities. In any case, catalog manager component 240 further allows operator/carrier 110 to transmit widget catalogs 302 to WMS 300 so that the listed mobile widgets 102 may be made available to end users 104.

Further, UWM 200 may further include a widget manager component 242 that allows operator/carrier 110 to change one or more parameters or characteristics of mobile widget 102. For example widget manager component 242 may allow operator/carrier 110 to: activate or deactivate a respective mobile widget 102 for operation on system 100; set or change a widget identifier, such as identifier 230; set or change widget application/code, such as application/code 232; set or change a widget update schedule, such as update schedule 234; and/or set or change pricing information, such a pricing 236. In one aspect, for example, widget manager component 242 may further include an update scheduling manager 244 to specifically allow interaction with and setting of updates schedules for one or a group of mobile widgets 102. For example, update scheduling manager 244 may include logic, algorithms, heuristics, fuzzy logic, neural networks, etc., operable to provide automated update schedules for individual or groups of mobile widgets 102 or end users 104, for example, that take into account and/or balance end user considerations, mobile widget characteristics such as temporal aspects of content, and operator/carrier considerations.

Thus, UWM 200 provides an access point and interfacing functionality for developers/providers 108 to submit mobile widgets 102 into system 100. Further, UWM 200 provides validation functionality to approve mobile widgets 102 for operation within system 100. Additionally, UWM 200 provides a clearinghouse or marketplace that allows developers/providers 108 and operators/carriers 110 to negotiate and agree upon financial and operational parameters of mobile widgets 102. Moreover, UWM 200 provides an access point and interfacing functionality for operators/carriers 110 to manage widget catalogs 302 and the content and characteristics of mobile widgets 102 within system 100.

Widget Management System

Figure 8:
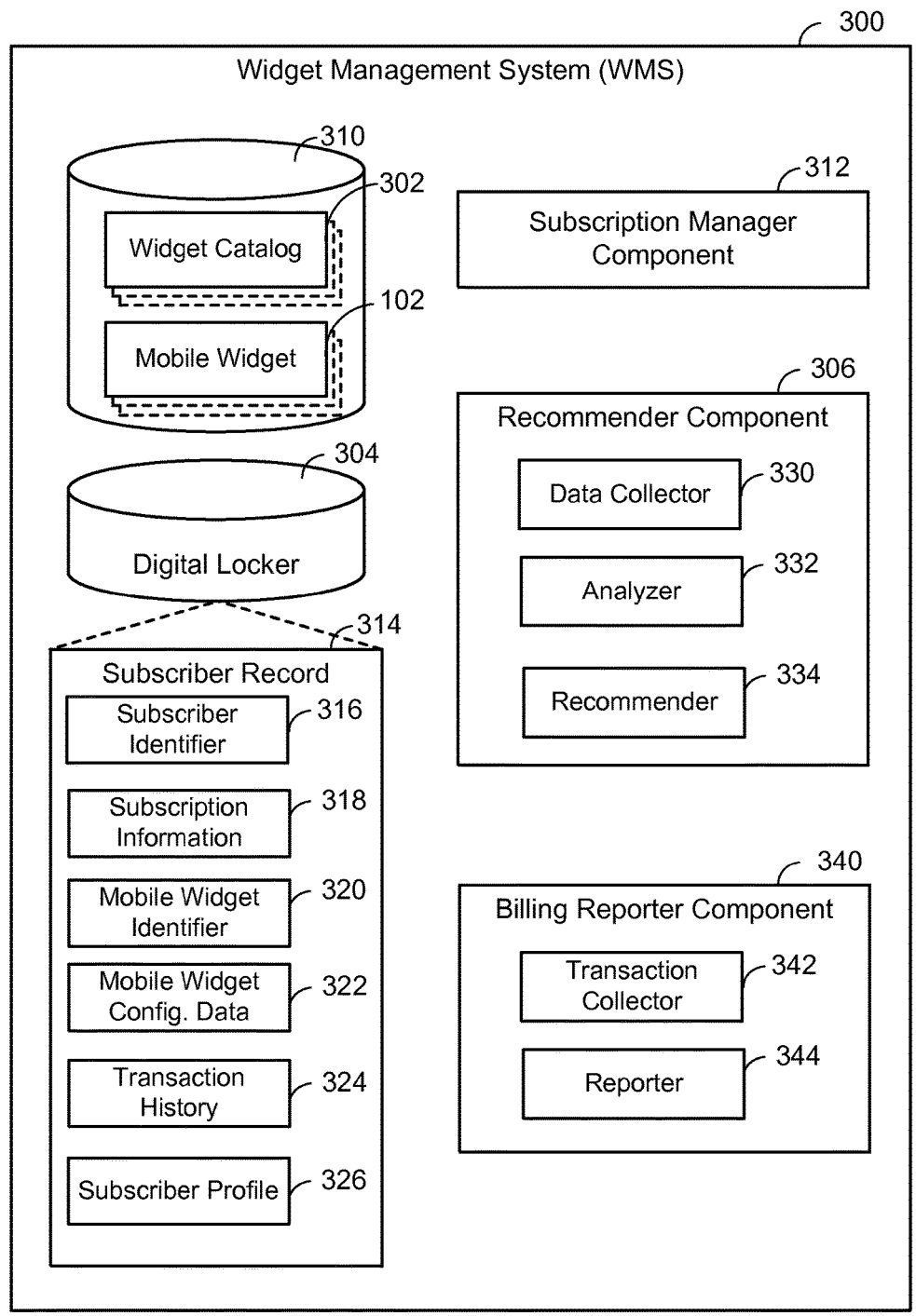
FIG. 8 is a schematic diagram of an aspect of the widget management system (WMS) of FIG. 1.

Referring to FIGS. 1 and 8, WMS 300 is an infrastructure element that interacts with UWM 200 to obtain mobile widgets 102, widget catalogs 302, and widget modifications such as changes to widget operational or configuration parameters. Further, WMS 300 provides an end user-facing interface that allows end user 104, via WMC 804 on wireless communication device 700 and/or via widget management portal 800, to view, select, purchase/download, and configure mobile widgets 102. Additionally, WMS 300 provides management functionality for mobile widget distribution to wireless communication devices, for storing and implementing mobile widget configuration and subscription parameters, and for effecting, recording, and reporting on mobile widget transactions.

In one aspect, for example, WMS 300 includes widget database 310 for storing one or more widget catalogs 302 and/or one or more mobile widgets 102. Further, WMS 300 may include a subscription manager component 312 that interacts with WMC 704 and/or widget management portal 800 to allow end user 104 to access widget catalog 302 or individual mobile widgets 102 for purchase and/or download onto wireless communication device 700.

Further, subscription manager component 312 may be operable to control one or a plurality of subscriber records 314 in a database such as digital locker 304. Each subscriber record 314 includes information on each end user and on each mobile widget 102 corresponding to each end user to enable the management and control of mobile widgets for subscribers. For example, in one aspect, subscriber record 314 may include one or any combination of: a subscriber identifier 316, such as a name, subscriber number, phone number, wireless device serial number, etc. that may be used to uniquely identify a given end user 104 and/or wireless communication device 700; subscription information 318 including a subscription identifier, a subscription description, a subscription key, a license, a validity time period, a service level, and any other information relevant to enabling operation of a mobile widget on a wireless device—such subscription information 318 may authorize end user 104 and/or wireless communication device 700 to receive or operate an individual or a class of mobile widgets, and may further authorize or identify a service level that may allow one of a number of levels of service corresponding to a mobile widget, wherein such service levels may regulate a number or volume of content updates, message exchanges, etc. performed by the respective mobile widget; mobile widget identifier(s) 320 to identifier one or more mobile widgets 102 purchased/downloaded to wireless communication device 700 and/or WMC 704 and authorized for operation; mobile widget configuration data 322, corresponding to each mobile widget identifier 320, that defines how corresponding mobile widget 102 is presented and/or operates, which may include user-defined/customized configuration data entered by end user to personalize the respective mobile widget according to user preferences; a transaction history 324 that includes transaction details relating to end user 104 accessing, purchasing/downloading, and configuring a respective mobile widget 102; and a subscriber profile 326 that includes information that describes end user 104, defines demographic information of end user 104, and/or defines behavioral information of end user 104, wherein such information may be utilized for marketing purposes, such as to recommend mobile widgets to end user 104 and/or to provide advertising to end user 104. Thus, WMS 300 stores and controls the relationships between each mobile widget 102 and each subscriber or end user 104 in system 100 through digital locker 302.

Optionally, WMS 300 may include recommender component 306 operable to interact with subscription manager component 312, digital locker 304, widget database 310, other infrastructure elements such as UWM 200 or CAS 900 to obtain widget slotting information or widget advertising-related information and other external entities, such as providers of marketing and/or sales data, to suggest mobile widgets 102 that may be of interest to subscriber/end user 104. For example, in one aspect, recommender component 306 may include a data collector module 330 operable to perform one or any combination of: gathering data about available mobile widgets, such as mobile widget metadata; gathering data about subscriber/end user, such as subscription information 318, transaction history 324 and subscriber profile information 326; or gathering other internal or external information relating to widget popularity, widget profitability, widget sales, widget advertising, widget positioning/slotting, widget marketing, etc. Further, recommender component 306 may include an analyzer module 332 operable to execute one or more algorithms, heuristics, fuzzy logic, etc. in order to determine potential matches between one or more of the available mobile widgets or catalogs, the available subscriber/end user data, and/or external widget-related information. Additionally, based on the results of analyzer module 332, recommender component 306 may further include a recommender module 334 operable to generate a message including references to or links to or identification of one or more mobile widgets 102 or widget catalogs 302 that may be of interest to the subscriber/end user 104 and/or that may be of an economic interest of operator/carrier 110 to promote to subscriber/end user 104. Thus, recommender component 306 is operable to dynamically suggest or recommend mobile widgets 102 or widget catalogs 302 to subscribers/end users 104 based on any number of configurable parameters.

Further, in some aspects, WMS 300 may additionally include a billing reporter component 340 that keeps track of end user 104 interactions with WMS 300 in downloading/purchasing of mobile widgets 102 and reports such activity to backend system 101 for accounting and billing purposes. For example, billing reporter component 340 may include a transaction collector module 342 operable to interact with subscription manager component 312 and/or digital locker 304 in order to gather transaction data relating to the download or purchase of mobile widgets 102 by subscribers/end users 104. Further, a reporter module 344 is operable to interact with transaction collector module 342 and generate a message for transmission to backend system 101 documenting the collected transactions, including the transaction details identifying aspects of the corresponding subscriber information, mobile widget metadata and the transaction-specific data such as purchase price. Thus, billing reporter component 340 is operable to update backend system with billing-related information.

Message Router

Figure 9:
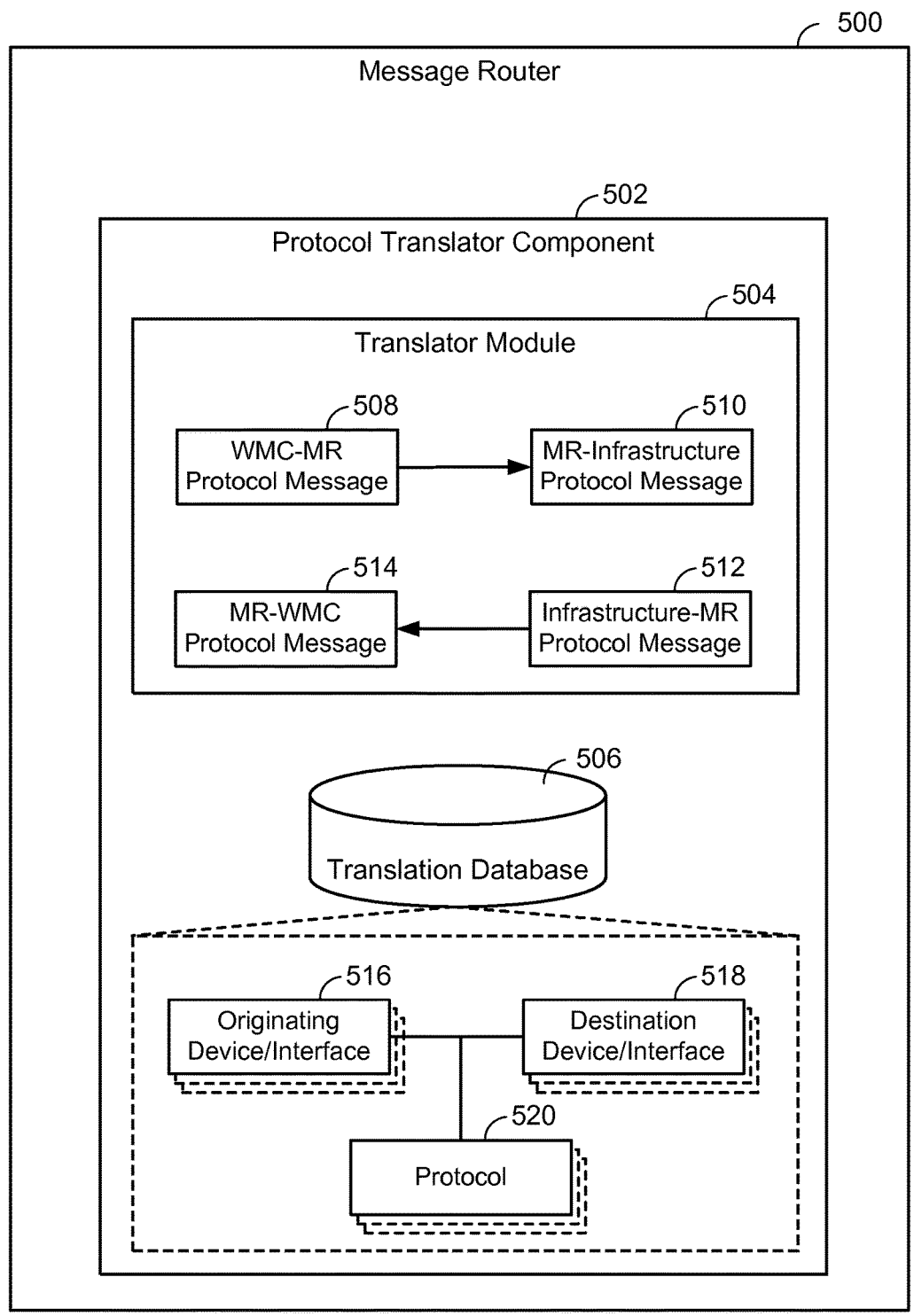
FIG. 9 is a schematic diagram of an aspect of the message router of FIG. 1.

Referring to FIGS. 1 and 9, in one aspect, system 100 includes a network element, such as message router (MR) 500, which provides a communication interface between the network infrastructure, such as WMS 300 and CAS 900, and wireless communication device 700 and/or WMC 704. In particular, in one aspect, message router 500 communicates directly with WMC 704 by sending and/or receiving over-the-air (OTA) messages via wireless interface 106, and further relays those messages to WMS 300 and/or CAS 900 via one or more infrastructure communications networks.

It should be noted that wireless interface 106 between message router 500 and WTC 704 may have a different transport protocol than the one or more infrastructure networks connecting message router 500, WMS 300 and CAS 900. As such, in some aspects, message router 500 may include a protocol translator component 502 to enable message router 500 to exchange messages between device or transport mediums operating with different protocols. For example, protocol translator component 502 may include a translator module 504 having translation logic operable to access a translation database 506 in order to convert a message from one protocol to another protocol. For example, translator module 504 is operable to translate a WMC-MR protocol message 508, for example a WMC originated message transmitted according to the protocol of wireless interface 106, into an MR-infrastructure message 510, for example a message transmitted according to the protocol of the corresponding infrastructure communication network 112. Similarly, for example, translator module 504 is operable to translate a infrastructure-MR protocol message 512, for example an infrastructure originated message transmitted according to the protocol of the corresponding infrastructure communication network 112, into an MR-WMC message 514, for example a message transmitted according to the protocol of wireless interface 106. In performing such message translation, translator module 504 is operable to access a local or remote translation database 506 that stores relationships and data corresponding to an originating device/interface 516, a destination device/interface 518, and communication protocols 520. For example, using translation database 506, translator module 504 is able to identify or determine the corresponding protocol used for a message received from a respective originating device or transported over a corresponding originating interface, as defined by the data of originating device/interface 516. Similarly, for example, using translation database 506, translator module 504 is able to determine the corresponding protocol to use for a message destined for a respective destination device or to be transported over a corresponding destination interface, as defined by the data of destination device/interface 518. It should be noted that originating device/interface 516 and destination device/interface 518 may be combined, for example, to provide relationships between devices and/or interfaces and corresponding protocols 520.

In any case, message router 500 is operable to transport messages in any desired protocol. For example, such protocols can include hypertext transfer protocol (HTTP), an Internet Protocol (IP) socket protocol, a short message service (SMS) protocol, and any wired and/or wireless network protocols, such as code division multiple access (CDMA)-based protocols and global system for mobile communications (GSM)-based protocols.

Wireless Interface

Referring to FIG. 1, wireless interface 106 may be any one or any combination of a variety of wireless communication systems. Such systems often employ different spectrum bandwidths and/or different air interface technologies. Exemplary systems include one or any combination of the wireless systems discussed above.

Infrastructure Communication Network

Referring to FIG. 1, infrastructure communication network 112 may be any one or any combination of a variety of wired or wireless communication systems, or a combination of both. Exemplary systems include one or any combination of the wired or wireless systems discussed above.

Wireless Communication Device and Widget-Related Components

Figure 10:
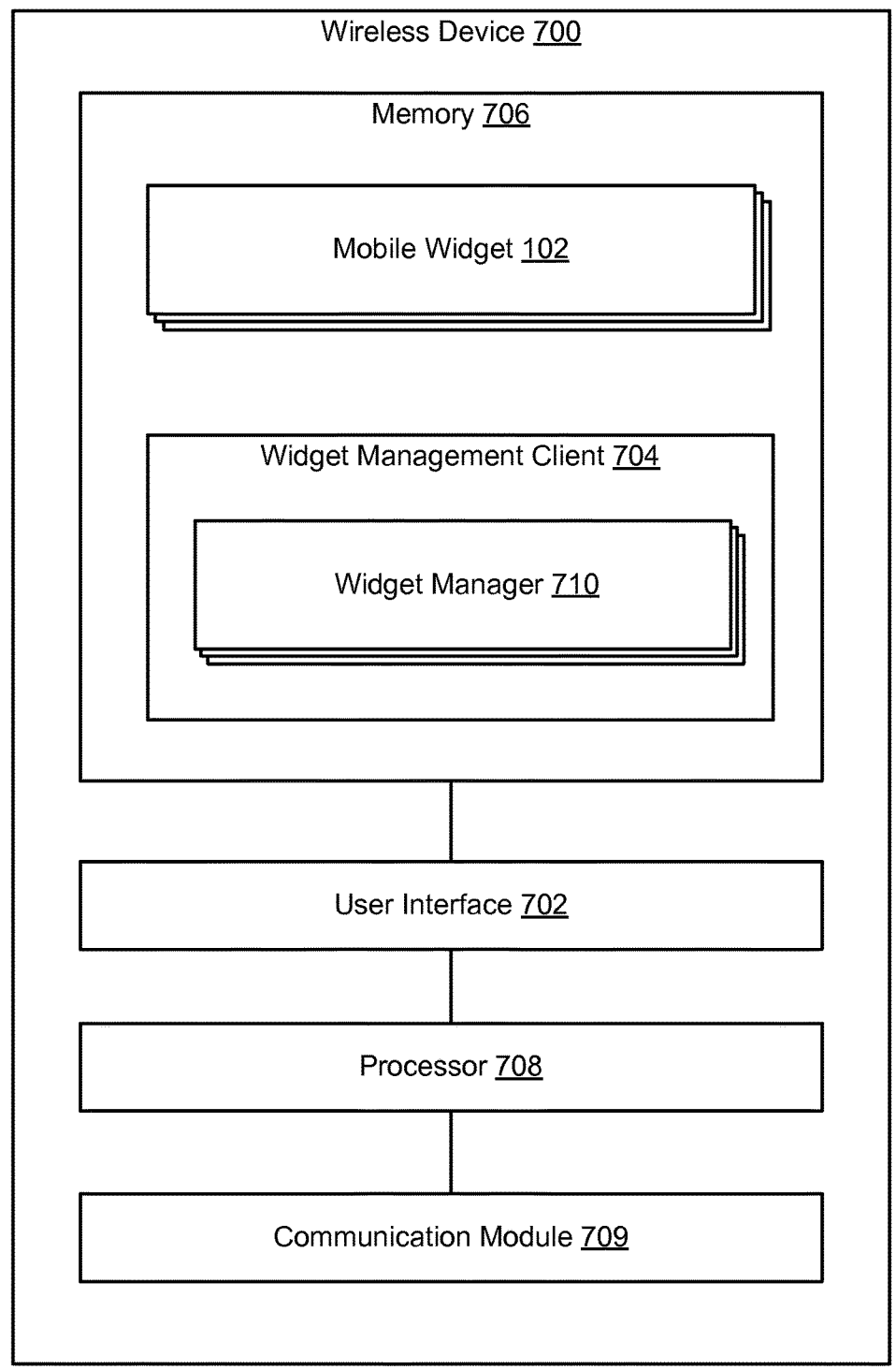
FIG. 10 is a schematic diagram of an aspect of the wireless device of FIG. 1.

FIG. 10 represents a high-level block diagram of a wireless device 700 operable to store, present, and manage mobile widgets 102. As previously noted, the wireless device may include any device capable of operating on a wireless communication system. For example, wireless device 700 may be embodied as a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem. The wireless communication system may any of variety of systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile, etc.) ad hoc network systems often using unpaired unlicensed spectrums, and 802.xx wireless LAN or BLUETOOTH techniques.

The wireless device 700 includes a memory 706 and a processor 708 that is in communication with memory 706. Processor 708 is operable for carrying out processing functions associated with one or more of components and functions described herein. Processor 708 can include a single or multiple set of processors or multi-core processors. Moreover, processor 708 can be implemented as an integrated processing system and/or a distributed processing system. Memory 706 is operable for storing applications being executed by processor 708, such as mobile widgets 102. Memory 706 can include random access memory (RAM), read only memory (ROM), and a combination thereof.

Additionally, wireless device 700 includes user interface 702 operable to receive inputs from a user of wireless device 700, and to generate outputs for presentation to the user. Thus, user interface 702 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 702 may include one or more output devices, including but not limited to a display, a speaker, a haptic feedback mechanism, a printer, any other mechanism capable of presenting an output to a user, or any combination thereof. In aspects herein disclosed user interface 702 may include a display operable to provide a visual presentation of widgets 102, a touch sensitive display operable to provide a visual presentation and receive inputs to the widgets 102 and/or a keypad to receive inputs to the widgets 102 or the like.

Memory 708 stores one, two, or a plurality of mobile widgets 102. As previously noted mobile widgets 102 are applications executable on the wireless device 700 that provide specific functionality, such as content delivery, to the user via a specialized user interface 702, such as a visual display. In most instances, mobile widgets 102 may provide the user access to web/Internet-based content that is delivered over the wireless network. However, in other instances, the mobile widgets 102 may provide for access to content that is device-based, such as, for example, current battery status, current location, or the like.

Additionally, memory 708 stores a Widget Management Client (WMC) 704 that includes a corresponding widget manager 710 for each mobile widget application 102 stored in the memory 708. WMC 704 is executable to wirelessly obtain one or more mobile widgets 102, from the wireless communication network and supervise mobile widget operation. Additionally, WMC 704 and, specifically widget managers 710, may be executable to track mobile widget activities on wireless communication device 700, report such activities to a network component, such as a widget tracking component 1100. Also, the widget managers 710 may provide management over the schedule for updating content and management cover the configuration of the presentation of the content on the user interface 702.

Figure 11:
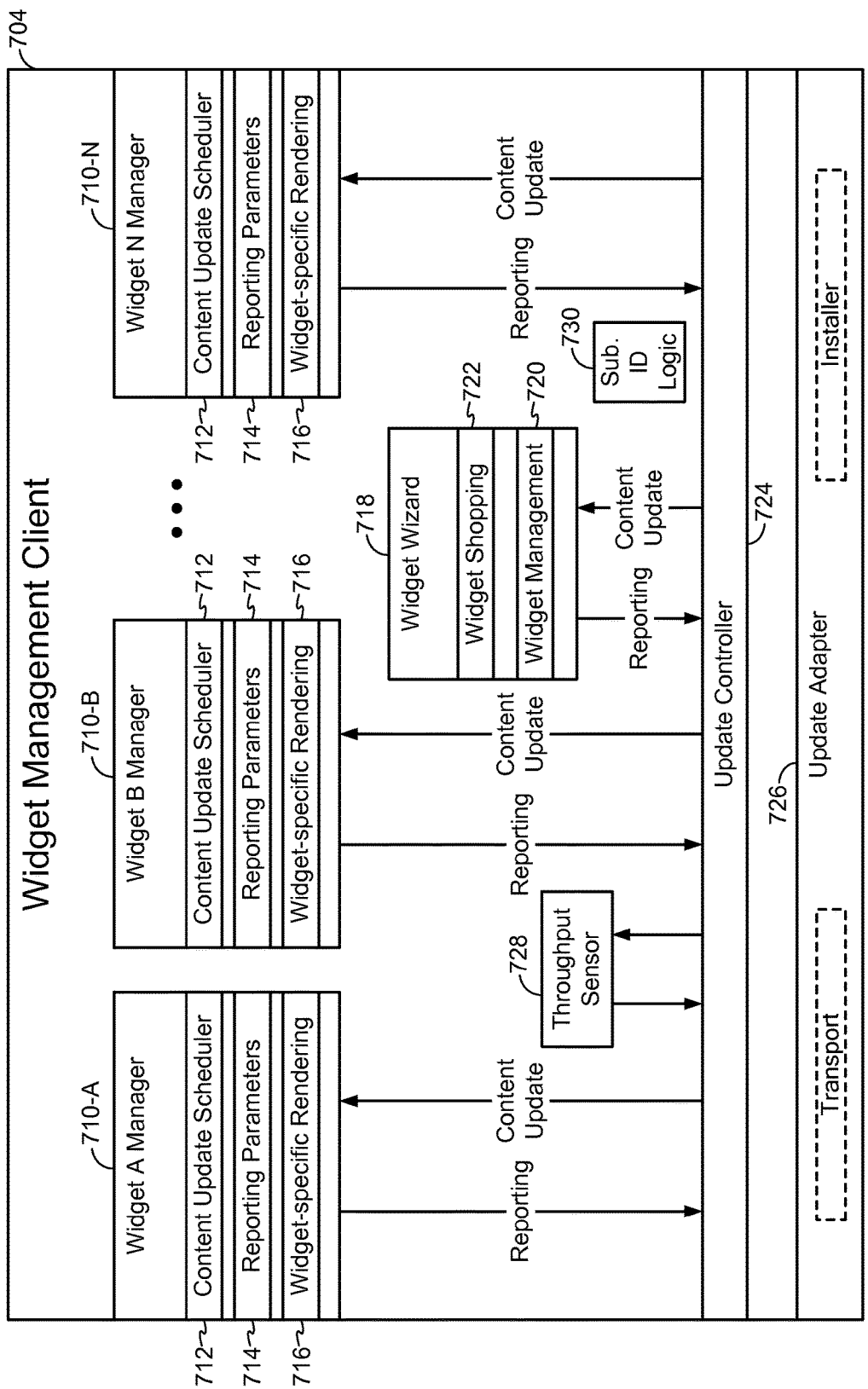
FIG. 11 is a schematic diagram of an aspect of the widget management client (WMC) of FIG. 1.

FIG. 11 provides a more detailed block diagram representation of the Widget Management Client (WMC) 704, which is stored on the wireless communication device 700. The WMC includes one or more widget managers 710 each corresponding to a mobile widget 102 stored on the wireless device 700. The illustrated aspect of FIG. 11 depicts widget managers, 710-A, 710-B and 710-N, where N represents the last widget manger 710 from among the plurality of widget managers.

Widget manager 710 includes a content update scheduler 712 that includes logic that is operable to be update the schedule for content delivery based on one or more preconfigured content delivery attributes. Content delivery attributes may include, but are not limited to, widget usage, time of day/week/month/year, user/device location or the like. For example, widget usage may dictate that more frequently accessed widgets (e.g., widgets that are clicked-on or the like) are provided more frequent content updates while less accessed widgets are provided less frequent content updates. In another example, the logic may determine what time of day a user is most likely to access a widget and, in turn, schedule more frequent content updates during that time. Additionally, the logic may associate location with content updates, such that when the user/device is the vicinity of a specified location, more or less frequent updates occur. For example, if a user is within the vicinity of a sports stadium, the logic may be configured to provide more frequent updates for a sports information-related widget.

It should be noted that while the content update scheduler 712 provides logic to determine update schedules based on one or more content delivery attributes; the schedule can also be based on network preferences/factors for content delivery and/or user configuration of content schedules. Therefore, the content update schedule 712 may additionally include logic that provides for prioritizing, weighting, or otherwise factoring content delivery based on the content delivery attributes, the network preferences/factors, and/or the user configuration. Additionally each widget manager 710 may be configured such that the user may override the content update scheduler 712 and either provide for their own content update schedule via an option in the widget management module 722 of the widget wizard 718. Additionally the widget may be configured through the widget management module 722 of the widget wizard 718 with a button or other user interface that allows for the user to instantaneously request a content update.

Figure 12:
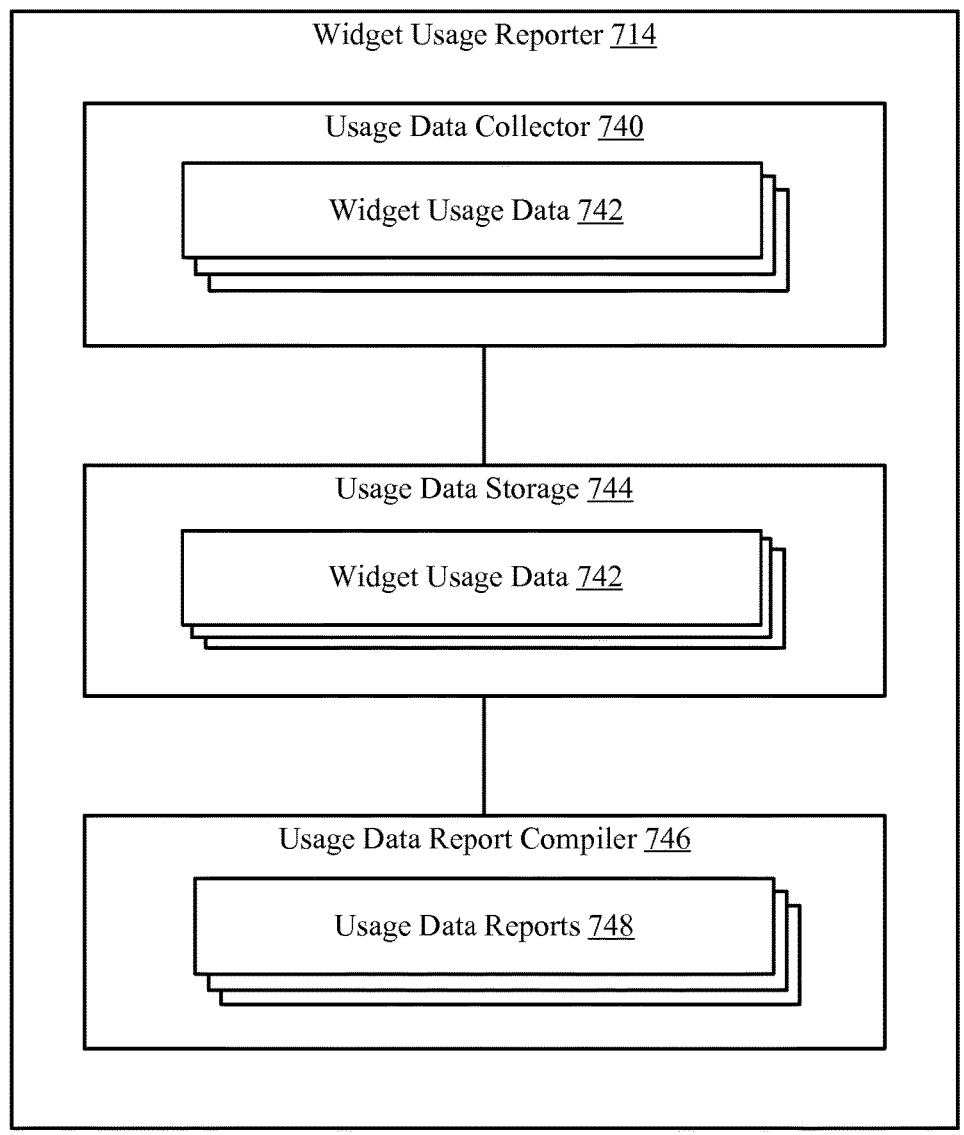
FIG. 12 is a schematic diagram of an aspect of a widget usage reporter of the system of FIG. 1.

Widget manager 710 also includes widget usage reporter 714 that includes logic operable for collecting and reporting widget usage information. FIG. 12 provides a more detailed block diagram of the widget usage reporter 714. The reporter 714 may include usage data collector 740 operable to collect widget usage data 742. The widget usage data may include, but is not limited to, such as widget access frequency, the depth of the access (i.e., how many click-throughs the widget undergoes during an access), the time of day/week that the widget is accessed and the like. The usage reporter 714 may additionally usage data storage 744 or optionally the widget usage data 742 may be stored in another data storage component external from the widget usage reporter 714 or the widget management client 704. The usage reporter 714 may additionally include a usage data report compiler 746 operable for compiling raw usage data into one or more usage data reports 748 based on network operator, widget developer and/or third party report criteria. Alternatively, in other aspects, the widget usage reporter may communicate raw widget usage data 742 to the network.

The collected widget usage information, either raw widget usage data 742 or compiled usage reports 748, to network entities. For example, the widget usage data 742 may be communicated to a network entity, such as digital locker 304 of Widget Management System (WMS) 300 (FIGS. 1 and 8). The WMS may implement the usage data 742 to determine content update schedules for the widget, to prioritize widgets in the user's personal widget catalog or the like. Additionally, the WMS 300 may communicate the usage information to a backend system 101 (FIG. 1) for reporting purposes and/or billing purposes.

Referring again to FIG. 11, widget manager 710 additionally includes widget-specific renderer 716 that includes logic operable for presenting the widget 102 on the wireless device 700 based on one or more rendering attributes. Rendering attributes widget usage, time of day/week/month/year, user/device location or the like. For example, widget usage may dictate that more frequently accessed widgets (e.g., widgets that are clicked-on or the like) are provided on the initial wall of the user interface or in a prominent position on the user interface. In another example, the logic may determine that the date is a Sunday during the fall season and therefore a football score reporting widget may be provided on the initial wall of the user interface or in a prominent position on the user interface. It should be noted that while the widget-specific renderer 716 provides logic to determine where a widget should be rendered on a display the renderer 716 may also provide for user configuration of rendering rules that may override or augment the rendering decision made by the logic.

The WMC 704 additionally includes a widget user interface, such as widget wizard 718, operable to provide the user with an interface to manage which widgets 102 are stored and presented on the wireless device 700, as well as an interface to purchase or otherwise obtain widgets from a marketplace. In addition to a wireless device-based user interface, such as the widget wizard 718, the system 100 may include a network-based user widget management portal 800 (FIG. 1), which provides for the device user to access the network from another wired or wireless device, such as a PC or the like, to make changes to the configuration settings, purchase/obtain additional widgets or otherwise manage the widgets presented on the wireless device.

Figure 13:
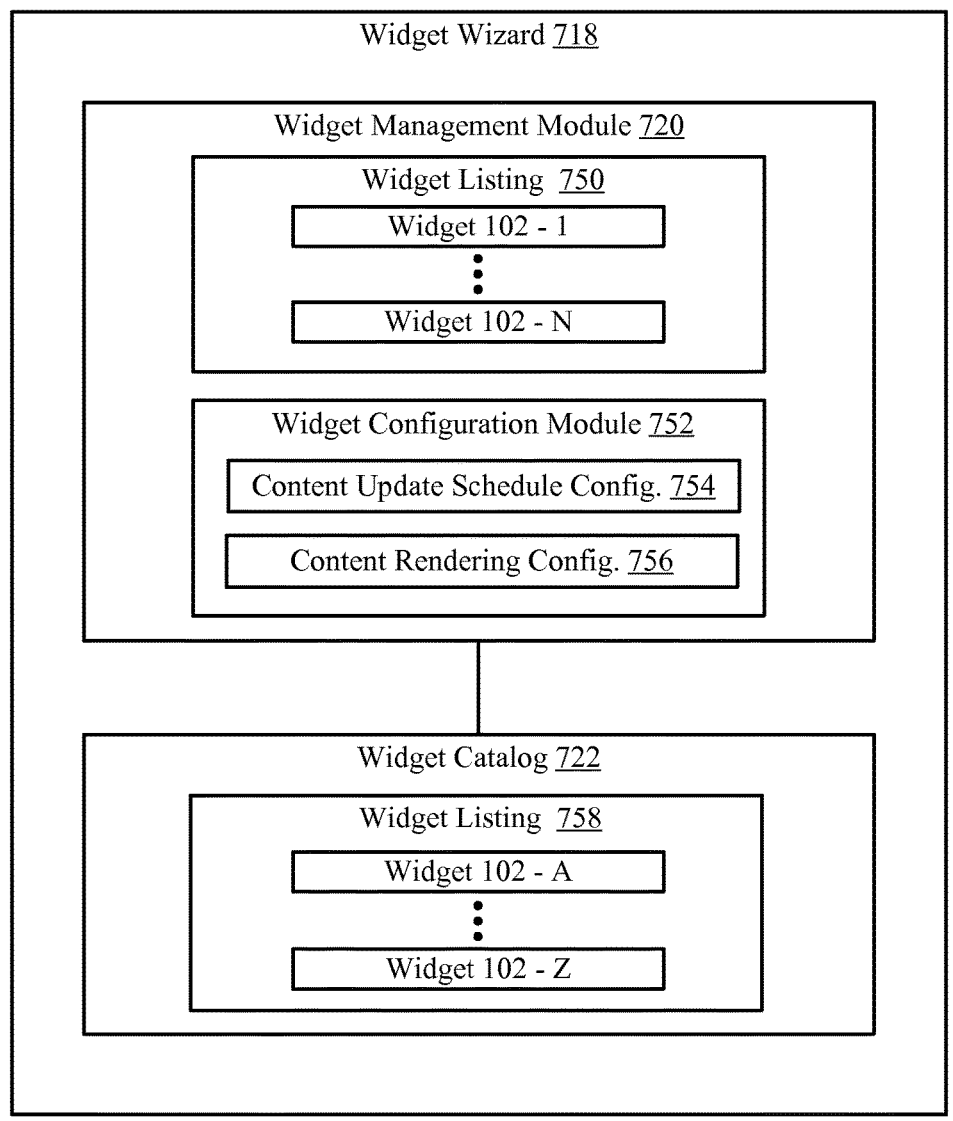
FIG. 13 is a schematic diagram of an aspect of a widget wizard of the WMC of FIG. 11.

The widget wizard 718 may include widget management module 720 operable to provide the user with management over the widgets that are displayed on the user interface 702. In addition, the widget wizard 718 may include widget catalog 722 operable to provide a user a current listing of the widgets currently available from the network operator or some other network source. FIG. 13 provides a more detailed block diagram of various components of the widget wizard 718 including widget management module 720 and widget catalog 722. The widget management module may provide for a widget listing 750 that provides for the display of a listing of widgets 102 currently stored on the wireless device. The listing 750 provides for the user to instantaneously update the user interface with selected widgets. In this regard, a user can instantaneously deactivate a widget currently being presented/displayed and replace the widget with another widget stored on the device. In addition, the widget management module 720 provides for widget configuration module 752 that is operable to provide for the user to configure the widgets based on personal preferences. The widget configuration module 752 may include content update schedule configuration 754 operable to allow the user to define the frequency by which each widget is provided content updates and content rendering configuration 756 operable to provide the user with the ability to define the manner in which widgets are rendered/presented on the user interface, such as the position on the display, the size of the widget or the like. Upon user changes to the configuration settings in configuration module 752, the widget wizard 718 may upload or otherwise communicate the configuration changes to the network for storage in the digital locker 304 associated with the user 104 and/or the wireless device 700.

The widget wizard 718 may additionally include widget catalog 722 that provides a widget listing 758 of widgets currently available from the network source. The listing of widgets in the catalog may be periodically updated, based on a set schedule or a user input, to insure the currency of the widgets available to the user. The update or initial receipt of the catalog may be provided by the WMS 300. In addition, the listing 758 may be customized for the user based on previous widget usage patterns or other attributes, such as time, location or the like.

In certain aspects, advertising widgets may be presented to the client as an option via the widget catalog 722. In some aspects, advertisement widgets may be offered to the user as a means of subsidizing or otherwise replacing the cost of other widgets. It should be noted that if widget management client 704 is configured to provide for the presentation of advertising widgets, the advertising widgets may be "locked" widgets, which do otherwise allow the user to manage or configure the widgets through the widget wizard 718. By locking the advertising widgets the network operator and/or advertiser is assured that the advertisements are being displayed/presented without the user otherwise choosing to opt-out of the advertising widgets. Additionally, in those aspects that provide for advertising widgets the widget usage reporter 714 may be configured to provide specific collection and reporting of usage data related to the interaction that a user may experience with an advertisement, such as time viewed or the accessed depth of the advertisement.

Referring again to FIG. 11, the WMC 704 additionally includes update controller 724 and update adapter 726. The update controller 724 is operable to control upstream and downstream data delivery to and from WMC 704. For example, the update controller 724 may be operable to control the delivery of usage data 742 or usage data reports 748 to network entities, widget configuration settings, and/or user requests to purchase/obtain a new or updated widget. In certain aspects, the update controller 724 may be operable to collate and provide data to network entities, such as the Widget Management System (WMS) 300. In addition, update controller 724 may be operable to receive widget content updates, updates to the widget catalog 722, configuration settings for content update schedules, content reporting requests or the like.

Further, the update adapter 726 is operable to handle the upstream and downstream transport of the data from the WMC 704 to the appropriate network entity. In this regard the update adapter 726 is operable to receive/transmit data over a specified type of network connection, for example, an Internet Protocol (IP) socket, a HyperText Transfer Protocol (HTTP) socket, Short Messaging Service (SMS), or the like. Additionally, the update adapter 726 is operable to compare the existing configuration of widgets with WMS-pushed configurations and make changes to the configurations accordingly; such as instantiating new widgets and/or disabling deactivated widgets.

The WMC 704 may additionally include a throughput sensor 728 operable for sensing the throughput time and estimating the time to download content update for a widget. The throughput sensor 728 is operable to be engaged upon opening WMC 704, and approximate throughput time can be sensed by establishing an IP connection and measuring the Round Trip Time (RTT). Based on the approximate throughput time and the size of the previous content update for a widget of interest, an estimate can be established of the time to update a widget and provided to the user when the user requests an update. In addition, the throughput sensor 728 may be configured to provide for a user warning if the content update will take more than a predetermined threshold of time.

The WMC 704 may additionally include subscriber ID/credential determiner 730 operable to determine the subscriber/user identification associated with the WMC 704. In one aspect, the subscriber ID determiner 730 may initiate a HTTP call and the response header may include the subscriber identification. In alternate aspects, the subscriber ID determiner may be derived from the wireless device or the like. Additionally, the subscriber ID/credential determiner 730 may be configured to determiner subscriber/user credentials by prompting the user to enter the appropriate credentials, e.g., user id. Based on the input, the user credentials are compared to the subscriber identification and if a match is determined, a report acknowledging the match may be communicated to the WMS 300 and a record created in the digital locker 304 associated with the subscriber/user. Subsequently the subscriber ID and the subscriber credentials may be included in all messages communicated from the WMC 704 to the message router 500.

Figure 16:
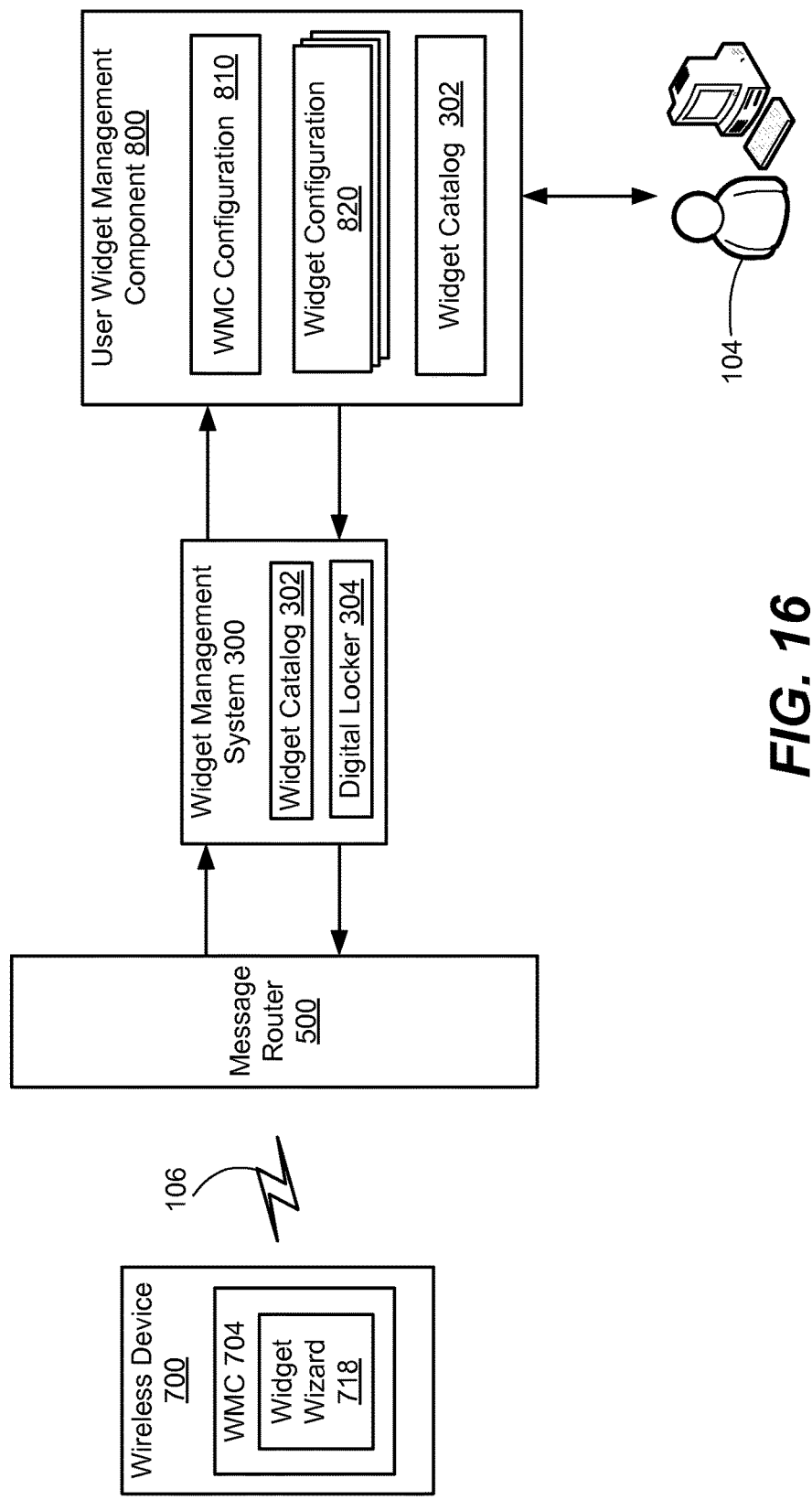
FIG. 16 is a schematic diagram of an aspect of a widget configuration architecture of the system of FIG. 1.

As previously noted, in addition to configuring the widget management client (WMC) 704 and associated mobile widgets 102 on the wireless device, the system provides for a user widget management portal 800. The user widget management portal 800 allows for the user 104 to access the component via another device, such as a wired PC or another wireless device, to manage the (WMC) on the wireless device 700. The user widget management portal 800 is in network communication with the widget management system (WMS) 300 and WMS 300 is in wireless communication with the wireless device 700 via message router 500. As shown in FIG. 16, in one example, the user widget management portal 800 acts as complement to the widget wizard 718 on the wireless device 700 by providing user 104 remote access to the management of widgets on the wireless device. The user widget management portal 800 is operable to receive information pertaining to a user's current WMC 704 or widget 102 configurations from the user's profile stored in the digital locker 304 of WMS 300. As such, user widget management portal 800 may include a WMC configuration module 810 operable to provide user 104 with the ability to re-configure settings that apply to the overall WMC 704 in general. In addition, the user widget management portal 800 may include one or more widget configuration modules 820 operable to provide user 104 with the ability to reconfigure the widgets 102 currently stored on wireless device 700.

In addition to WMC and widget configuration 820, the user widget management portal 800 may provide for the user to learn about and/or acquire new widgets. As such, user widget management portal 800 may include widget catalog 302 as communicated from widget management system 300. In addition, the widget catalog 302 may be personalized for user 104 such that widgets of interest to user 104 are listed in the catalog near the beginning or are otherwise highlighted. Widgets of interest may be identified by the WMS 300 based on widget usage tracking/metering data communicated from the wireless device 700. Once a user selects, acquires or otherwise purchases a new widget, the user management portal 800 communicates the selection to the WMS 300 and the WMS 300 subsequently retries the widget from a corresponding content access server 900 (FIG. 17) and communicates the widget to the wireless device via message router 500.

Content Access Server/Content-Advertising-Tracking Components

Figure 17:
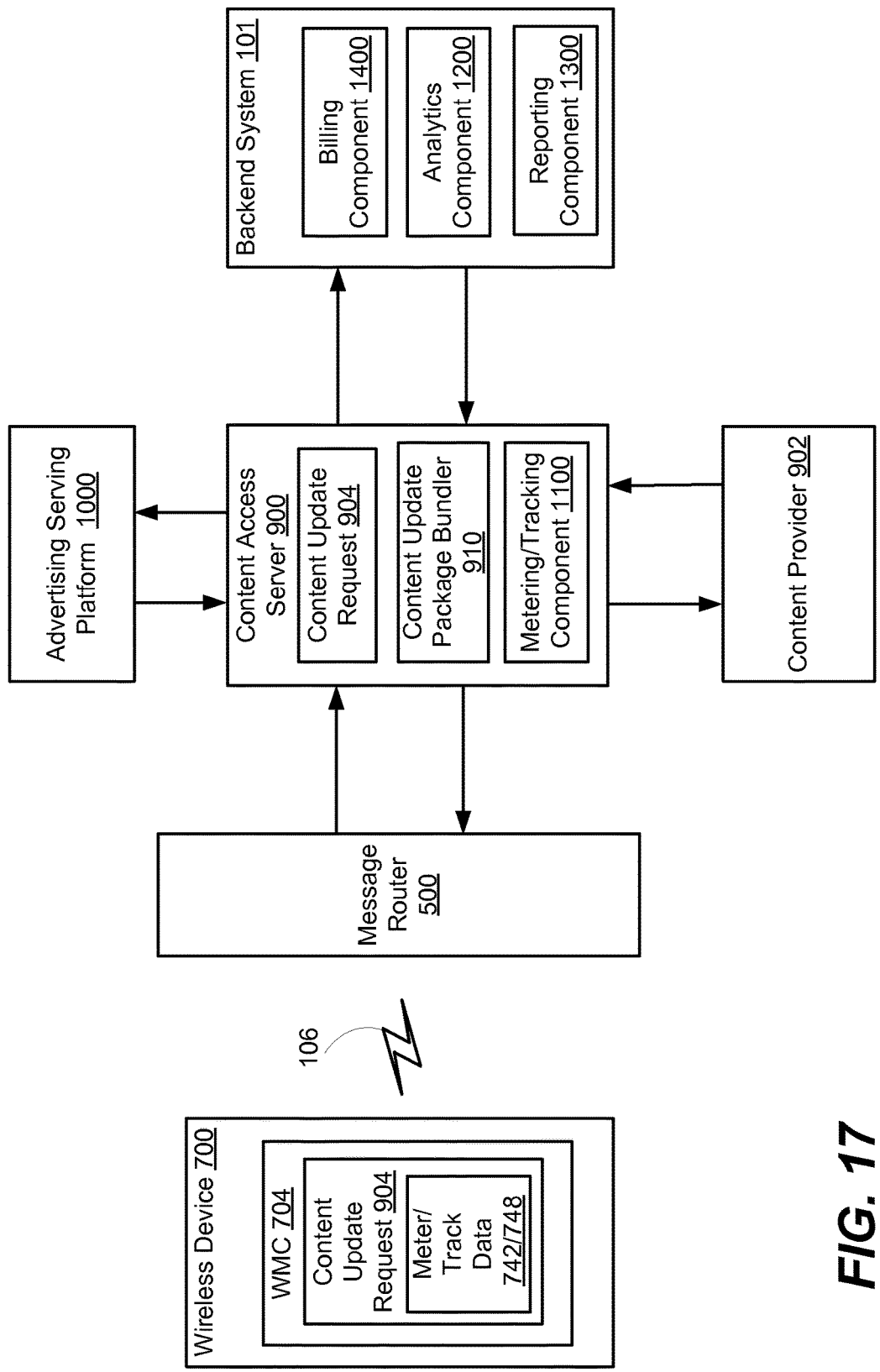
FIG. 17 is a schematic diagram of an aspect of a content access server of the system of FIG. 1.

Referring to FIG. 17, a detailed block diagram highlighting the content access server 900 is depicted. Content access server 900 is operable to provide content to the mobile widgets 102 based on a predetermined update schedule for the widget. As previously mentioned the update schedule may be logically determined based on one or more content delivery attributes, network attributes and/or user configuration settings. A mobile widget 102 will initiate a content request 904 based on the update schedule, which is wirelessly received by the content access server 900 via the message router 500. The content access server 900 will act on the request 904 by retrieving current content from content provider 902 or, in the case of advertisements serving platform 1000, which is in communication with an advertisement source. Once the content update is retrieved, the update is communicated to the wireless device for presentation on the corresponding widget. For example, if the mobile widget is a sporting event score reporting widget, a request may be sent to the content access server and the content access server mat retrieve a content update, in the form of updated sporting event scores from a content provider 902, such as a web-based sports news site or the like. In one aspect, the content access server 900 may include a content package bundler 910 operable to bundle updates in a content update package, such as a /zip file or some other spectrally efficient compression mechanism. Bundling content updates in packages provides for smaller messages that can be more efficiently delivered to the wireless devices. Content updates can be communicated to the wireless device across different connections depending on the connections available at the wireless device. Examples of connections include, but are not limited, HTTP socket, IP socket, SMS, and the like.

In addition to providing content updates, content access server 900 may serve as the receiving point for metering/tracking data communicated from the WMC 704. In some aspects, the content update request 904 may include the metering/tracking data, such as widget usage data 742 or widget usage reports 748. In such aspects, the content access server 900 includes a metering/tracking component 1100 operable to parse the widget usage data 742 or widget usage reports 748 from the request and route the metering/tracking data to a content provider 902 or the advertising serving platform 1000. In addition, the content access server may communicate the metering/tracking data to a backend system 101, which includes an analytics component 1200 operable for receiving the metering/tracking data and logically determining usage patterns or the like. The analytical data may be subsequently communicated and used by the reporting component 1300 to generate predetermined reports and by the billing component 1400 to generate widget bills, such as widget billing based on widget usage rates.

Figure 14:
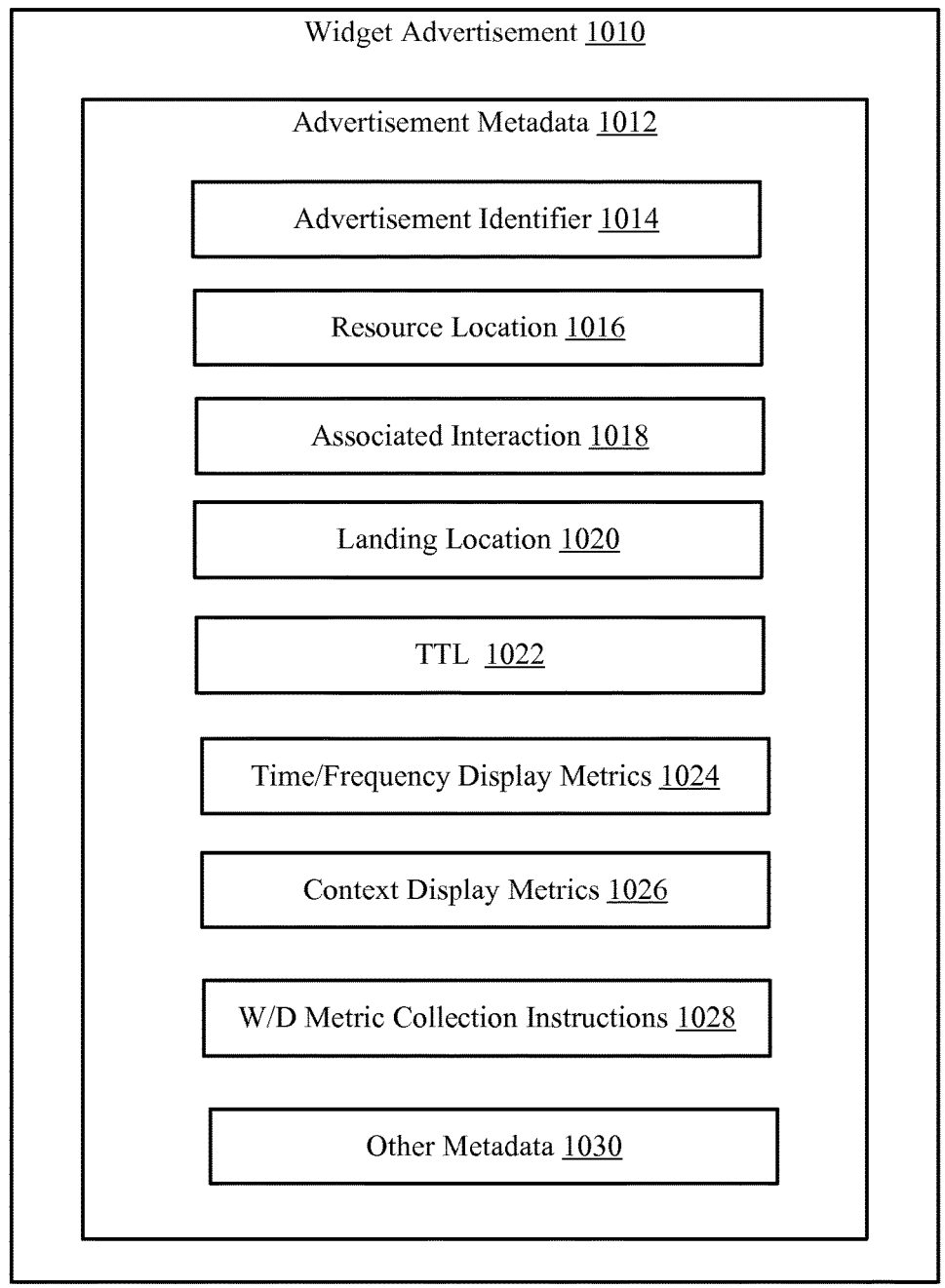
FIG. 14 is a schematic diagram of an aspect of a widget advertisement of the system of FIG. 1.

As previously noted, one or more widgets that are stored and presented on the wireless device 700 may include advertising widgets operable to display advertisements in widget form. In certain aspects, advertising widgets may be provided by the widget operator as an opt-in feature, in which the user is offered the option of opting to accept advertising widgets in lieu of some form of compensation, such as a reduction in the cost of other non-advertising widgets or the like. Thus, advertisement widgets may be configured be the widget providers in conjunction with the advertisers as a "locked" widget, meaning that the user is unable to re-configure the widget or otherwise deactivate the widget on the wireless device. FIG. 14 provides a block diagram of an example of a widget advertisement 1010 and, more specifically, the advertisement metadata 1012 included in such advertisements. The metadata 1012 may include an advertisement identifier 1014, such as id number that serves to identify the advertisement, and a resource location identifier 1016 that serves to identify the source of the advertisement, such as an IP address or the like. The metadata 1012 may additionally include associated interaction 1018, which serves to define user interactions with the advertisement, such as click-to-browse functionality or the like and/or landing location 1020, which defines a URL location for user interaction other than click-to-browse. In other aspects, the metadata 1012 may include the TTL (Time to Live) 1022 for the Advertisement, which defines the expiration date for the advertisement on the wireless device, and time/frequency of display metrics 1024, which define specific times and/or the frequency by which the advertisement should be displayed on the wireless device. Additionally, the metadata 1102 may include contextual display metrics 1026, which define other context parameters related to the display of the advertisement and wireless device metric collection instructions 1028, which define the metrics that are to be collected at the wireless device, and subsequently communicated to the network, in relation to the display of the advertisements, such as time/frequency of display, frequency of user interaction with the advertisements, depth of click-throughs and the like. The metadata 1012 may additionally any other metadata 1012 related to the advertisement 1010, the display of the advertisement on the widget or the reporting functions.

Figure 15:
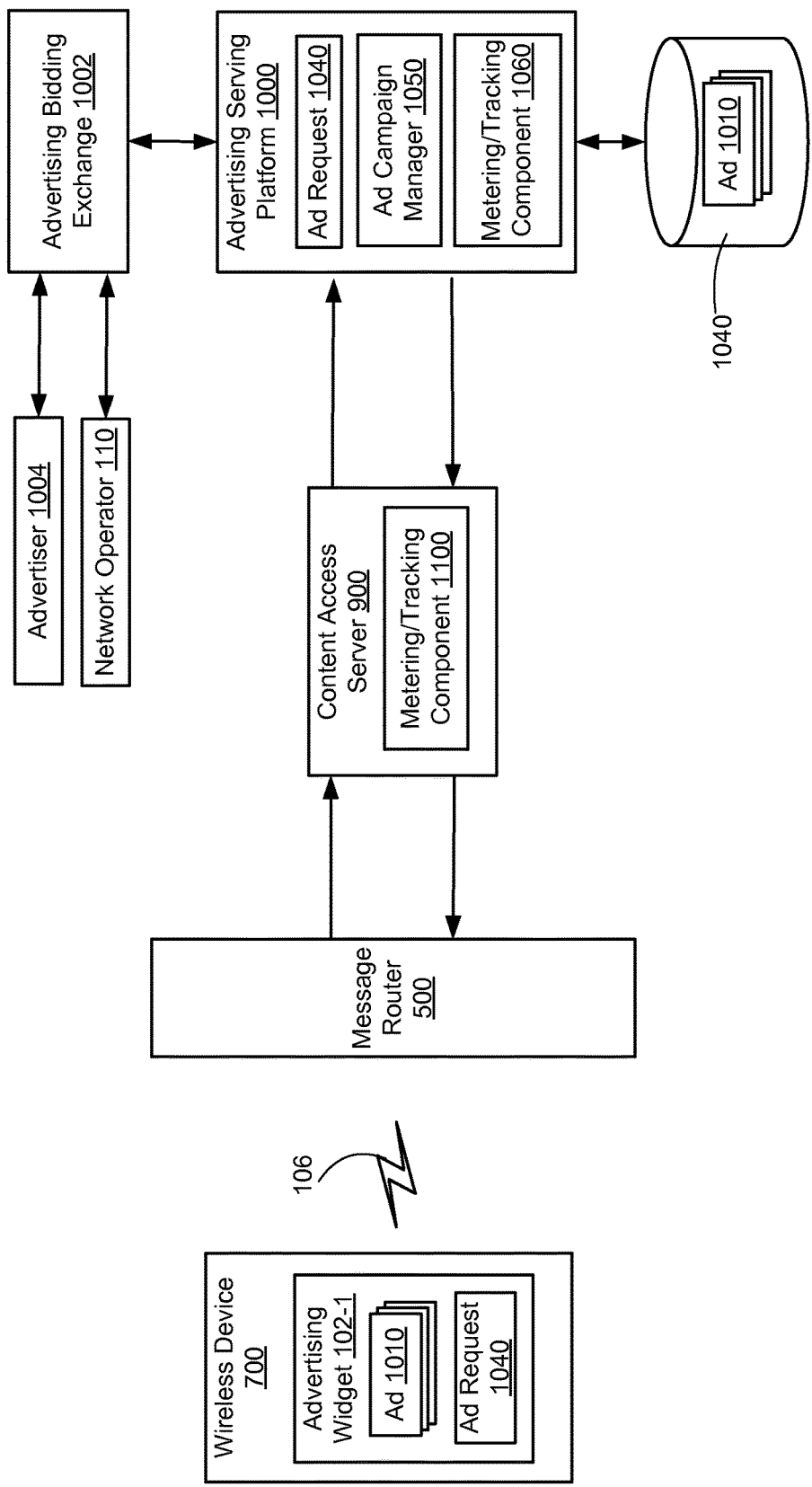
FIG. 15 is a schematic diagram of an aspect of an advertising architecture of the system of FIG. 1.

As shown in the block diagram of FIG. 15, advertisements 1010 are wirelessly communicated to the advertising widget 102-1 on the wireless device 700 via an advertising source, such as advertising serving component/platform 1000. The advertising serving platform 1000 is in communication with content access server 900, such that advertisements 1010 are communicated from the advertising serving platform 1000 to the wireless device 700 through the content access server 900. Additionally, the message router 500 is in communication with the content access server 900 and serves to insure that the advertisements and related information are communicated to and from the wireless device via the wireless network 106 using a unified communication protocol. The advertising serving platform is in communication with an advertisement database 1040 that stores the inventory of advertisements 1110. Thus, the advertising serving platform is operable to retrieve advertisements 1110 from the database 1020 and communicate the advertisements to the advertising widget 102-1 on the wireless device.

In addition, similar to a content update request as described above, wireless device may issue an advertisement request 1040 operable to request delivery of an advertisement for presentation of an advertisement on the wireless device. The advertisement request is received by the advertising serving platform 1000, which obtains an advertisement from advertisement database 1040. The advertisement request may include, an identifier, issued by the advertising serving platform 1000, which identifies the WMC 704. The request may additionally include a metering/tracking report that identifies advertisements recently presented and the number of presentations during the TTL.

Additionally, the advertising serving platform 1000 may further comprise an ad campaign manager 1050 operable to manage advertising campaigns for advertisers by communicating advertisements to advertising widgets based on advertising campaign criteria. Advertising campaign criteria may dictate that certain advertisements are pushed to wireless devices having expiration dates and frequency of display rates related to the advertising campaign. In other aspects, the advertising campaign may target certain demographic information related to users, or certain wireless devices, such that certain advertisements are targeted for users and/or wireless devices that are within the target audience confines. Demographic information may include, but is not limited to, user gender, user interests, user income, user age, user address, current used/wireless device location, and the like.

The advertising serving platform 1000 may additionally include a tracking/metering component 1060 that tracks and meters information related to the display of the advertisements on users advertising widgets. The tracking/metering component 1100 may parse out those metering and tracking data related specifically to advertisements 1010 and advertising widgets 102-1 and communicate the advertising related metering and tracking information to the tracking/metering component 1060 of the advertising serving platform 1000. The tracking/metering data that is communicated from the WMC 704 may include advertisement identifiers, number of presentations/displays on the advertising widget, depth of user interaction (e.g. number of click-throughs), elapsed time of user interaction/viewing of advertisement and the like.

The advertising serving platform 1000 may additionally be in communication with an advertising bidding exchange server 1002 that is operable to allow for an advertising bidding marketplace to occur between advertisers 1004 and network/widget operators 110. The bidding exchange marketplace may provide for the advertisers 1004 to bid on widget advertising based one or more advertising criteria, such as a position/placement of the advertisement on the widget wall, the frequency of presentation, the time of presentation, the demographics of the target audience and the like. In addition, the bidding exchange marketplace may provide for the advertisers to bid based on broadcast and/or multicast presentation of advertisements in the widget. In one aspect, the bidding exchange marketplace is a publicly available marketplace, such as an Internet-based marketplace that allows for all advertisers or potential advertisers to bid on widget-based advertising.

Backend System

Referring back to FIG. 1, as previously noted, in some aspects, system 100 may have a backend system 101 for analyzing the tracked data and transactions within system 100. Backend system 101 may include one or any combination of analytics component 1200, reporting component 1300, and billing component 1400.

Analytics component 1200 receives and examines the data of system 100.

Reporting component 1300 generates reports, including operator/carrier proprietary information 1302, based on the results of the analysis of analytics component 1200.

Billing component 1400 accounts for transactions in system 100 and debits and/or credits one or more end users 104, developers/providers 108, operators/carriers 110, or advertisers 908.

Sample Call Flows

Figure 18:
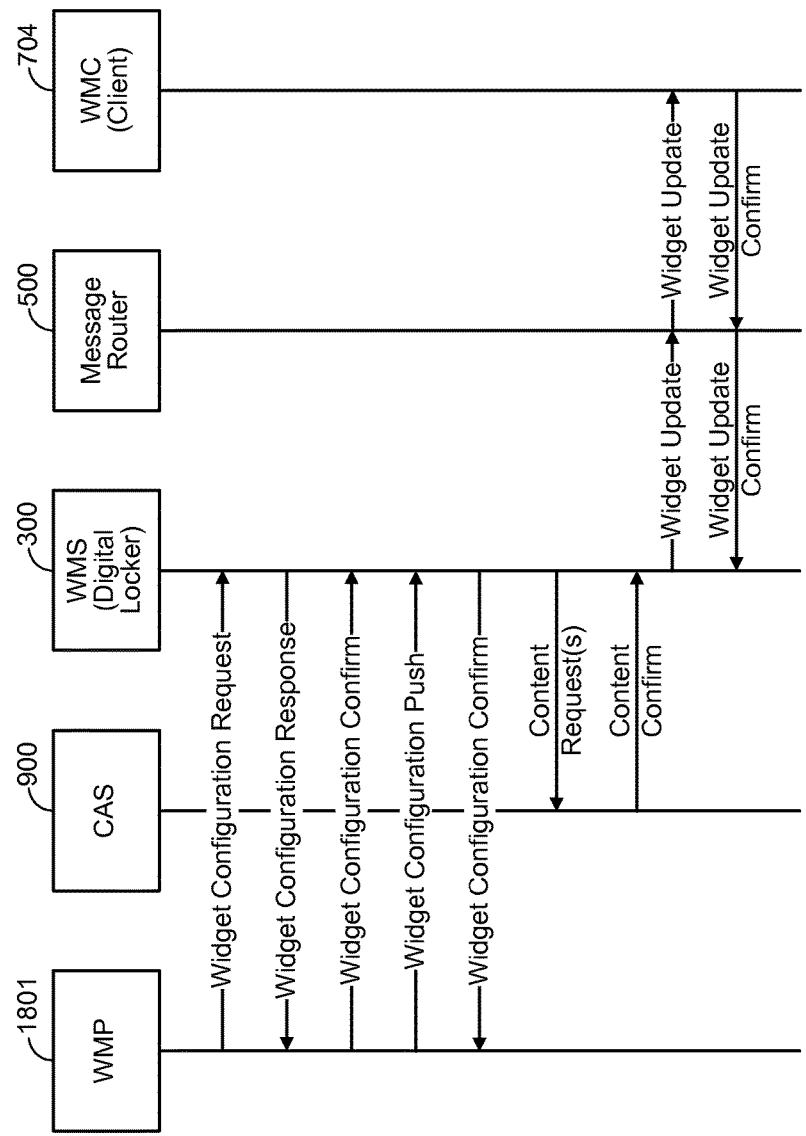
FIG. 18 is a call flow relating to an aspect of selecting and updating a mobile widget in the system of FIG. 1.

Referring to FIGS. 18-23, according to some aspects, some non-limiting examples of call or messages flows are listed for various scenarios. Referring to FIG. 18, for example in one aspect, a high level call flow relates to a widget management portal (WMP)-originated selection and configuration of a new mobile widget. In particular, WMP interacts with WMS to select and configure the mobile widget. The WMS interacts with CAS to obtain the content for the mobile widget. Additionally, the WMS forwards the mobile widget and/or the content update for the mobile widget to the WMC via the message router.

Figure 19:
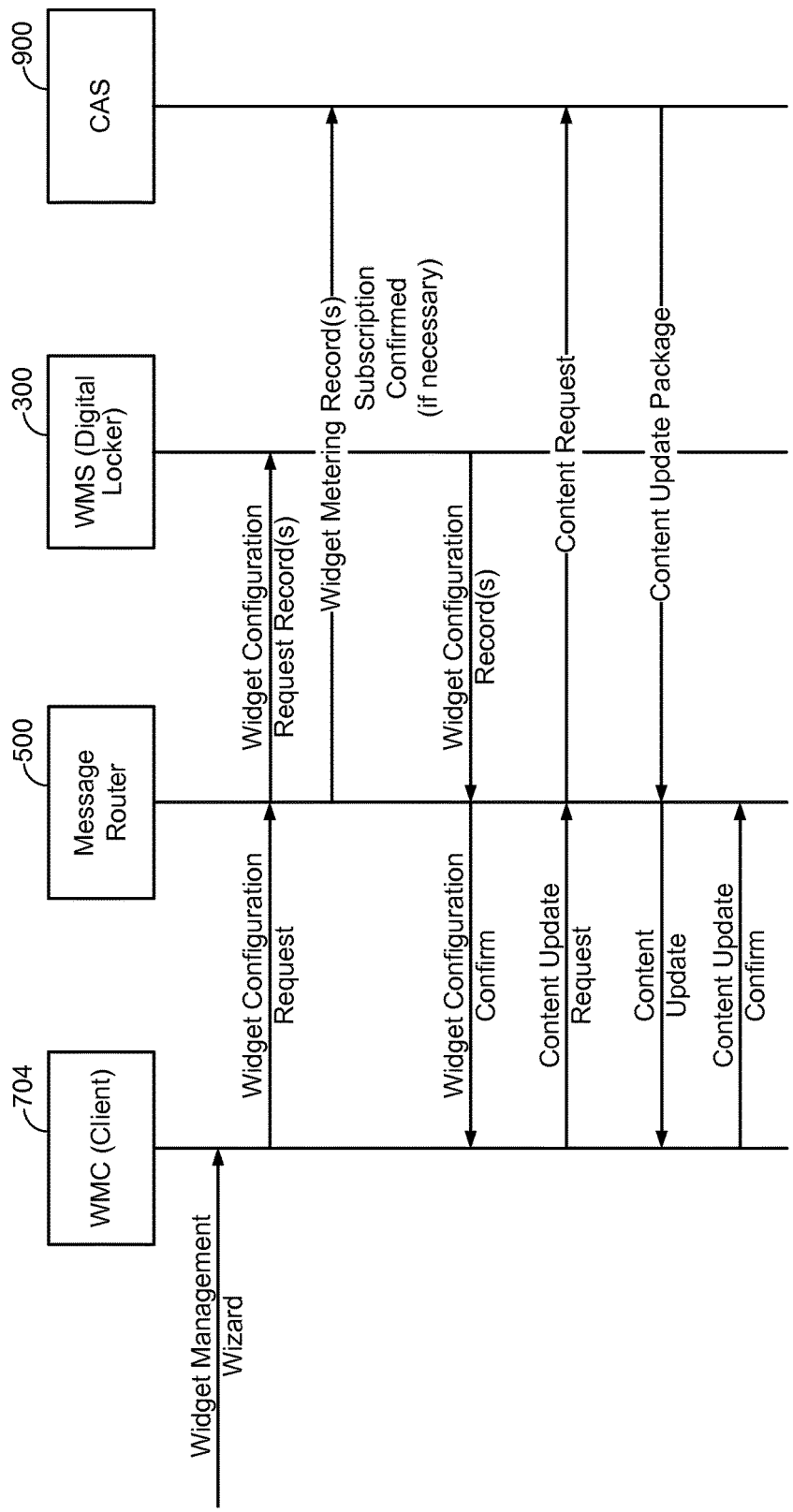
FIG. 19 is a call flow relating to an aspect of selecting and updating a mobile widget in the system of FIG. 1.

Referring to FIG. 19, for example in one aspect, a high level call flow relates to a WMC-originated selection, configuration and updating of a mobile widget. In particular, WMC interacts with WMS to select and configure the mobile widget. The WMS interacts with CAS to obtain the content for the mobile widget. Further, the WMC may request a content update for the mobile widget from the CAS, which responds with the updated content, which the WMC confirms receiving.

Figure 20:
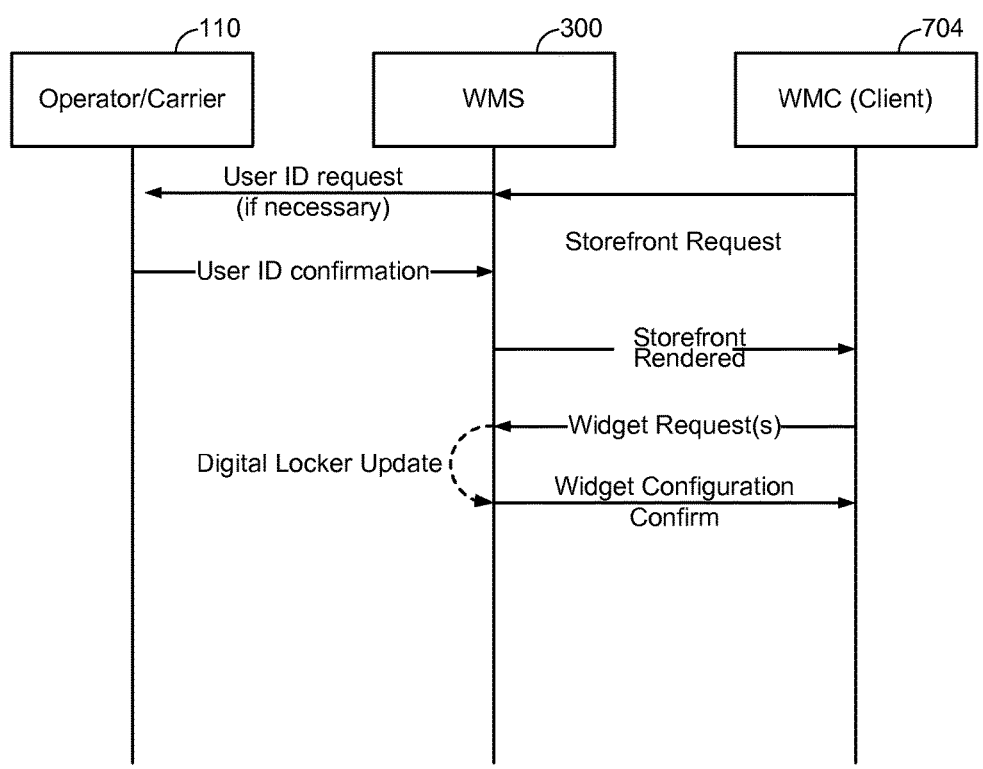
FIG. 20 is a call flow of relating to an aspect of operator/carrier control of access to mobile widgets in the system of FIG. 1.

Referring to FIG. 20, for example in one aspect, a high level call flow relates to a WMC accessing a web storefront in the WMS, wherein the operator/carrier authorizes the access. In particular, the WMC requests access to the storefront from the WMS, which verifies with the operator/carrier that WMC is authorized for such access. For example, the verification may include passing an identifier or a credential associated with the WMC or the end user to a content management server or authorization server of the operator/carrier to determine if WMC is authorized. Upon receiving an authorization, WMS is then able to provide WMC with access to the storefront and allows subsequent interaction for downloading of mobile widgets.

Figure 21:
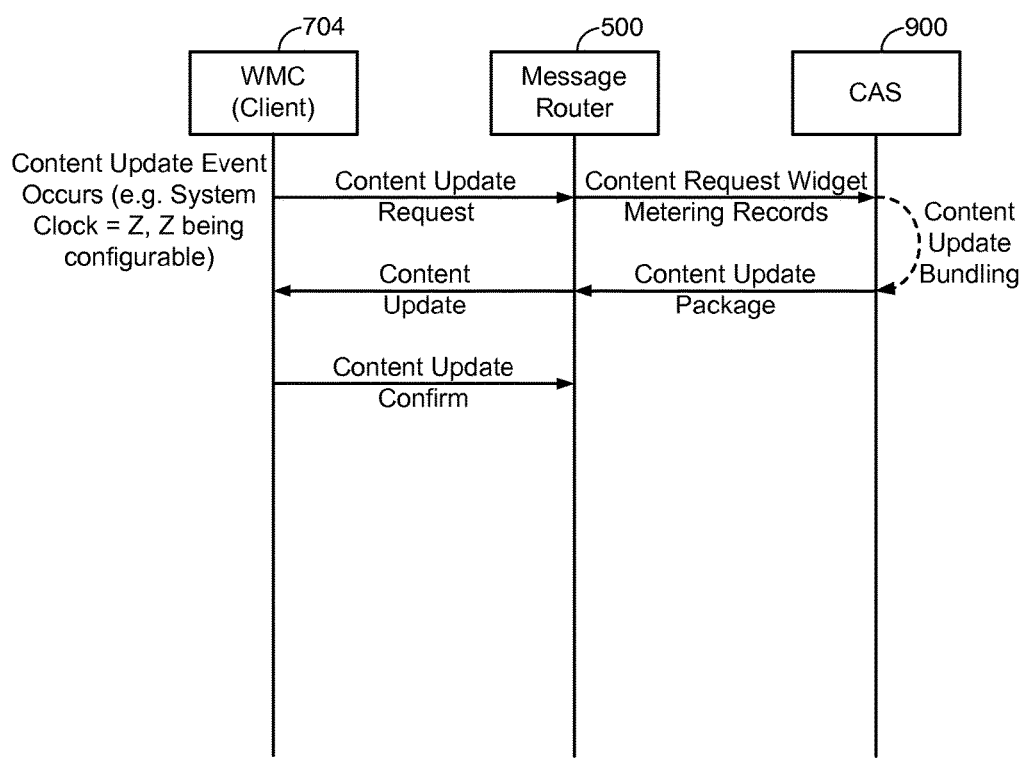
FIG. 21 is a call flow of relating to an aspect of updating a mobile widget in the system of FIG. 1.

Referring to FIG. 21, for example in one aspect, a high level call flow relates to a content update requested by a WMC. In particular, based on the occurrence of a content update event, WMC sends a content update request via the message router to the CAS. The CAS bundles the corresponding content update and transmit it to the WMC via the message router. It should be noted that in one aspect, the content update request may be user initiated. Additionally, it should also be noted that WMC may package metering/tracking data along with the content update request. In this case, CAS is operable to route the metering/tracking data to other infrastructure elements, such as the analytics component of backend system and/or the advertisement serving platform.

Figure 22:
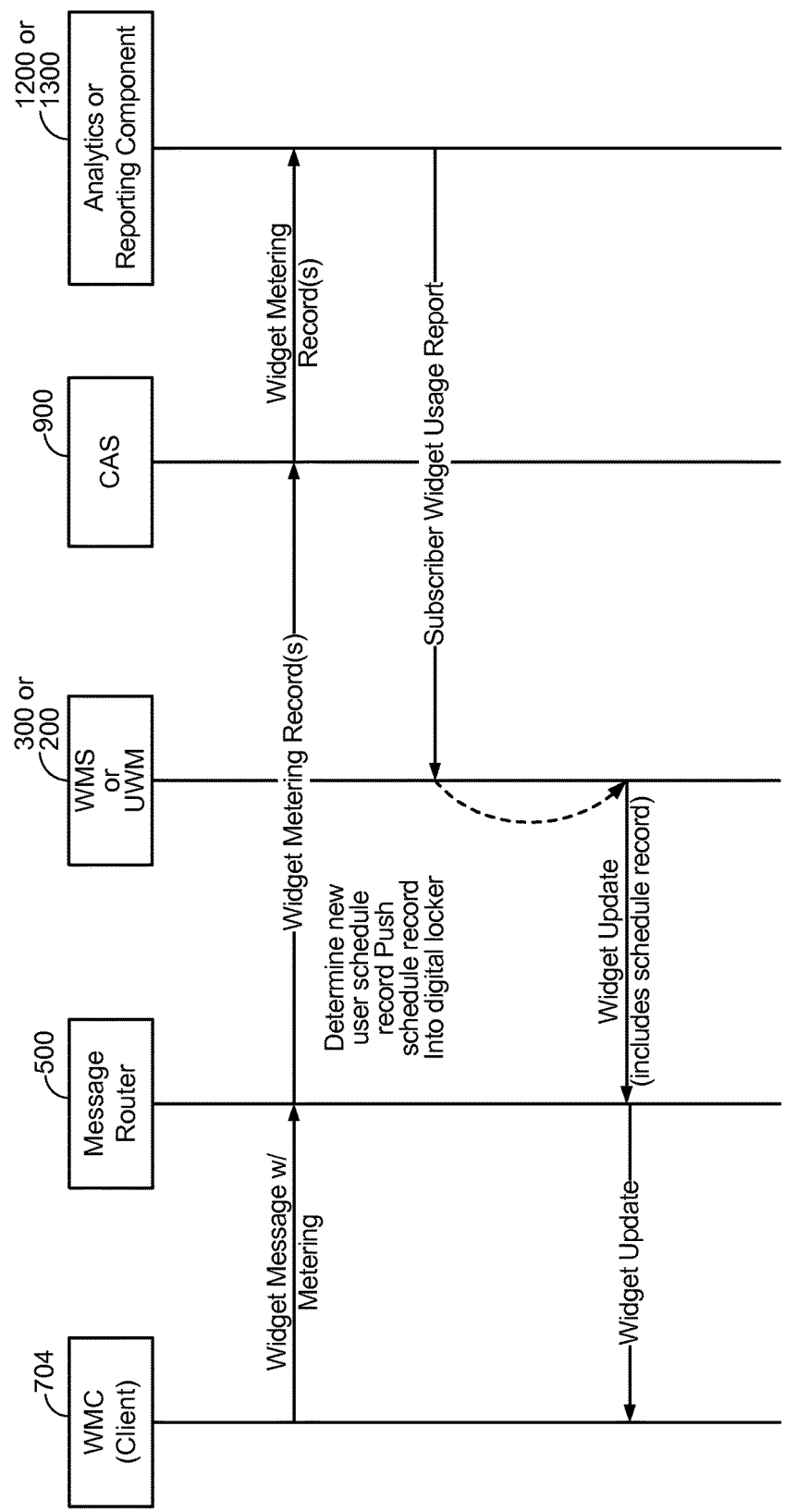
FIG. 22 is a call flow of relating to an aspect of adjusting a content update schedule for a mobile widget or an end user in the system of FIG. 1.

Referring to FIG. 22, for example in one aspect, a high level call flow relates to a reporting of widget metering/tracking data and a corresponding adjustment of a widget update schedule based on the reported metering/tracking data. In particular, WMC transmits a widget message that includes metering/tracking data to CAS via message router. CAS is operable to route the metering/tracking data to other infrastructure elements, such as the analytics and reporting components in this case. The analytics and reporting components then determine usage data based on the reported metering/tracking data, which is provided as an input to the WMS and/or the UWM for use in determining content update schedules. Based on the usage data, a new update schedule is determined for one or more users, and/or for one or more mobile widgets. The new update schedule is stored at the WMS and/or the UWM, and is further communicated to the WMC via the message router. Thus, a new update schedule is effected based on an analysis of the reported metering/tracking data provided by WMC.

Figure 23:
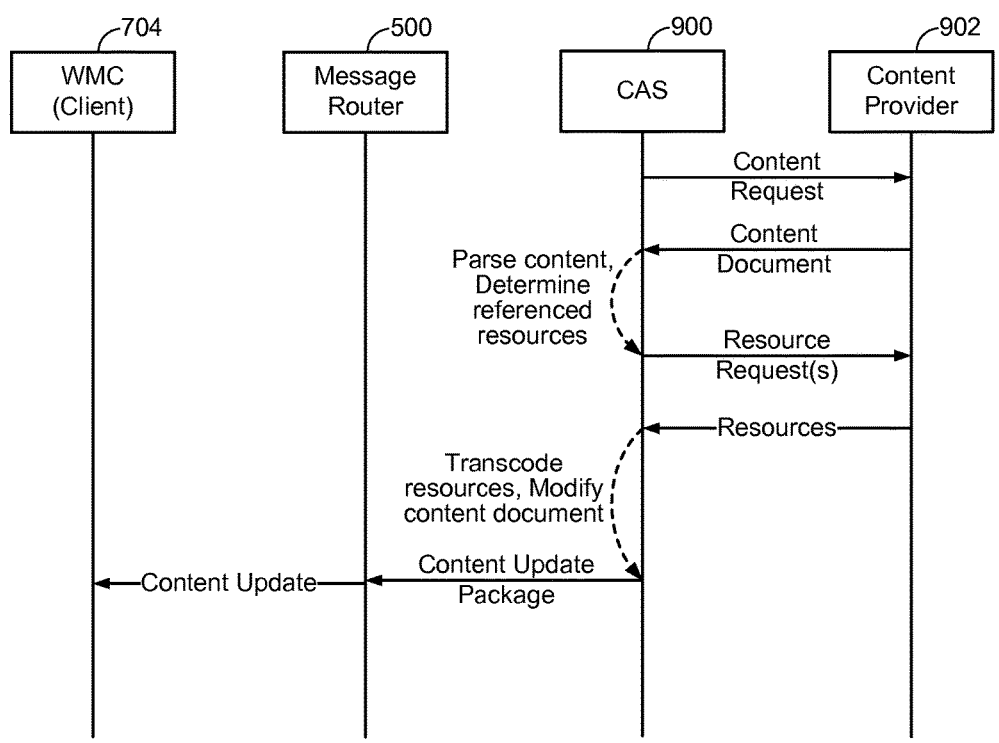
FIG. 23 is a call flow of relating to an aspect of updating a mobile widget in the system of FIG. 1.

Referring to FIG. 23, for example in one aspect, a high level call flow relates to the CAS providing WMC with a content update. In particular, CAS transmits a content request to a content provider, who responds with a content document. The content document may include various updated content, as well as references to resources for further content updates. The CAS parses the content document and, if necessary, requests the additional resources from the content provider. Upon receiving the requested resources, the CAS transforms the resources and the other content from the content document into an update package for delivery to WMC. Upon completing the transformation, the CAS forwards the content update packet to the WMC via the message router.

Widget Memory Management

In one aspect, methods, systems, and apparatus are provided that optimize memory management in a wireless device based on widget deployment. In one aspect, the wireless device may execute "low memory" versions of one or more widgets when the wireless device provides an indication that a low memory state exists. The "low memory" version widgets are scaled down versions of the standard widget, which do not require as much memory to execute, thereby conserving memory on the wireless device and, in most instances, assuring that some, if not all, of the widgets being implemented by a user remain in an active state while the device is in a low memory state.

In a standard widget, the widget may be configured with various resources, such as images, audio, multimedia or the like. In addition, a standard widget may be configured to provide for multiple depths (e.g., user-click-throughs, such as a first level being a compressed mode view of the widget, a second level being, for example, a list of articles, a third level being an individual article with a byline, and a fourth level being a supporting WAP/HTML/XHTML article) operable for the user to view more detailed content. In the "low memory" version of the widget these resources may be omitted or otherwise degraded. For example, while a standard widget may employ MP3 files for audio, GIF files for image and MPEG4 for video, all of which are memory intensive files, the "low memory" version may use AAC files for audio, JPEG files for image and H.264 files for video, all of which provide for less memory consumption that their respective standard version widget counterparts. In addition, while a standard version widget allows for a normal or standard content feed, which may include hyperlinked resources or the like, the "low memory" version may only support a simplified content feed that does not include one or more predetermined resources, such as hyperlinked resources or the like, that are contained in the normal or standard content feed. In terms of widget depth, while the standard version may provide for three or more depths of content, including WAP articles and the like, the "low memory" version may be limited one depth with a transition from the first depth to a web browser. Additionally, in instances in which the standard version includes a compressed mode view of the widget (as will explained in detail, infra.) the view may include a branding image for the widget in addition to headlines or the like, while the "low memory" version compressed mode view may be limited to a one or two word text descriptor.

Figure 24:
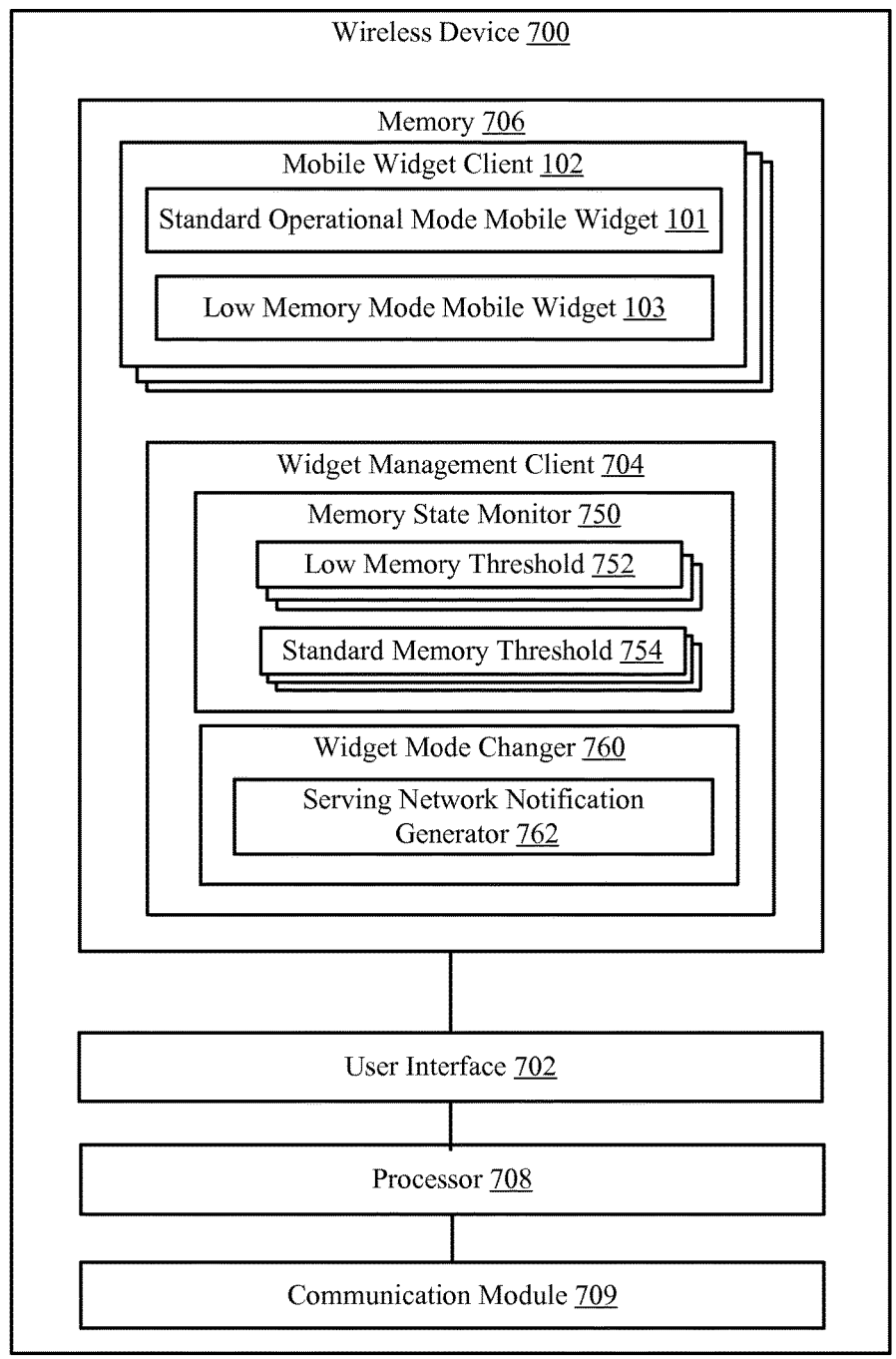
FIG. 24 is a schematic diagram of an aspect of a wireless device having multiple mobile widget operational states based on wireless device memory, operable in the system of FIG. 1.

FIG. 24 is a block diagram depiction of a wireless device 700 that implements both standard operation mode widgets 101 and corresponding low memory mode widgets 103. Similar to previously described wireless device, wireless device 700 includes processor 708, which is in communication with memory 706, communications module 709, and user interface 702. Memory 706 includes one or more mobile widget clients 102 that include a standard operational mode mobile widgets 101 and may include a corresponding low memory mode operational widgets 103. It should be noted that not all of standard operational mode widgets 101 are required to have a corresponding low memory mode widget 103. Some standard operational mode widgets 101 may be given priority, such that when the wireless device enters a low memory state the standard operational mode widgets 101 with priority are allowed to remain in standard operational mode. In other aspects, all of the standard operational mode widgets may be classified in a low memory priority order, such that if a first low memory threshold is reached the lowest priority standard operational mode widget is changed to the corresponding low memory mode widget, if a second low memory threshold is reached the second lowest priority standard operation mode widget is changed to the corresponding low memory mode widget and the like.

As shown, in FIG. 24, in one aspect, the low memory mode widgets 103 may be included within the mobile widget client 102 initially configured on the wireless device. In other aspects, in which the client 102 does not include the low memory mode widget 103, the low memory mode widget 103 may be pushed from the serving network to the wireless device upon detection of a low memory state. In such aspects, it may also be possible to provide for the low memory mode widget 103 to be deleted from wireless device memory once the device is determined to be in a non-low memory state, such that the corresponding standard operational mode widget is re-instated.

Additionally, memory 706 includes Widget Management Client (WMC) 704 operable to manage the implementation of widgets on the wireless device. In one aspect, WMC 704 may include memory state monitor 750 operable to monitor the state of available memory on the wireless device and widget mode changer 760 operable to change the mode of a widget from standard operational mode to low memory mode, or vice versa, based on memory thresholds being met or exceeded. Memory state monitor 750 may include one or more low memory thresholds 752 and one or more standard memory thresholds 754. If a low memory threshold 752 is met or exceeded widget mode changer 760 changes the mode of widgets that are associated with the threshold from the standard operational mode widget 101 to the corresponding low memory mode widget 103. In the instance in which a single low memory threshold does not result in all of the widgets moving to low memory mode operation, further low thresholds 752 may be necessary if the wireless device continues to experience lower memory availability, such that further widgets are moved to a low memory mode of operation as further low memory thresholds 752 are met.

Once in the low memory state, as the device begins to free up memory or more memory is otherwise made available, a standard memory threshold 754 may be met or exceeded, which results in widgets associated with the standard memory threshold 754 moving from the low memory mode widget 103 to the standard operational mode widget 101. In the instance in which a single standard memory threshold 754 does not result in all of the widgets moving back to the standard memory mode operation, further standard memory thresholds 754 may be necessary as the wireless device continues to free up available memory, such that further widgets are moved from the low memory mode widget 103 to the standard operation mode widget 101. It should be noted that standard memory thresholds 754 may be needed, in addition to low memory thresholds 752, to insure that operational modes do not ping-pong back and forth.

Additionally, widget mode changer 760 may include a serving network notification generator 762 operable to generate a mode change notification, which is communicated to the serving network via the communication module 709. The mode change notification serves to notify the serving network of the mode changes, so that mode changes which are affected by the network, such as content feed configuration and the like, are implemented based on the change. In response to receipt of the mode change notification, the Widget Management System (WMS) 300 will dually record the mode changes in the digital locker 304 associated with the user 104/wireless device 700.

Figure 25:
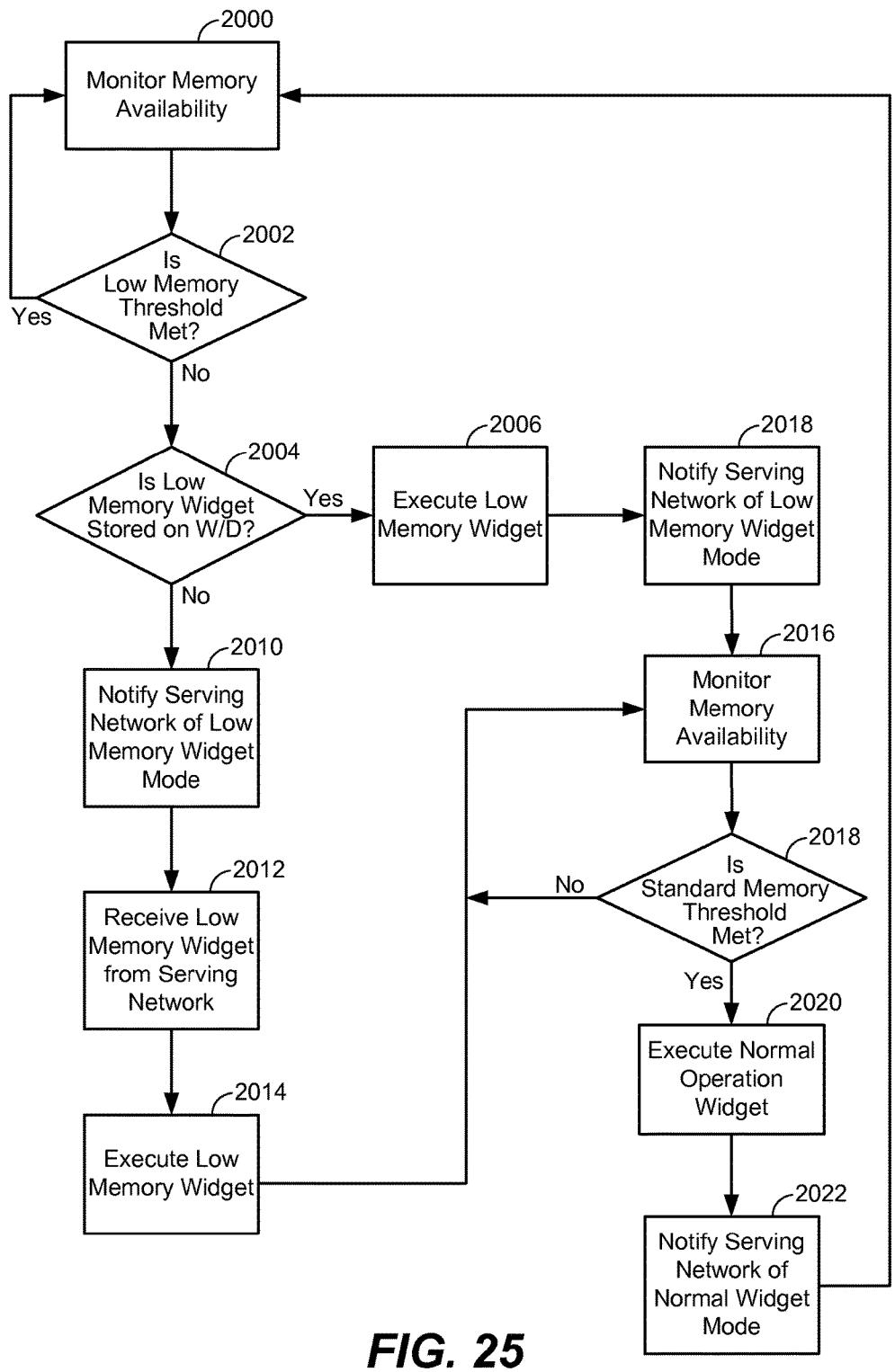
FIG. 25 is a flow diagram of an aspect of a method of operating mobile widgets based on wireless device memory states, operable in the system of FIG. 1.

Referring to FIG. 25, a flow diagram is depicted of a methodology for implementing low memory mode widgets on wireless devices. At Event 2000, the memory availability is monitored and, at Event 2002, a determination is made as to whether a predetermined low memory threshold has been met or exceeded. For example, the predetermined low memory threshold is set to assure that widget consumption of the memory does not render widgets non-functional or otherwise exhaust all available memory space. The predetermined low memory threshold may be associated with one or more, and in some aspects all, of the widgets running on the wireless device, such that meeting or exceeding the predetermined low memory threshold will cause the widget management client to change from a standard operational mode widget to a corresponding low memory mode widget. If the determination, at Event 2002, results in the low memory threshold not being met or exceeded, the method returns to Event 2000, for continued monitoring of memory availability.

If the determination, at Event 2002, results in the low memory threshold being met or exceeded, at Event 2004 a determination is made as to whether corresponding low memory mode widget(s) associated with the low memory threshold are stored on the wireless device. As previously noted, in certain aspects the low memory mode widget may be initially stored in conjunction with the initial acquisition/storage of the standard operational mode widget. While in other aspects, the low memory mode widget will be pushed from the serving network upon notification of the low memory threshold having been met or exceeded. Thus, if all of the low memory mode widgets associated with the low memory threshold are stored on the wireless device, at Event 2006, the low memory mode widgets are retrieved and activated, while the standard operational mode widgets are deactivated. At Event 2008, a notification is generated and sent to the serving network, such as the widget management server or the like, to notify the serving network of the change in widget operational modes. The serving network is notified so that network-level changes to the operational mode change can be implemented, such as changes to the content feeds/updates and the like.

If the determination, at Event 2004, results in one or more of the low memory mode widgets associated with the low memory threshold not being stored on the wireless device, at Event 2010, a notification is generated and communicated to the serving network, such as to the widget management server or the like, to notify the serving network of the change in widget operational modes and to request delivery of the one or more low memory mode widgets not currently stored on the wireless device. In turn the widget management system may communicate with the unified widget manager to retrieve the requested low memory mode widgets and subsequently communicate the low memory mode widget(s) the wireless device. At Event 2012, the low memory mode widget(s) are received from the serving network and stored in local memory. At Event 2014, the low memory mode widgets are retrieved and activated, while the standard operational mode widgets are deactivated.

Once the low memory mode widgets have been activated and the serving network notified of the operational mode change, at Event 2016, memory availability is monitored. At Event 2018, a determination is made as to whether a predetermined standard operational memory threshold has been met or exceeded. The predetermined standard operational memory threshold may differ from the predetermined low memory threshold to guard against the system ping-ponging back and forth between operational modes in instances in which memory availability fluctuates near the predetermined low memory threshold. If the determination, at Event 2018, results in the standard memory threshold not being met or exceeded, the method returns to Event 2016, for continued monitoring of memory availability.

If the determination, at Event 2018, results in the standard memory threshold being met or exceeded, at Event 2020, the standard operational mode widget(s) are retrieved from memory and activated and the low memory mode widgets are deactivated. At Event 2022, a notification is generated and communicated to the serving network, notifying the serving network that the operational mode of the widget(s) has been changed from the low memory mode widget(s) to the standard operational mode widget(s). The serving network is notified so that network-level changes from the low memory operational mode to the standard operational mode can be implemented. After the serving network has been notified the process returns to Event 2000 for further monitoring of the available memory state.

Figure 26:
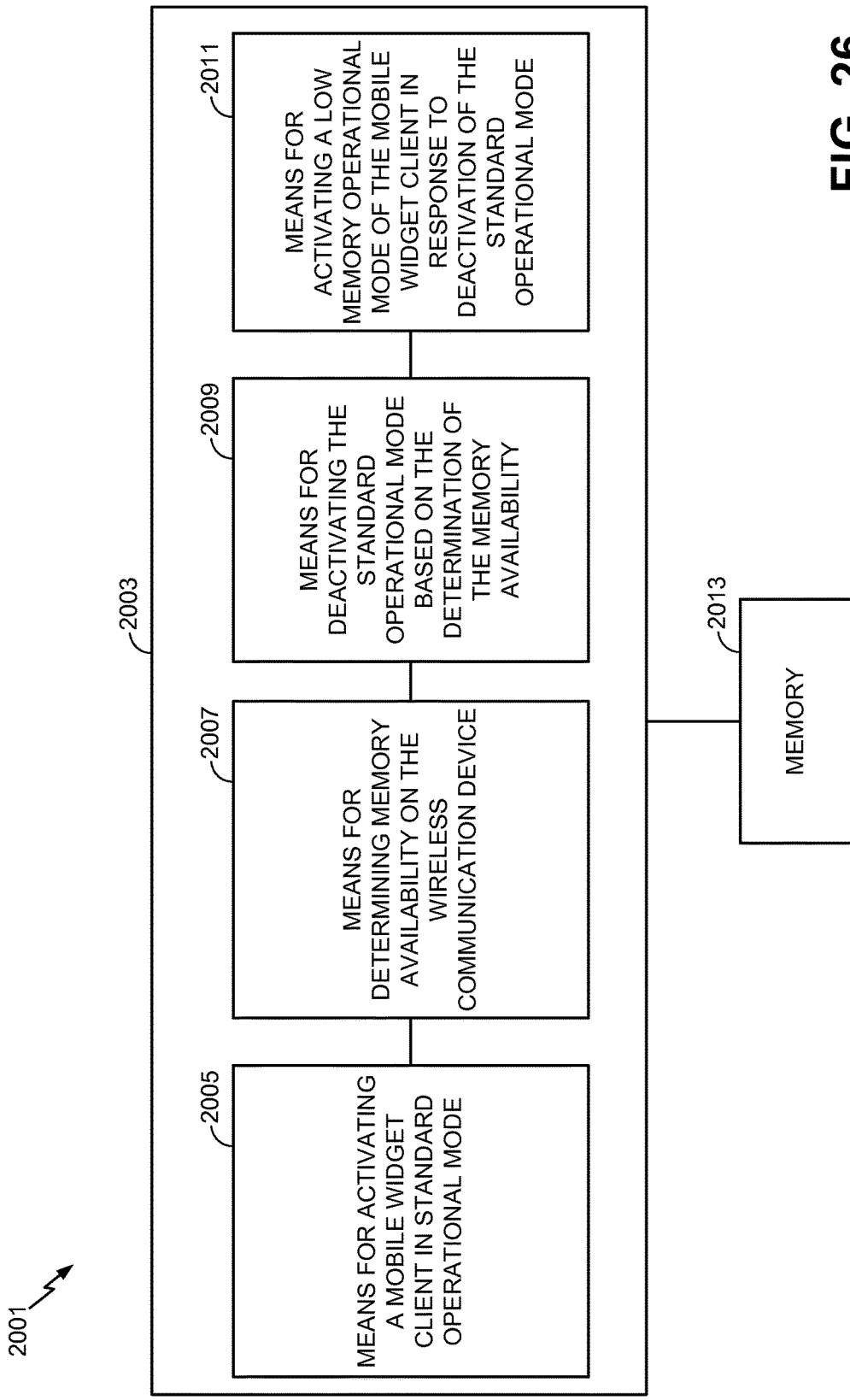
FIG. 26 is an illustration of an example system that facilitates changes to widget operational modes.

Turning to FIG. 26, illustrated is a system 2001 that changes operational modes in a wireless communication device. System 2001 can reside within a multiplexer, transmitter, mobile device, etc., for instance. As depicted, system 2001 includes functional blocks that can represent functions implemented by a processor, software, or combination thereof (e.g., firmware). System 2001 includes a logical grouping 2003 of electrical components that facilitate changing operational modes in a wireless communication device. Logical grouping 2003 can include means 2005 for activating a mobile widget client in standard operational mode. Moreover, logical grouping 2003 can include means 2007 for determining memory availability on the wireless communication device. In addition, logical grouping 2003 can include means 2009 for deactivating the standard operational mode based on the determination of the memory availability. Further, logical grouping 2003 can include means 2011 for activating a low memory operational mode of the mobile widget client in response to deactivation of the standard operational mode. Additionally, system 2001 can include a memory 2013 that retains instructions for executing functions associated with electrical components 2005, 2007, 2009, and 2011. While shown as being external to memory 2013, it is to be understood that electrical components 2005, 2007, 2009, and 2011 can exist within memory 2013.

Figure 27:
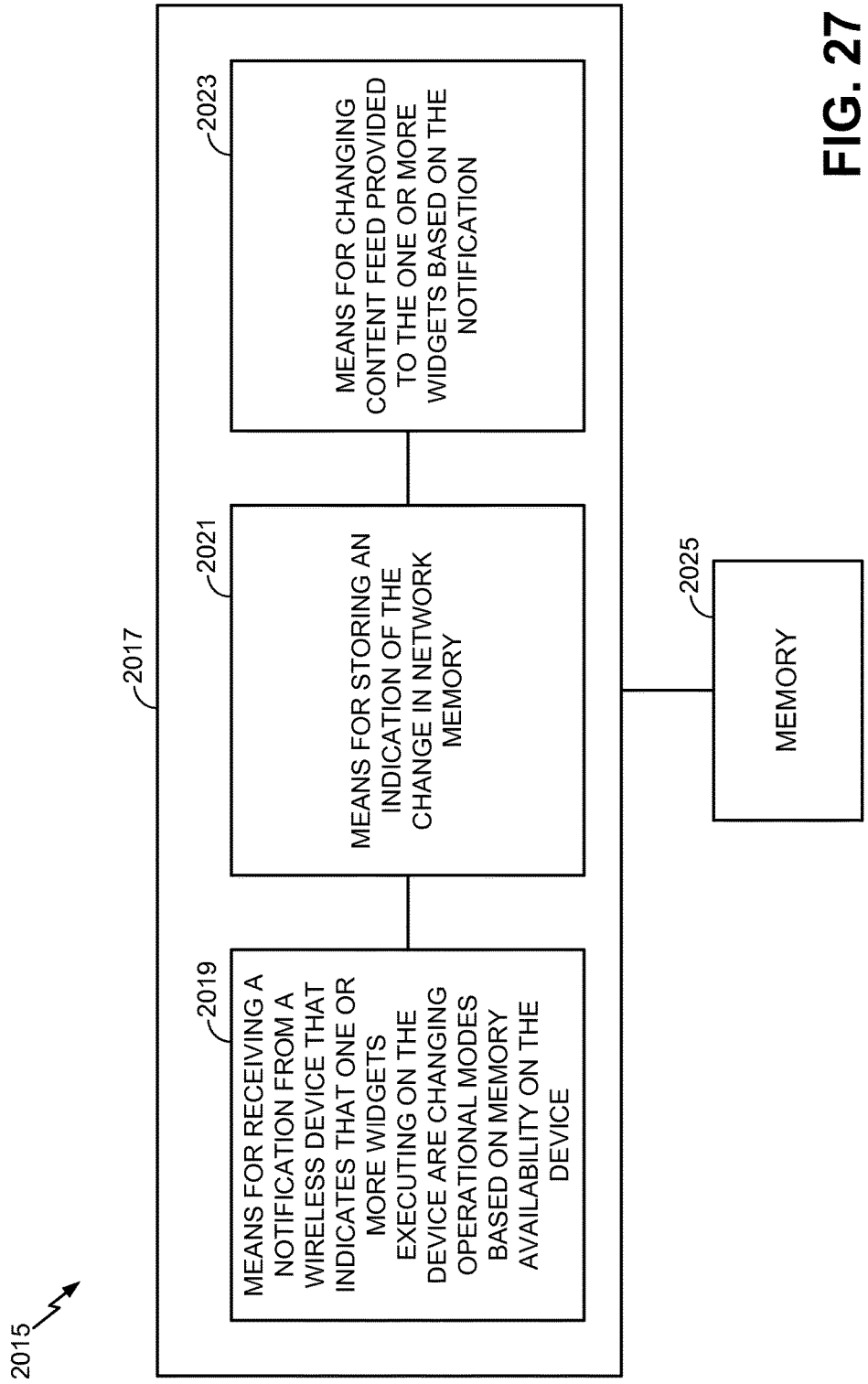
FIG. 27 is an illustration of an example system that facilitates changes to content feeds to widgets based on changes to widget operational modes.

Referring now to FIG. 27, illustrated is a system 2015 that changes content feed to a widget based on operational mode changes. System 2015 can reside within a multiplexer, transmitter, mobile device, etc., for instance. As depicted, system 2015 includes functional blocks that can represent functions implemented by a processor, software, or combination thereof (e.g., firmware). System 2015 includes a logical grouping 2017 of electrical components that facilitate changing content feed to a widget based on operational mode changes. Logical grouping 2017 can include means 2019 for receiving a notification from a wireless device that indicates that one or more widgets executing on the device are changing operational modes based on memory availability on the device. Moreover, logical grouping 2017 can include means 2021 for storing, in network memory, an indication of the change in operational modes. Further, logical grouping 2017 can include means 2023 for changing content feed provided to the one or more widgets based on the notification. Additionally, system 2015 can include a memory 2025 that retains instructions for executing functions associated with electrical components 2019, 2021, and 2023. While shown as being external to memory 2025, it is to be understood that electrical components 2019, 2021, and 2023 can exist within memory 2025.

Run-Time Memory Management

According to other aspects, systems, methods, and apparatus are provided for improved run-time management of memory. In this regard, the systems, methods, and apparatus associated with these aspects provide for loading of widgets into runtime memory, such as random access memory (RAM) based on widget preferences, such as widget usage times patterns, frequency of widget use, widget wall navigation patterns, and the like. Based on the widget preferences, pre-specified adaptive actions may occur which affect run-time memory management, such only loading widgets upon user interaction as opposed to automatically loading, configuring a user's widget wall based on previous navigation patterns, adjusting the depth of a widget loaded into memory based on previous usage patterns and the like.

Figure 28:
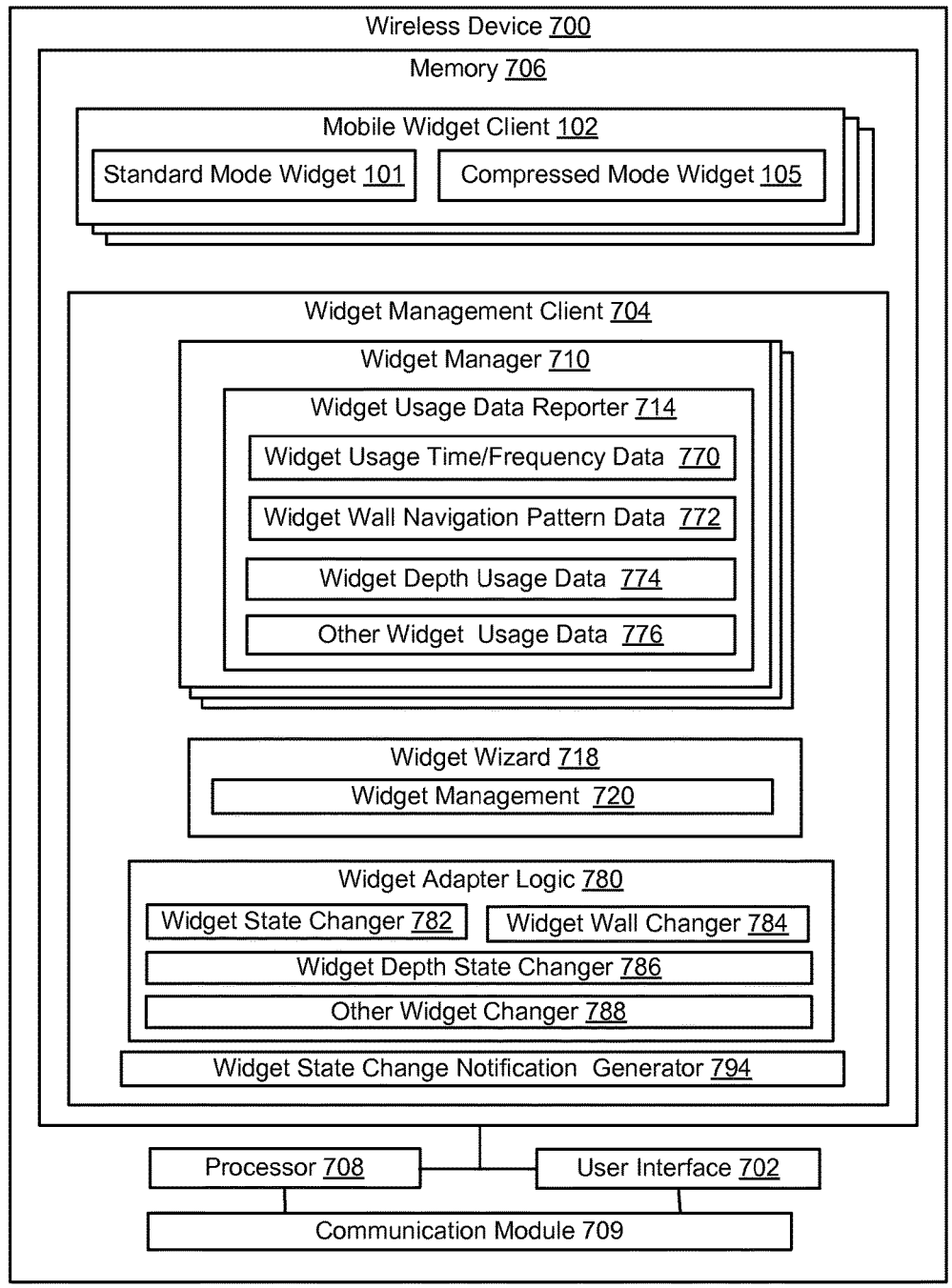
FIG. 28 is a schematic diagram of an aspect of a wireless device having different mode widgets, operable in the system of FIG. 1.

Referring to FIG. 28, a block diagram is illustrated on a wireless device 700 configured to perform run-time memory management, in accordance with aspects of the innovation. Similar to previously described wireless device, wireless device 700 includes processor 708, which is in communication with memory 706, communications module 709, and user interface 702. The memory 706 of wireless device 700 includes one or more mobile widget clients 102 that include a standard mode widget 101 and corresponding compressed mode widgets 105. Compressed mode widgets 105 differ from the previous described low memory mode widgets 103 (FIG. 24), in that compressed mode widgets 105 are configured with minimal to no content updates. As discussed in respect to the aspects related to run-time memory management, the compressed mode widgets 105 may be presented/displayed in the user interface 702 until a user interacts with the compressed mode widget 105 to activate the standard mode widget 101. As such the compressed mode widget 105 may be limited to a branding image, such as a logo or the like and minimal temporal information such as headline or the like. In other aspects, such as when the compressed mode widget 105 has a corresponding low memory mode widget, the low memory and compressed mode widget may be limited to a one/two word text descriptor identifying the title or nature of the widget.

The memory 706 of wireless device 700 may additionally include a widget management client (WMC) 704 operable to manage the election and operation of widgets on the wireless device. As such, WMC 704 may include one or more widget managers 710 each configured to manage a respective widget 102. The widget manager 710 may include a widget usage data reporter 714 operable to collect, store and report widget usage data. In one aspect, widget usage data reporter is operable to collect widget usage data that is used to manage the run-time memory. This widget usage data may include, but is not limited to, widget usage time and frequency data 770, widget wall navigational pattern data 772, widget depth usage data 774 and any other widget usage data 776 that may be needed to manage the run-time memory. Widget usage time and frequency data 770 may provide the times and or time periods in which a user views and/or interacts with the widget and the frequency of the views and/or interactions. Widget wall navigational pattern data 772 may provide for a user's preferred pattern for navigating the widget wall associated with the presentation of the widgets. In other words, data related to the pattern within the widget wall that a user implements to navigate to the widget associated with the widget manager 710. Widget depth usage data 774 may provide for data related to the depth to which widget is accessed by the user.

The WMC 704 may additionally include widget adapter logic 780 operable to change the widget state, the widget wall state, widget depth state or other state related changes to the widgets based on the widget usage data as provided by widget usage data reporter 714. As illustrated widget adapter logic 780 resides and is executed on the wireless device, however in other aspects the widget adapter logic may reside and be executed at the serving network, such as at the WMS 300 or the like. In such aspects, the widget usage data is collected and communicated to the serving network, which then utilizes the widget usage data to determine adaptive state changes to the widget, widget depth, widget wall and the like and communicates the adaptive state changes back to the wireless device for storage in the configuration setting related to the widget of interest.

In one aspect, widget adapter logic 780 may include widget state changer 782 operable to change the state of a widget from standard mode widget 101 to a compressed mode widget 105 based on time of use and frequency of use data. For example, if the usage data indicates that a particular stock ticker widget is generally only accessed by the user during weekdays during times when the stock market is open, then the widget state changer 782 may determine that the standard mode widget 101 is to be active during the hours that the stock market is open and automatically switched to the compressed mode widget 105 during the hours when the stock market is closed. If during the hours that the stock market is closed, the compressed mode widget 105 is accessed or otherwise activated by the user, the logic will provide for the widget to change from the compressed mode widget 105 to the standard mode widget 101.

Figure 29:
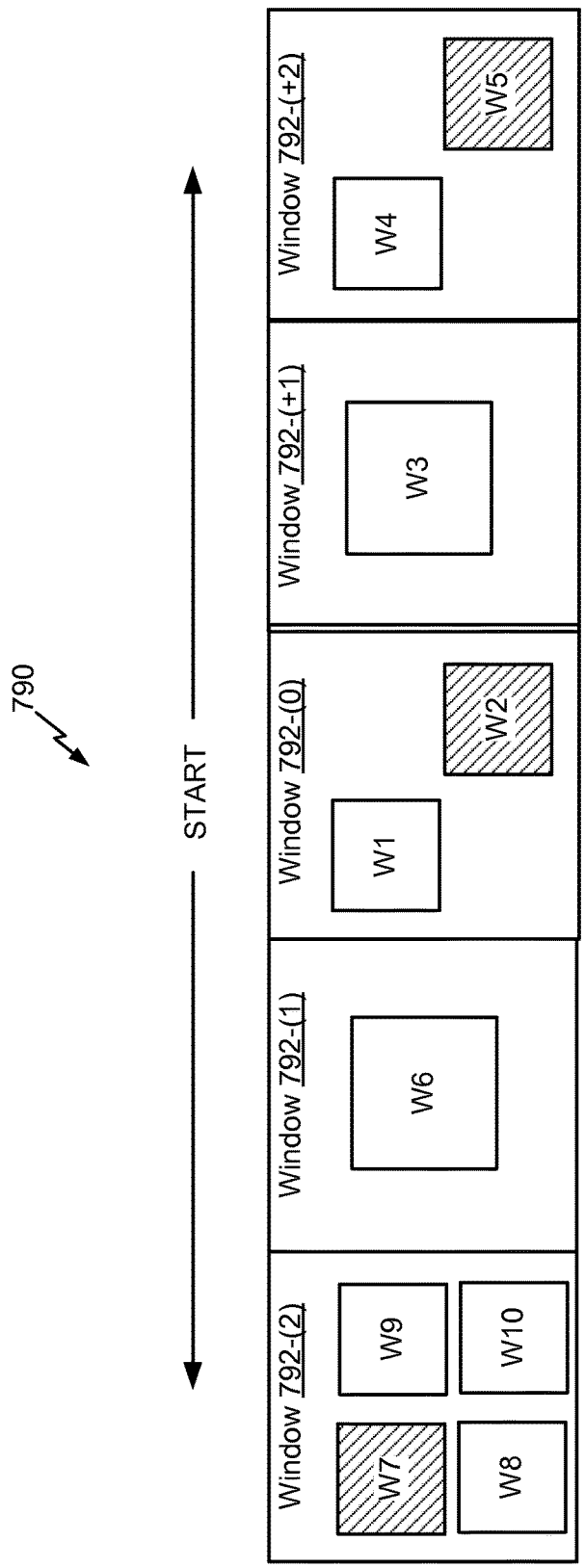
FIG. 29 is an illustration of various examples of display windows on a widget wall having respective widgets in different modes.

In another aspect, widget adapter logic 780 may include a widget wall state changer 784 operable to change the active state of widgets presented on the user's widget wall based on indicated widget wall navigational patterns. For example, FIG. 29 provides for a block diagram of display windows 792 in a widget wall 790. The illustrated widget wall has five display windows 792-(0), 792-(1), 792-(2), 792-(+1) and 792-(+2). Each display window displays one or more widgets, indicated as widgets W1-W10. Widgets indicated by shading, widgets W2, W7, and W5 have been indicated by widget usage data as being preferred widgets that the user accesses or otherwise activates during navigation of the widget wall 790. The remaining widgets, W1, W3, W4, W6-W10 have been indicated to be non-preferred widgets and, as such, remain as compressed mode widgets 105 until the user maneuvers to the associated window that includes the window and the widget is accessed or otherwise activated by the user.

When the WMC 300 is initiated, display window 792-(0) is presented and widget W2 is loaded as a standard mode widget 101 and widget W1 is loaded as a compressed mode widget 105. Widget W1 can be accessed and/or activated to change the widget from the compressed mode widget 105 to the standard mode widget 101. Additionally, widgets W3 and W6 which are accessible in the next available windows are loaded as compressed mode widgets, since these are indicated as non-preferred widgets (e.g. widgets that the user normally does not access/activate or does not normally access/activate during the current time period).

When the user chooses to maneuver to window 792-(+1), widget W5 is loaded as a standard mode widget 101, since this a preferred widget and navigational patterns show that the user is apt further maneuver the windows to window 792-(+2) to access W5. When the user chooses to maneuver to window 792-(+2), widget W2 is deactivated/unloaded, meaning the standard mode widget 101 is changed to the compressed mode widget 105. This is because the user has maneuvered at least two windows or two clicks away from the preferred widget W2 and can no longer maneuver to window 792-(0) (i.e., the window in which W2 resides) through a single maneuver/click. When the user chooses to maneuver from window 792-(+2) back to window 792-(+1), widget W2 is reloaded again as a standard mode widget 102, based on the user being one maneuver/click away from being in the window 3003-(0) that includes widget W2. When the user chooses to maneuver to window 792-(1), widget W5 is deactivated/unloaded, meaning the standard mode widget 101 is changed to the compressed mode widget 105.

When the user chooses to maneuver to window 792-(1), widget W7 is loaded as a standard mode widget, since this is a preferred widget and navigational patterns show that the user is apt further maneuver the windows to window 792-(2) to access W7. When the user chooses to maneuver to window 792-(2), widget W2 is deactivated/unloaded, meaning the standard mode widget 101 is changed to the compressed mode widget 105 because the window display is at least two windows or two clicks away from the preferred widget W2.

Referring again to FIG. 28, the widget adapter logic 780 may additionally include widget depth state changer 786 operable to change the active state of depths within a widget based on the indicated user depth navigational pattern. For example, if the widget depth usage data 774 indicates that the user only click-though or maneuvers to the second depth of a widget having three depths, then the first two depths of the widget are initially loaded from the standard mode widget 101 and the third depth of the widget is loaded from the compressed mode widget 105. As the user maneuvers through the depths, such as when the user maneuvers to the second depth, the third depth may be loaded from the standard mode widget 101 or, based on typical usage patterns which indicate the user rarely accesses the third depth, the third depth may remain in the compressed mode state until the user maneuvers to the third depth. Additionally, widget adapter logic 780 may include other widget changer 788 operable to change other states of widgets or functionality related to widgets as a means of managing runtime memory based on widget usage data.

Additionally, WMC 704 may include widget wizard 718 operable for managing the configuration and acquisition of widgets. Widget wizard 718 may include widget management 720 operable for managing and storing widget settings and configurations. As such, when changes to widget states are dynamically determined by widget adapter logic 780, the changes are reflected in the configuration settings for the one or more widgets affected by the determined state changes. Also, WMC 704 may include a widget state change notification generator 794 operable to notify the serving network of changes to the widget states for the purpose of storing the changes in the digital locker 304 of WMS 300, affecting necessary changes to content delivery based on the state changes and any other network functions necessary in light of changes to widget states.

Figures 30, 31:
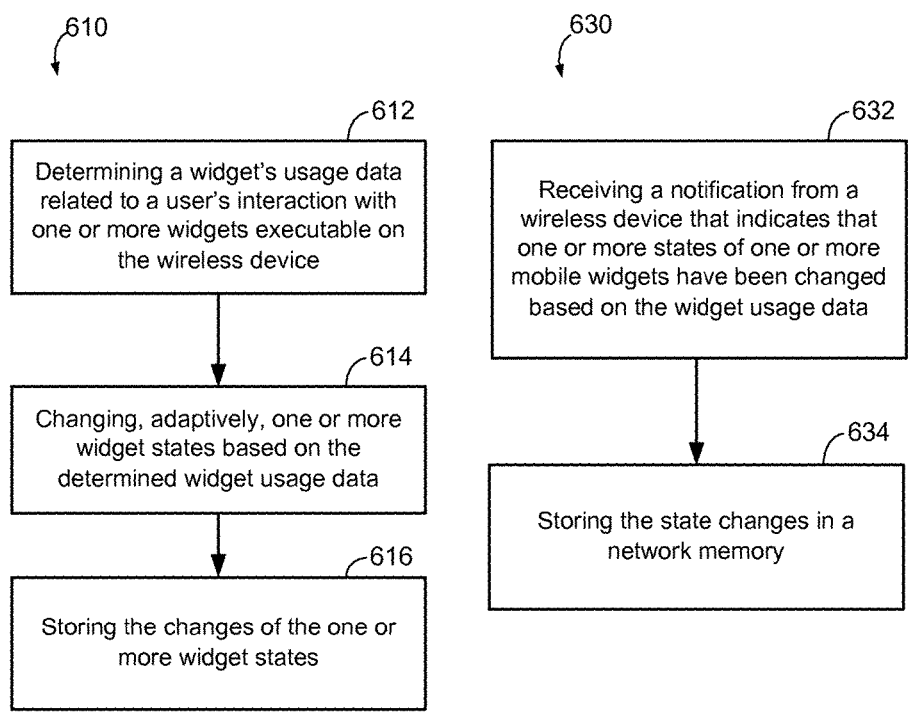
FIG. 30 is a flow diagram of an aspect of a method of run-time memory management in the system of FIG. 1.
FIG. 31 is a flow diagram of an aspect of a method of run-time memory management in the system of FIG. 1.

Turning to FIG. 30, in one aspect, a method 610 operable on a wireless device for managing the runtime memory of a wireless device includes determining a widget's usage data related to a user's interaction with one or more widgets executable on the wireless device at 612. For example, the widget's usage data may include at least one time of use or the frequency of use by a user, navigational patterns of a user, or informational hierarchical depth of the usage of the widget, among other widget's usage data.

Also the method includes changing, adaptively, one or more widget states based on the determined widget usage data at 614. For example, changing, adaptively, one or more widget states may include changing the widget from a standard mode to a compressed mode, or changing whether the widget is displayed on a widget wall, among other widget states. The method further includes storing the changes of the one or more widget states at 616.

Referring now to FIG. 31, in one aspect, a method 630 operable on a network device for receiving and recording a widget's state changes based on the widget's usage data includes receiving a notification from a wireless device that indicates that one or more states of one or more mobile widgets have been changed based on the widget's usage data at 632. For example, the widgets states may include a load state, a load state within a widget wall, or a depth of loading, among other widgets states.

The method further includes storing the state changes in a network memory at 634. For example, the storing may include storing the changes in a digital locker associated with at least one of the wireless devices or a subscriber to a widget service.

Figure 32:
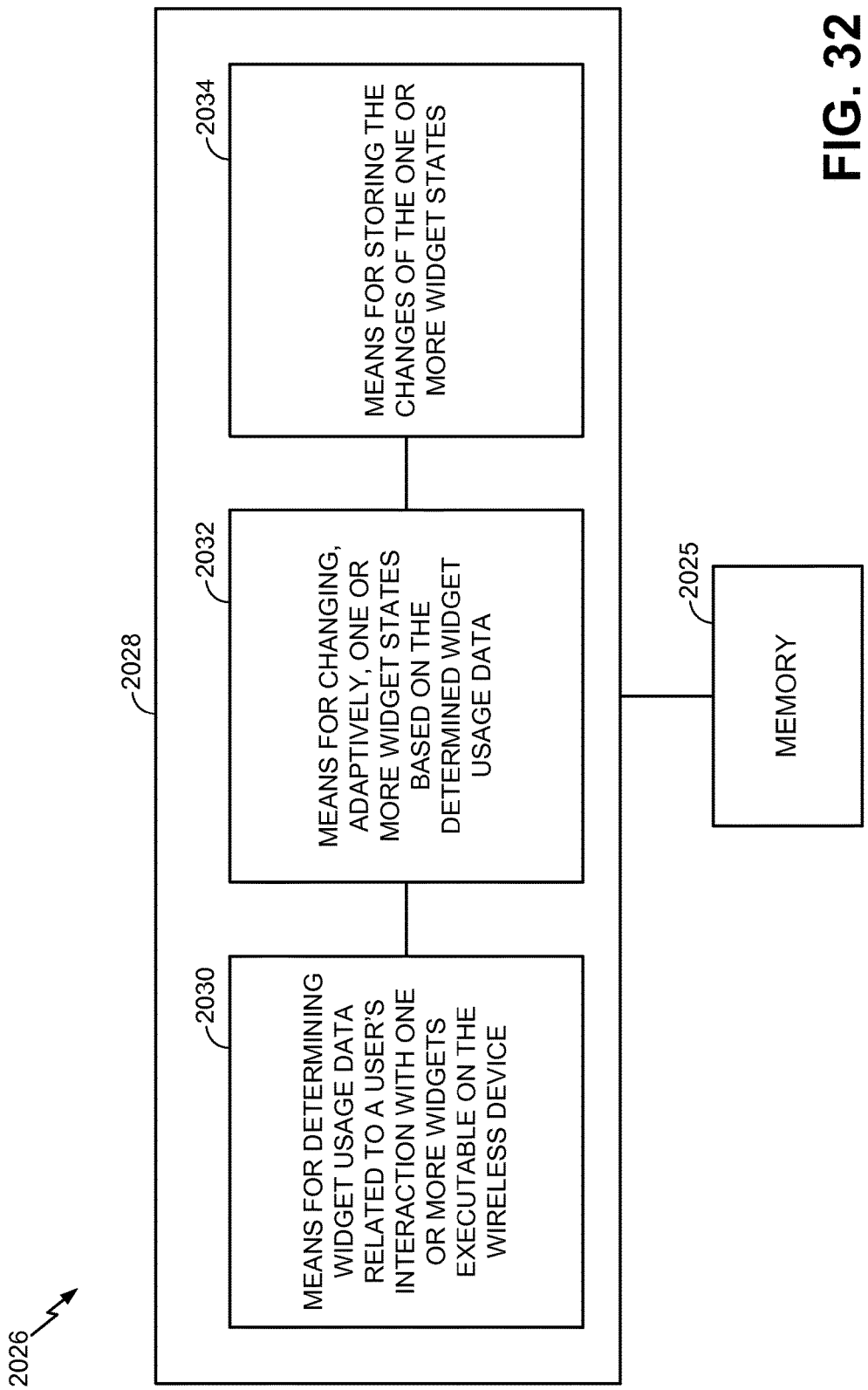
FIG. 32 is an illustration of an example system that facilitates managing the runtime memory of a wireless device.

Referring now to FIG. 32, illustrated is a system 2026 that manages the runtime memory of a wireless device. System 2026 can reside within a multiplexer, transmitter, mobile device, etc., for instance. As depicted, system 2026 includes functional blocks that can represent functions implemented by a processor, software, or combination thereof (e.g., firmware, etc.). System 2026 includes a logical grouping 2028 of electrical components that facilitate managing the runtime memory of a wireless device. Logical grouping 2028 can include means 2030 for determining widget usage data related to a user's interaction with one or more widgets executable on the wireless device. Moreover, logical grouping 2028 can include means 2032 for changing, adaptively, one or more widget states based on the determined widget usage data. Further, logical grouping 2028 can include means 2034 for storing the changes of the one or more widget states. Additionally, system 2026 can include a memory 2036 that retains instructions for executing functions associated with electrical components 2030, 2032, and 2034. While shown as being external to memory 2036, it is to be understood that electrical components 2030, 2032, and 2034 can exist within memory 2036.

Figure 33:
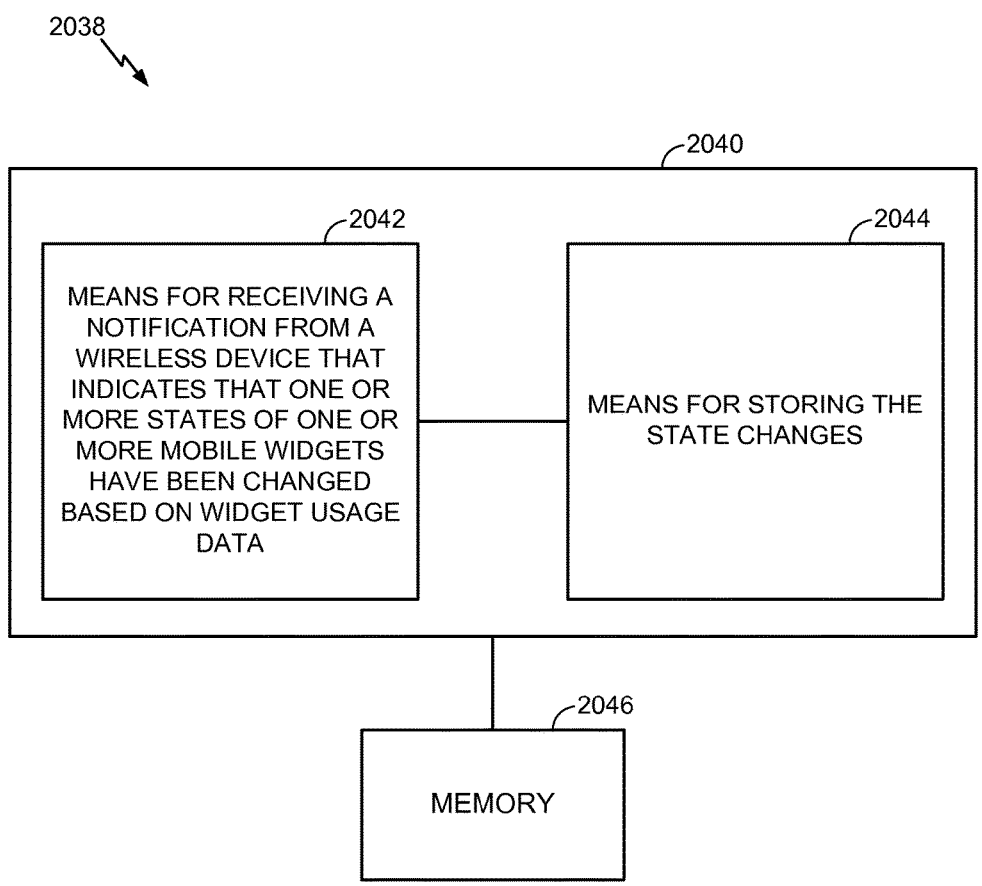
FIG. 33 is an illustration of an example system that facilitates receiving and recording widget state changes based on widget usage data.

Referring now to FIG. 33, illustrated is a system 2038 that receives and records widget state changes based on widget usage data. System 2038 can reside within a multiplexer, transmitter, mobile device, etc., for instance. As depicted, system 2038 includes functional blocks that can represent functions implemented by a processor, software, or combination thereof (e.g., firmware, etc.). System 2038 includes a logical grouping 2040 of electrical components that facilitate receiving and recording widget state changes based on widget usage data. Logical grouping 2040 can include means 2042 for receiving a notification from a wireless device that indicates that one or more states of one or more mobile widgets have been changed based on widget usage data. Moreover, logical grouping 2040 can include means 2044 for storing the state changes in network memory. Additionally, system 2040 can include a memory 2046 that retains instructions for executing functions associated with electrical components 2042 and 2044. While shown as being external to memory 2046, it is to be understood that electrical components 2042 and 2044 can exist within memory 2046. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing a runtime memory of a wireless device, comprising:
    activating a low memory operational mode on the wireless device;
    determining, while the low memory operational mode is active on the wireless device, widget usage data related to a user interaction with one or more widgets executable on the wireless device, the determined widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof;
    changing, adaptively while the low memory operational mode is active on the wireless device, one or more widget states based on the determined widget usage data by scaling a degree to which the one or more widgets are loaded into the runtime memory based on the widget wall navigational data, the user depth navigational data, or a combination thereof; and
    storing, while the low memory operational mode is active on the wireless device, information indicative of the changing of the one or more widget states.

2. The method of claim 1, wherein the determined widget usage data includes, for one or more widgets, time of use, frequency of use or any combination thereof.

3. The method of claim 2, wherein the one or more widgets are changed by the changing to one of a loaded or non-loaded state for a threshold time period based upon the time of use, the frequency of use or any combination thereof.

4. The method of claim 1, wherein the determined widget usage data includes the widget wall navigational data.

5. The method of claim 4, wherein the one or more widgets are changed by the changing within the widget wall to one of a loaded or non-loaded state based on the determined widget wall navigational data.

6. The method of claim 1, wherein the determined widget usage data includes the user depth navigational data.

7. The method of claim 6, wherein a navigational depth of the one or more widgets is changed into either a loaded state or a non-loaded state based on the user depth navigational data.

8. A non-transitory computer-readable medium comprising:
    at least one instruction for causing a computer to activate a low memory operational mode on a wireless device;
    at least one instruction for causing a computer to determine, while the low memory operational mode is active on the wireless device, widget usage data related to a user interaction with one or more widgets executable on the wireless device, the determined widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof;
    at least one instruction for causing the computer to change, adaptively while the low memory operational mode is active on the wireless device, one or more widget states based on the determined widget usage data by scaling a degree to which the one or more widgets are loaded into a runtime memory based on the widget wall navigational data, the user depth navigational data, or a combination thereof; and
    at least one instruction for causing the computer to store, while the low memory operational mode is active on the wireless device, information indicative of the change of the one or more widget states.

9. The non-transitory computer-readable medium of claim 8,
    wherein the determined widget usage data includes, for one or more widgets, time of use, frequency of use or any combination thereof, or
    wherein the determined widget usage data includes the widget wall navigational data, or
    wherein the determined widget usage data includes the user depth navigational data, or
    any combination thereof.

10. An apparatus, comprising:
    means for activating a low memory operational mode on the wireless device;
    means for determining, while the low memory operational mode is active on the wireless device, widget usage data related to a user interaction with one or more widgets executable on a wireless device, the determined widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof;
    means for changing, adaptively while the low memory operational mode is active on the wireless device, one or more widget states based on the determined widget usage data by scaling a degree to which the one or more widgets are loaded into the runtime memory based on the widget wall navigational data, the user depth navigational data, or a combination thereof; and means for storing, while the low memory operational mode is active on the wireless device, information indicative of the changing of the one or more widget states.

11. The apparatus of claim 10,
wherein the determined widget usage data includes, for one or more widgets, time of use, frequency of use or any combination thereof, or
wherein the determined widget usage data includes the widget wall navigational data, or
wherein the determined widget usage data includes the user depth navigational data, or
any combination thereof.

12. An apparatus for managing a runtime memory of a wireless device, comprising:
a processor configured to activate a low memory operational mode of the wireless device;
a memory in communication with the processor;
one or more widgets stored in the memory, executable by the processor;
a widget usage data reporter stored in the memory, executable by the processor and operable to determine, while the low memory operational mode is active on the wireless device, widget usage data related to a user interaction with the one or more widgets, the determined widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof;
widget adapter logic stored in the memory, executable by the processor and operable to adaptively change, while the low memory operational mode is active on the wireless device, one or more widget states based on the determined widget usage data by scaling a degree to which the one or more widgets are loaded into the runtime memory based on the widget wall navigational data, the user depth navigational data, or a combination thereof; and
a widget configuration setting database in the memory and operable to store, while the low memory operational mode is active on the wireless device, information indicative of the change of the one or more widget states.

13. The apparatus of claim 12,
wherein the determined widget usage data includes, for one or more widgets, time of use, frequency of use or any combination thereof, or
wherein the determined widget usage data includes the widget wall navigational data, or
wherein the determined widget usage data includes the user depth navigational data, or
any combination thereof.

14. A method for receiving and recording widget state changes based on widgets usage data, comprising:
receiving a notification from a wireless device operating in accordance with a low memory operational mode that indicates that one or more states of one or more widgets have been changed by scaling a degree to which the one or more widgets are loaded into a runtime memory of the wireless device based on widget usage data, the widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof; and
storing information indicative of the one or more state changes in a network memory.

15. The method of claim 14, wherein the notification includes an indication of a change to or from one or more states including a widget load state, or a given widget load state within a widget wall or a degree of depth loading of the one or more widgets or any combination thereof.

16. The method of claim 14, wherein storing the state changes in the network memory further comprises storing in a digital locker associated with at least one of the wireless device or a subscriber to a widget service.

17. A non-transitory computer-readable medium comprising:
at least one instruction for causing a computer to receive a notification from a wireless device operating in accordance with a low memory operational mode that indicates that one or more states of one or more widgets have been changed by scaling a degree to which the one or more widgets are loaded into a runtime memory of the wireless device based on widget usage data, the widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof; and
at least one instruction for causing the computer to store information indicative of the one or more state changes in a network memory.

18. The non-transitory computer-readable medium of claim 17, wherein the notification includes an indication of a change to or from one or more states including a widget load state, or a given widget load state within a widget wall or a degree of depth loading of the one or more widgets or any combination thereof.

19. An apparatus, comprising:
means for receiving a notification from a wireless device operating in accordance with a low memory operational mode that indicates that one or more states of one or more widgets have been changed by scaling a degree to which the one or more widgets are loaded into a runtime memory of the wireless device based on widget usage data, the widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof; and
means for storing information indicative of the one or more state changes.

20. The apparatus of claim 19, wherein the notification includes an indication of a change to or from one or more states including a widget load state, or a given widget load state within a widget wall or a degree of depth loading of the one or more widgets or any combination thereof.

21. A network apparatus for receiving and recording widget state changes, comprising:
- a processor;
- a memory in communication with the processor;
- a widget management module stored in the memory, executable by the processor and operable to receive a notification from a wireless device operating in accordance with a low memory operational mode that indicates that one or more states of one or more widgets have been changed by scaling a degree to which the one or more widgets are loaded into a runtime memory of the wireless device based on widget usage data, the widget usage data including widget wall navigational data indicating a number of user inputs required to navigate between a current active window of a widget wall and one or more windows of the window wall that include the one or more widgets, user depth navigational data indicating a hierarchical depth to which the one or more widgets have previously been accessed, or a combination thereof; and
- a data storage in the memory and operable to store information indicative of the one or more state changes.

22. The network apparatus of claim 21, wherein the one or more states include a widget load state, or a widget load state within a widget wall or a state of depth loading of a widget or any combination thereof.

23. The network apparatus of claim 21, wherein the data storage further comprises a digital locker associated with at least one of the wireless device or a subscriber to a widget service.

24. The network apparatus of 21, wherein the notification includes an indication of a change to or from one or more states including a widget load state, or a given widget load state within a widget wall or a degree of depth loading of the one or more widgets or any combination thereof.

* * * * *